US009620169B1

(12) United States Patent
Nolan et al.

(10) Patent No.: US 9,620,169 B1
(45) Date of Patent: Apr. 11, 2017

(54) SYSTEMS AND METHODS FOR CREATING A PROCESSED VIDEO OUTPUT

(71) Applicant: Dreamtek, Inc., San Francisco, CA (US)

(72) Inventors: Tim Nolan, San Francisco, CA (US); Dan Isaacs, Methuen, MA (US)

(73) Assignee: DREAMTEK, INC., San Francisco, CA (US)

( * ) Notice: Subject to any disclaimer, the term of this patent is extended or adjusted under 35 U.S.C. 154(b) by 112 days.

(21) Appl. No.: 14/341,522

(22) Filed: Jul. 25, 2014

Related U.S. Application Data

(60) Provisional application No. 61/859,063, filed on Jul. 26, 2013.

(51) Int. Cl.
*G11B 27/031* (2006.01)
*G11B 27/038* (2006.01)
*G11B 27/10* (2006.01)
*H04N 5/265* (2006.01)

(52) U.S. Cl.
CPC .......... *G11B 27/031* (2013.01); *G11B 27/038* (2013.01); *G11B 27/10* (2013.01); *H04N 5/265* (2013.01)

(58) Field of Classification Search
CPC .. H04N 9/8211; G11B 27/031; G11B 27/034; G11B 27/34; G11B 27/24; G10H 1/368
USPC ......... 386/230, 263, 278–290; 715/716, 723, 715/725, 727; 381/106, 119; 700/94
See application file for complete search history.

(56) References Cited

U.S. PATENT DOCUMENTS

| | | | | |
|---|---|---|---|---|
| 7,917,007 | B2* | 3/2011 | Friedman | G11B 27/031 386/281 |
| 8,326,444 | B1* | 12/2012 | Classen | H03G 3/3005 381/106 |
| 2005/0066279 | A1* | 3/2005 | LeBarton | G06T 13/00 715/723 |
| 2005/0201723 | A1* | 9/2005 | Islam | G11B 27/031 386/232 |
| 2006/0122842 | A1* | 6/2006 | Herberger | G10H 1/368 704/278 |
| 2007/0014422 | A1* | 1/2007 | Wesemann | H04H 60/04 381/119 |
| 2007/0118801 | A1* | 5/2007 | Harshbarger | G11B 27/031 715/730 |
| 2008/0190271 | A1* | 8/2008 | Taub | G10H 1/0058 84/645 |

(Continued)

*Primary Examiner* — Thai Tran
*Assistant Examiner* — Stephen Smith
(74) *Attorney, Agent, or Firm* — McAndrews, Held & Malloy, Ltd.

(57) ABSTRACT

Certain embodiments provide systems and method for creating a processed video stream. A method for creating a processed video stream includes receiving project instructions and media at a computing device executing a socially interactive application. The project instructions can include a project type. The method also includes uploading the project instructions and media to a server connected to the computing device. The method includes creating a project script based on the project type at a processor of the server. The method includes encoding, at the processor, a video stream based on the project script. The method also includes sharing the video stream at the socially interactive application.

17 Claims, 35 Drawing Sheets

(56) References Cited

U.S. PATENT DOCUMENTS

| | | | |
|---|---|---|---|
| 2010/0183280 A1* | 7/2010 | Beauregard | G11B 27/034 386/285 |
| 2010/0226620 A1* | 9/2010 | Sim | G11B 27/034 386/285 |
| 2012/0054611 A1* | 3/2012 | Perrodin | G11B 27/34 715/716 |
| 2013/0061144 A1* | 3/2013 | Eppolito | G06F 3/04847 715/716 |
| 2013/0163963 A1* | 6/2013 | Crosland | H04N 9/8211 386/285 |
| 2014/0096002 A1* | 4/2014 | Dey | G06F 3/0488 715/723 |
| 2014/0126751 A1* | 5/2014 | Yliaho | H04R 3/00 381/122 |
| 2014/0180762 A1* | 6/2014 | Gilbert | G06F 17/30752 705/7.29 |
| 2014/0219637 A1* | 8/2014 | McIntosh | G11B 27/105 386/282 |

* cited by examiner

SYSTEMS AND METHODS FOR CREATING A PROCESSED VIDEO OUTPUT

CROSS-REFERENCE TO RELATED APPLICATIONS/INCORPORATION BY REFERENCE

The present application claims priority under 35 U.S.C. §119(e) to provisional application Ser. No. 61/859,063, filed on Jul. 26, 2013. The above referenced provisional application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to systems and methods supporting access to an application for users to input, process, and share media. More specifically, certain embodiments of the present invention relate to systems and methods that provide a socially interactive application for inputting, processing, compiling, and sharing video streams comprising images, video clips, and/or audio clips.

Phones, cameras, and video cameras are commonly used to capture memories. Typically, when returning from a major event, like a vacation or birthday party, photographs may be shared as an online album with friends and family, or uploaded to a social media site like Facebook. A problem with standalone photographs of an event is that the story associated with the images may not be apparent from the photograph stills alone. In order to tell a story, video editing software can be used to bring pictures, videos, and music to life. Existing consumer video editing software is expensive and complicated to use because it comes from roots in professional video editing software. For example, existing video editing software commonly uses separate, parallel lanes (also called tracked or swim lanes) for video and image clips, subtitles, audio tracks, transitions between clips, and the like. Although the separate, parallel lanes enable professional video editors to have complete control of the video editing process, even the most computer savvy consumers can find the process of editing video to be complicated, tedious, and time consuming. As such, even after a user successfully creates an edited video stream using existing video editing software, the user may put off and/or be reluctant to create edited video streams in the future due to the time and energy needed to create edited video streams using existing video editing software.

Some existing video editing software has attempted to simplify the video editing process. However, these simplified existing video editing software solutions do not provide users with control over the appearance of the output. For example, typical simplified video editing software merely allows for user selection of a project template that is used to automatically create the video stream. Users of typical simplified video editing software may not be able to control the order pictures or videos are displayed and what parts of videos are used. Further, existing simplified video editing software does not allow for audio ducking and does not provide tools for filtering video, audio, or colors.

Further limitations and disadvantages of conventional and traditional approaches will become apparent to one of skill in the art, through comparison of such systems with some aspects of the present invention as set forth in the remainder of the present application.

SUMMARY OF THE INVENTION

A system and/or method that provides a socially interactive application for inputting, processing, compiling, and sharing video streams comprising images, video clips, and/or audio clips, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWING(S)

Figure 1:
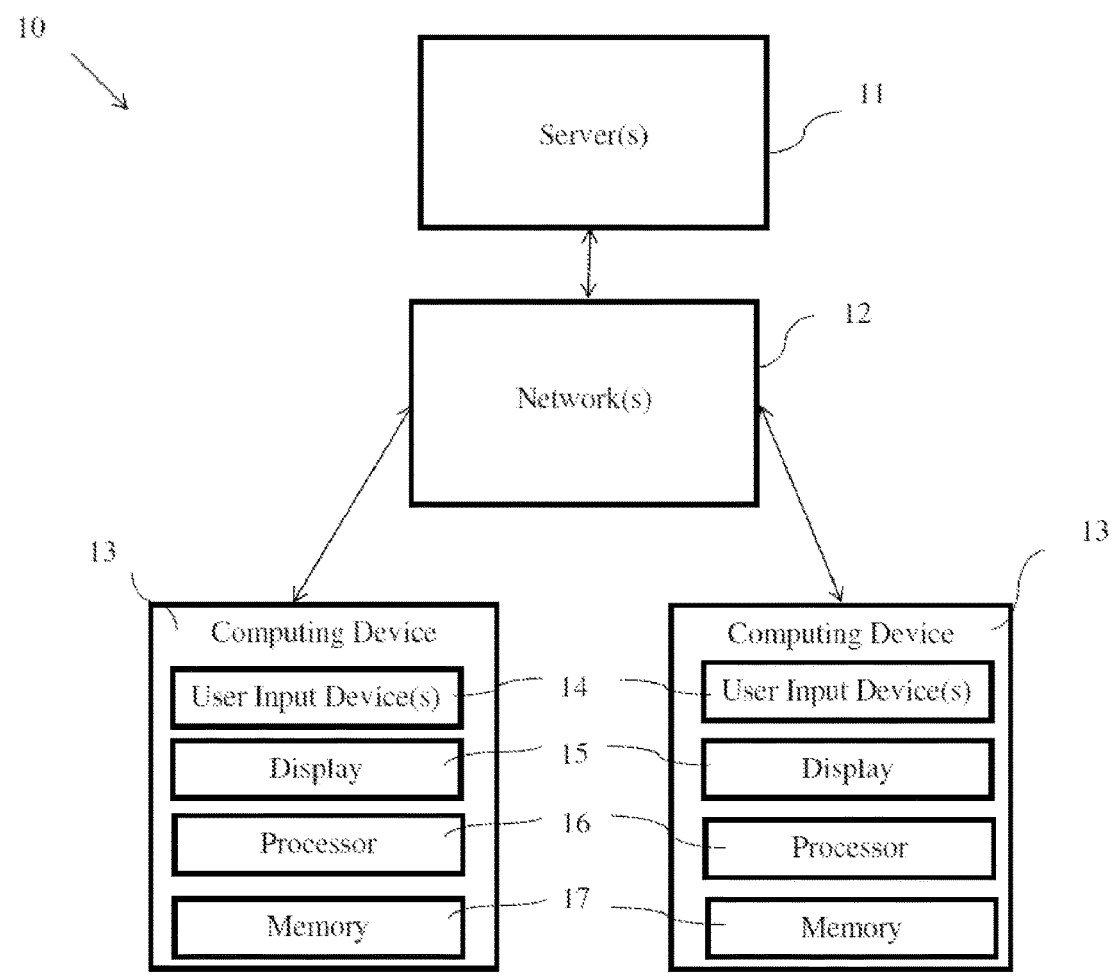
FIG. 1 is a block diagram of an exemplary system in which a representative embodiment of the present invention may be practiced.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Aspects of the present invention are related to systems and methods supporting access to an application for users to input, process, and share media. More specifically, certain embodiments of the present invention relate to systems and methods that provide a socially interactive application for inputting, processing, compiling, and sharing video streams comprising images, video clips, and/or audio clips.

A representative embodiment of the present invention aids users of internet-connected desktop, laptop, and/or mobile devices with creating and sharing video streams.

As utilized herein, the terms "exemplary" or "example" means serving as a non-limiting example, instance, or illustration. As utilized herein, the term "e.g." introduces a list of one or more non-limiting examples, instances, or illustrations FIG. 1 is a block diagram of an exemplary system 10 in which a representative embodiment of the present invention may be practiced. As illustrated in FIG. 1, the system 10 includes one or more servers 11. The server(s) 11 may include, for example, cloud server(s), web server(s), database server(s), application server(s), and the like. The server(s) 11 may be interconnected, and may singly or as a group be connected to a network 12, such as the Internet, for example, via any suitable combination of wired or wireless data communication links. Certain embodiments provide that server(s) comprise one or more processing components and/or engines such as central processing units, microprocessors, microcontrollers, and/or the like. The processing components and/or engines may be integrated components, or may be distributed across various locations, for example. The processing components and/or engines may be capable of executing software applications, receiving media and other input information from one or more computing devices 13, processing the media and other input information, compiling the media and other input information, and outputting processed video streams to computing devices 13, among other things. The processing components and/or engines may be capable of executing any of the method(s) and/or set(s) of instructions discussed below in accordance with the present invention, for example. In certain embodiments, the processing components and/or engines may execute one or more video editing applications in response to media and other input information received from computing device(s) 13, for example.

FIG. 1 includes one or more computing devices 13, which are connected to the network 12 by any suitable combination of wired or wireless data communication links. Computing device(s) 13 may be any of, for example, a desktop computer, a laptop computer, a notebook computer, a netbook computer, a tablet computer, a mobile phone, a wearable mobile device like glasses, or any other electronic device having capabilities suitable for accessing the network 12. In various embodiments, the computing device(s) 13 includes user input device(s) 14, a display 15, a processor 16, and memory 17, among other things. Components of the computing device(s) 13 may be implemented in software, hardware, firmware, and/or the like. The various components of the computing device(s) 13 may be communicatively linked. Components of the computing device(s) 13 may be implemented separately and/or integrated in various forms. For example, the display 15 and the user input device(s) 14 may be integrated as a touchscreen display.

The user input device(s) 14 may include any device(s) capable of communicating information from a user and/or at the direction of the user to the processor 16 of the computing device 13, for example. The user input device(s) 14 may include button(s), a touchscreen, motion tracking, voice recognition, a mousing device, keyboard, camera and/or any other device capable of receiving a user directive. In certain embodiments, one or more of the user input devices 14 may be integrated into other components, such as the display 15, for example.

The display 15 may be any device capable of communicating visual information to a user. For example, a display 15 may include a liquid crystal display, a light emitting diode display, and/or any suitable display. The display 15 can be operable to display information from a video editing application, or any suitable information. In various embodiments, the display 15 may display information provided by the processor 16, for example.

The processor 16 may be one or more central processing units, microprocessors, microcontrollers, and/or the like. The processor 16 may be an integrated component, or may be distributed across various locations, for example. The processor 16 may be capable of executing software applications, receiving input information from user input device(s) 14, and generating an output displayable by a display 15, among other things. The processor 16 may be capable of executing any of the method(s) and/or set(s) of instructions discussed below in accordance with the present invention, for example. In certain embodiments, the processor 16 may execute one or more video editing applications available at server(s) 11 and/or stored at the computing device(s) 13 in response to user inputs received from user input device(s) 14, for example.

In various embodiments, the information provided by the user input device(s) 14 to the processor 16 may be processed by the processor 16 to control one or more applications for media uploading, media processing, media compiling, and video sharing, for example. As an example, button depressions, touchscreen selections, mousing inputs, keyboard inputs, and/or voice commands, among other things, may be received from the user input device(s) 14 and processed by the processor 16 to input media, process media, compile media, and/or share video streams, for example.

The memory 17 may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory 17 may include databases, libraries, sets of information, or other storage accessed by and/or incorporated with the processor 16, for example. The memory 17 may be able to store data temporarily or permanently, for example. The memory 17 may be capable of storing data generated by the processor 16 and/or instructions readable by the processor 16, among other things. In various embodiments, the memory 17 stores one or more software applications.

Figure 2:
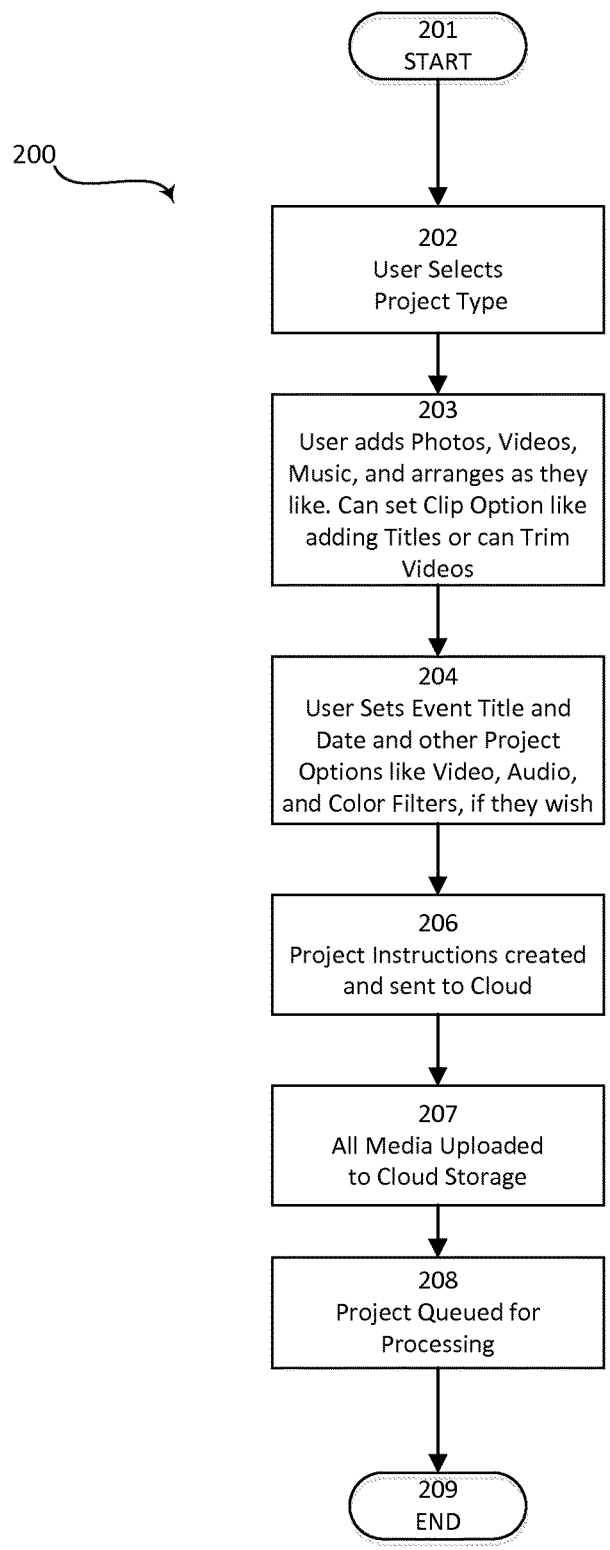
FIG. 2 is a flowchart illustrating an exemplary method for specifying a video editing project, in accordance with a representative embodiment of the present invention.

FIG. 2 is a flowchart illustrating an exemplary method 200 for specifying a video editing project, in accordance with a representative embodiment of the present invention. The actions of the method 200 of FIG. 2 may be performed using elements of the system 10 of FIG. 1 including, for example, the server(s) 11, network(s) 12, and/or computing device(s) 13 comprising user input device(s) 14, a display 15, a processor 16, and/or a memory 17. The system 10 may be arranged to support a creation application specifying a video editing project, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 200 for specifying the video editing project may be a Windows application, Mac application, web based application, mobile device (e.g., iOS, Android), or any suitable application for arranging and uploading pictures, videos, and music. The method 200 of FIG. 2 illustrates how the end user may organize media clips, add clip options like subtitles or trimming clips, and add main project options like the main event title and filters such as video and audio filters, for example. In various embodiments, the end user may use computing device 13 to upload the media to server(s) 11, which may include cloud storage, for example.

At step 201, the method of FIG. 2 is started. At step 202, a user may select a project type, such as beat sequence, flip, swivel, or slide sequence, image stack, or any suitable project type. In various embodiments, the project type selection may drive what a user can add or select during the process.

At step 203, a user may add and arrange media and set clip options, such as by adding titles or trimming video clips. For example, a user can add photos, videos, music, and/or the like. In various embodiments, media may be added by dragging and dropping, by clicking the "+" button and using a standard file dialog to find the media, or using any suitable selection mechanism. In certain embodiments, a user can arrange the media as desired with a user input device 14 such as a mousing device, or by selecting the item and using arrow buttons displayed on the display 15, for example. Video clips can be trimmed (removing the start and/or end of a video clip to shorten it). If a video clip is present, a trim link may be displayed. When selected, the trim link can display a trim popup that displays the video clip, and start and end sliders that can be color coded (e.g., green and red) so the user can easily distinguish between what is being kept and what is being trimmed.

At step 204, a user sets the event title and selects (or sets) an event date. The user may optionally select other projection options, such as adding video, audio, and/or color filters, among other things. For example, the user may select a video filter, such as old film (makes it look like 60/70's video), among other things. The user can optionally select a color filter (color grading), such as Super8, sepia, new film, or any suitable color filter. The color grading filters change vibrancy up or down, add grain, sharpen, and even slow down frame rate, for example. The user may optionally select an audio filter, such as vinyl noise or projector, for example. The user can optionally select convert to black and white, which will make the entire output grayscale black and white. Combining a black and white color filter with something like an old film video filter may take it from looking like 60/70's content, to looking like 1920's content, for example.

At step 205, a user may select to upload the project to the server 11. In response to the upload selection, project instructions are created, including a user authentication token, clip metadata, clip options like title, trim information, and overall project information like event title, event date, selected filters, and the like. The project instructions can be sent to server 11, such as via REST request, and parameters (e.g., cloud storage parameters) may be returned to the client. In various embodiments, the server 11 checks to see if the user has already uploaded any of the files, and returns only the remaining files needed to complete the upload.

At step 206, the media files related to the project can be uploaded to cloud storage or any suitable storage, for example. At step 207, after the project instructions and media are uploaded at steps 205 and 206, the project is queued for processing. At step 208, the method of FIG. 2 ends.

Figure 3:
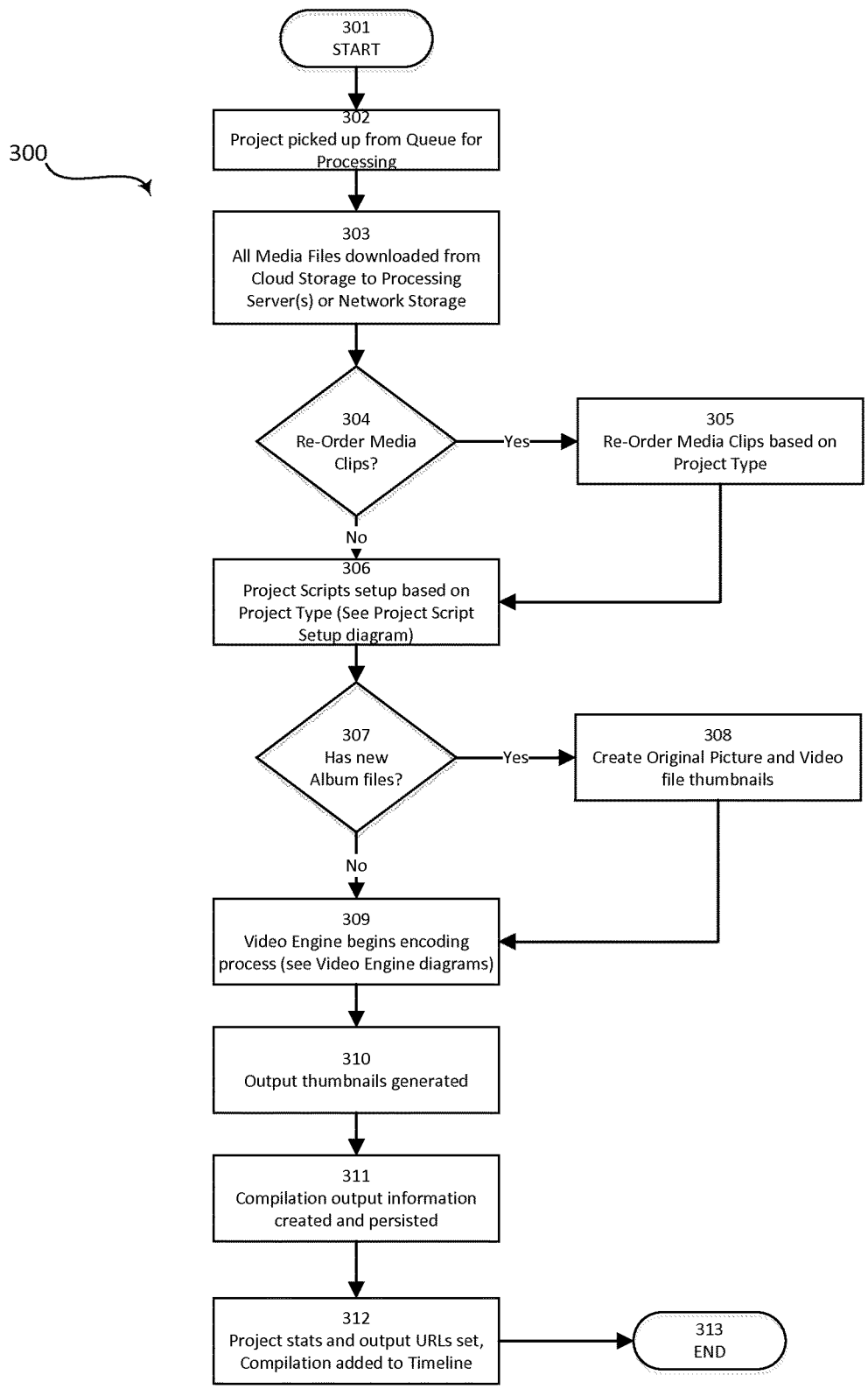
FIG. 3 is a flowchart illustrating an exemplary method for performing a video editing project, in accordance with a representative embodiment of the present invention.

FIG. 3 is a flowchart illustrating an exemplary method 300 for performing a video editing project, in accordance with a representative embodiment of the present invention. The actions of the method 300 of FIG. 3 may be performed using elements of the system 10 of FIG. 1 including, for example, the server(s) 11. The system 10 may be arranged to support performing a video editing project, for example. Certain embodiments of the present invention may omit one or more of the actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 3, the method 300 for performing the video editing project is the high level process of service methods that take projects from the queue, set up the projects for processing, and call the main video engine as described below in connection with FIGS. 9-21, for example. In various embodiments, the method 300 for performing the video editing project is responsible for project setup, calling the video engine (which compiles the media based on the project type and uploaded instructions), creating the final video output, creating metadata about projects, creating compilation entity data after the video engine completes, and creating thumbnails, among other things, for example.

The method begins at step 301. At step 302, a next available "ready for processing" project is picked up from the queue and its status is set to locking, then processing, for example. At step 303, the media clips are downloaded from storage, such as cloud storage, to processing server(s) or network storage. In certain embodiments, if a user had selected files that were already uploaded, and the files were skipped during the upload process (so the file is stored once and the upload process speed is increased), these files may still be download during this step. At step 304, the processing server determines whether clips should be re-ordered and/or re-numbered based on the project type (e.g., a beat sequence project type). At step 305, if the processing server determines that the clips should be re-ordered and/or re-numbered, the re-ordering/re-numbering operation is performed.

At step 306, project scripts may be setup based on the project type. For example, a main encoding script can be created based on the project type as described below in connection with FIG. 4 (main script) and FIGS. 5-8 (exemplary project type scripts). At step 307, the processing server determines whether the project has a new album (new files that have not been uploaded before). Albums are created for new media files uploaded. In many cases, files will be new, but there may be a few media files that the user already uploaded, that would be a part of an old album, for example. Typically, there will be a new album because at least some files will be new. As discussed in more detail below at step 8, thumbnails are created for new clips when a new album is being created, for example.

At step 308, the processing server creates large and normal sized thumbnails of the original picture and video files if the project has a new album. In various embodiments, the created thumbnails may be used for a picture viewer, and for album selection and album content detail in a cloud mixer. For example, the thumbnails may be used so a user can later select and work with their uploaded media. As another example, large thumbnails can be used so that the output shared by a user may be viewed as a picture slide show with the picture viewer.

At step 309, the video engine begins encoding the media based on the created project script as illustrated in FIGS. 9-21 and discussed in more detail below. At step 309, the final video output that may be uploaded to, for example, cloud storage and viewed by end users is created. After encoding is complete at step 309, standard sized thumbnails may be created for the main video thumbnails, for example, and small and spliced small thumbnails can be created for main wall image rain, for example, at step 310. After successful project completion, a compilation entity is created and persisted in a data repository at step 311. The compilation entity may comprise, for example, a compilation title, date, thumbnail URLs, video URLs, user full name, and other metadata about the compilation.

At step 312, project and compilation output metadata, such as file total bytes, total processing time, and/or any suitable stats, are stored with the project and compilations entities, and persisted. In various embodiments, the compilation entity can then be added to a user timeline and, if public, to a main video wall of the socially interactive application. The method 300 ends at step 313.

Figure 4:
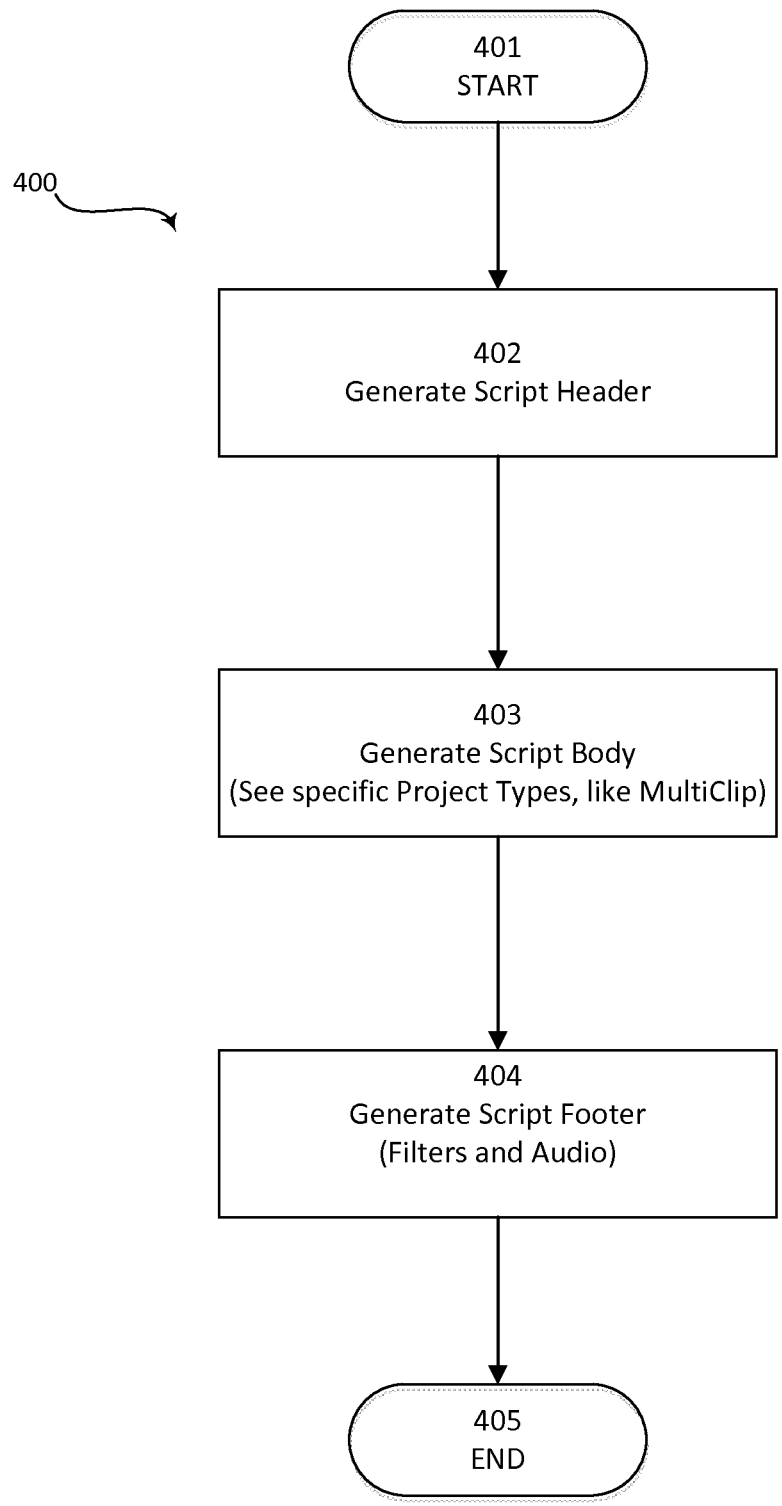
FIG. 4 is a flowchart illustrating an exemplary method for generating video engine project instructions, in accordance with a representative embodiment of the present invention.

FIG. 4 is a flowchart illustrating an exemplary method 400 for generating video engine project instructions, in accordance with a representative embodiment of the present invention. In various embodiments, method 400 may be performed at step 306 of FIG. 3. The actions of the method of FIG. 4 may be performed using elements of the system 10 of FIG. 1 including, for example, the server(s) 11. The system 10 may be arranged to support the generation of video engine project instructions such as scripts, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 400 begins at step 401. At step 402, a script header is generated. The script header comprises a preset, which may be the theme, font, and/or caching and multithreading core count instructions, for example. These settings can be used by subsequent video engine function calls, for example, as described in detail below.

At step 403, a main script body is generated based on a project type. Examples of project types can include a multi-clip project (as described in FIG. 7), single clip project (as described in FIG. 8), image stack project (as described in FIG. 6), and the like.

At step 404, a script footer is generated. Script footers may comprise references to video filters (e.g., FIG. 25), color filters (grading) (e.g., FIGS. 26-27), audio filters (e.g., FIGS. 28-29), and setting to black and white, among other things. If music has been added, the music may be mixed with the compilation, ducking with video audio, as well as fading in and out (e.g., FIGS. 22-24), among other things. Below are examples of filters, backgrounds, and music, for example:

A grayscale function call may be added to the script footer if a black and white filter was selected.

Figure 26:
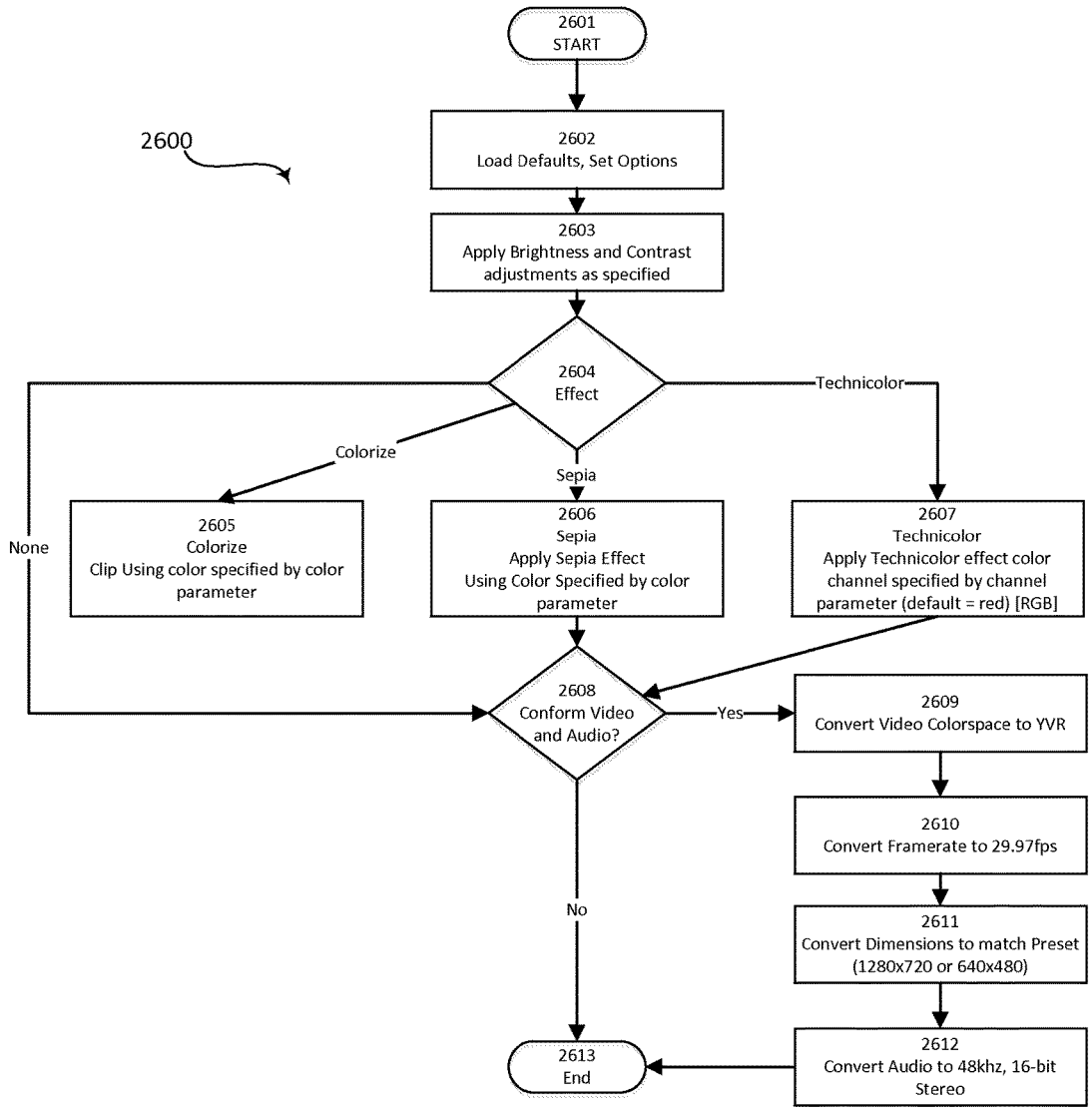
FIG. 26 is a flowchart illustrating an exemplary method for color filtering a video output, in accordance with a representative embodiment of the present invention.
Figure 27:
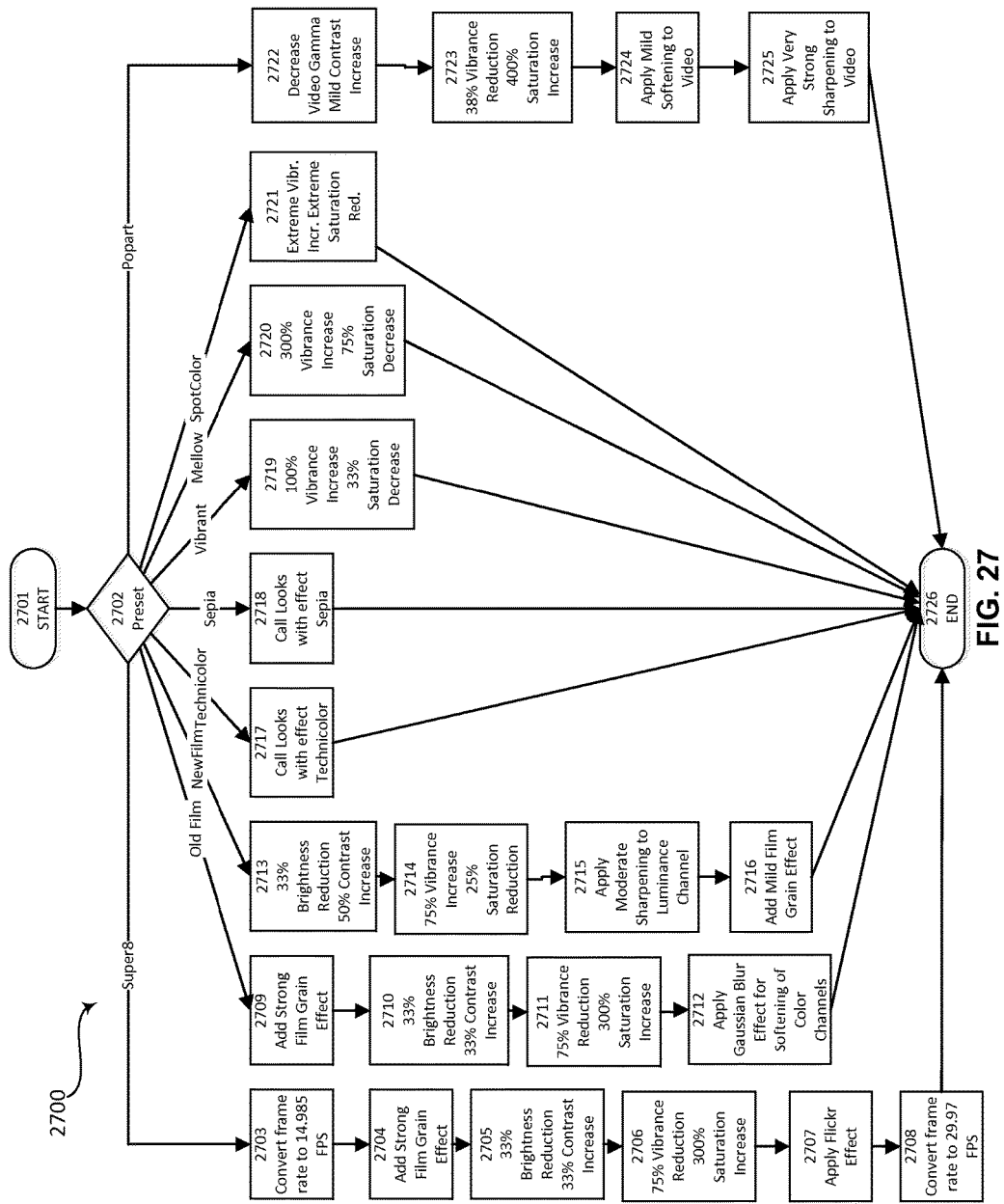
FIG. 27 is a flowchart illustrating an exemplary method for color filtering a video output, in accordance with a representative embodiment of the present invention.

A color filter function call, as illustrated in FIGS. 26-27 and described below, may be added to the script footer if a color filter, such as Super 8, Technicolor, etc., was selected.

Figure 25:
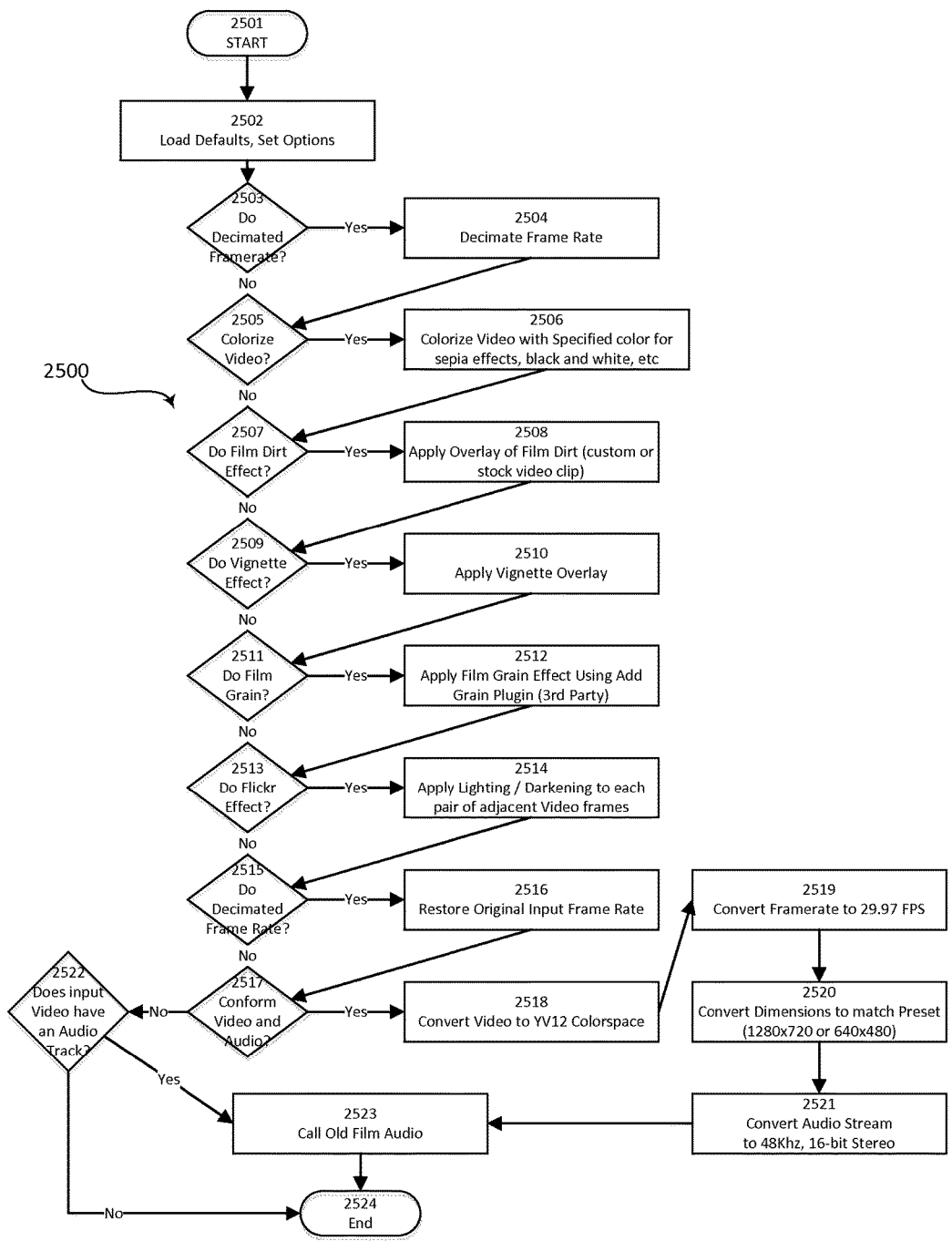
FIG. 25 is a flowchart illustrating an exemplary method for filtering and providing an overlay to a video output, in accordance with a representative embodiment of the present invention.

A video filter function call, as illustrated in FIG. 25 and described below, may be added to the script footer if a video filter, such as old film, among other things, was selected.

Figure 22:
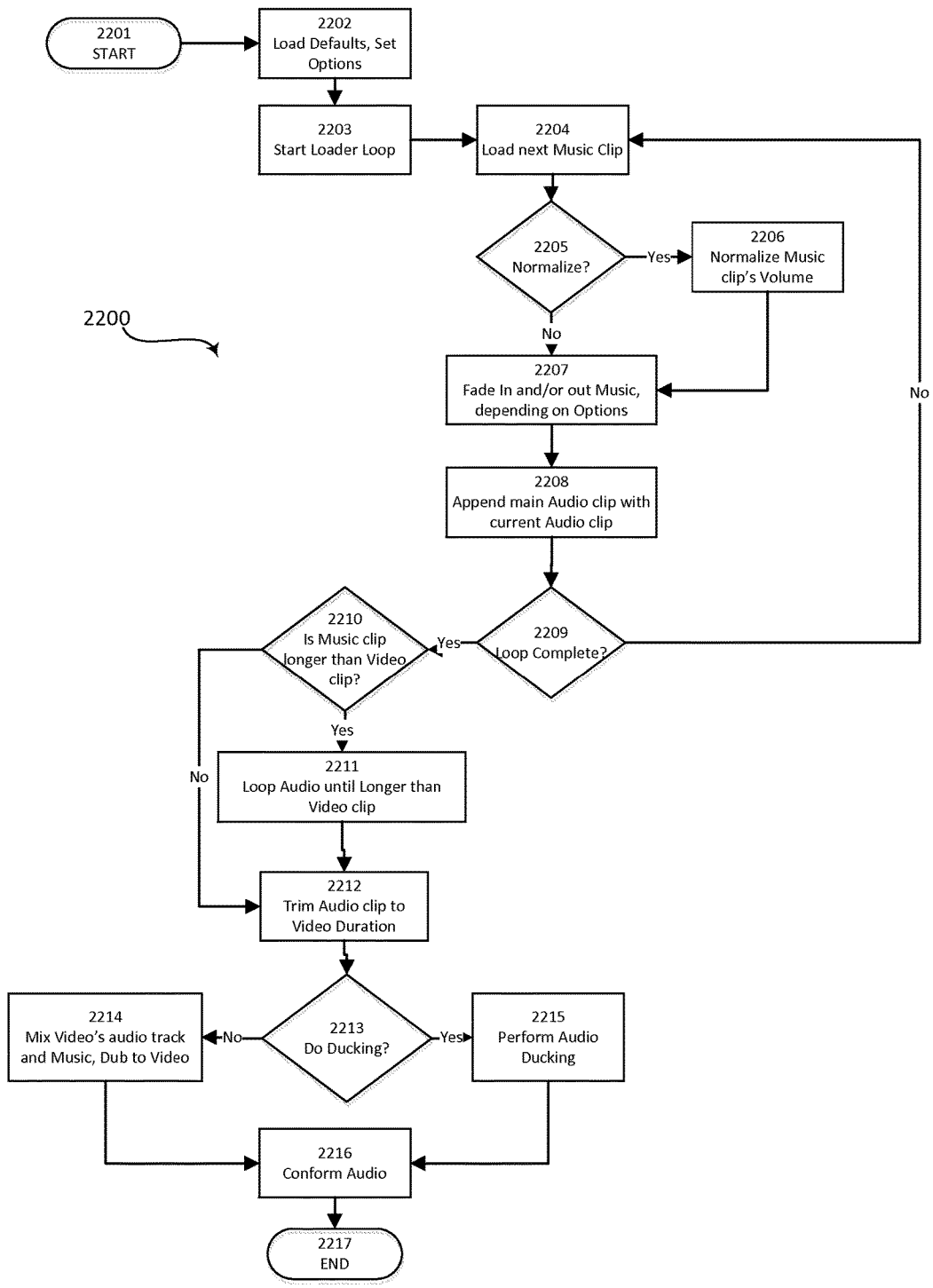
FIG. 22 is a flowchart illustrating an exemplary method for editing and mixing one or more music files with a video output, in accordance with a representative embodiment of the present invention.
Figure 23:
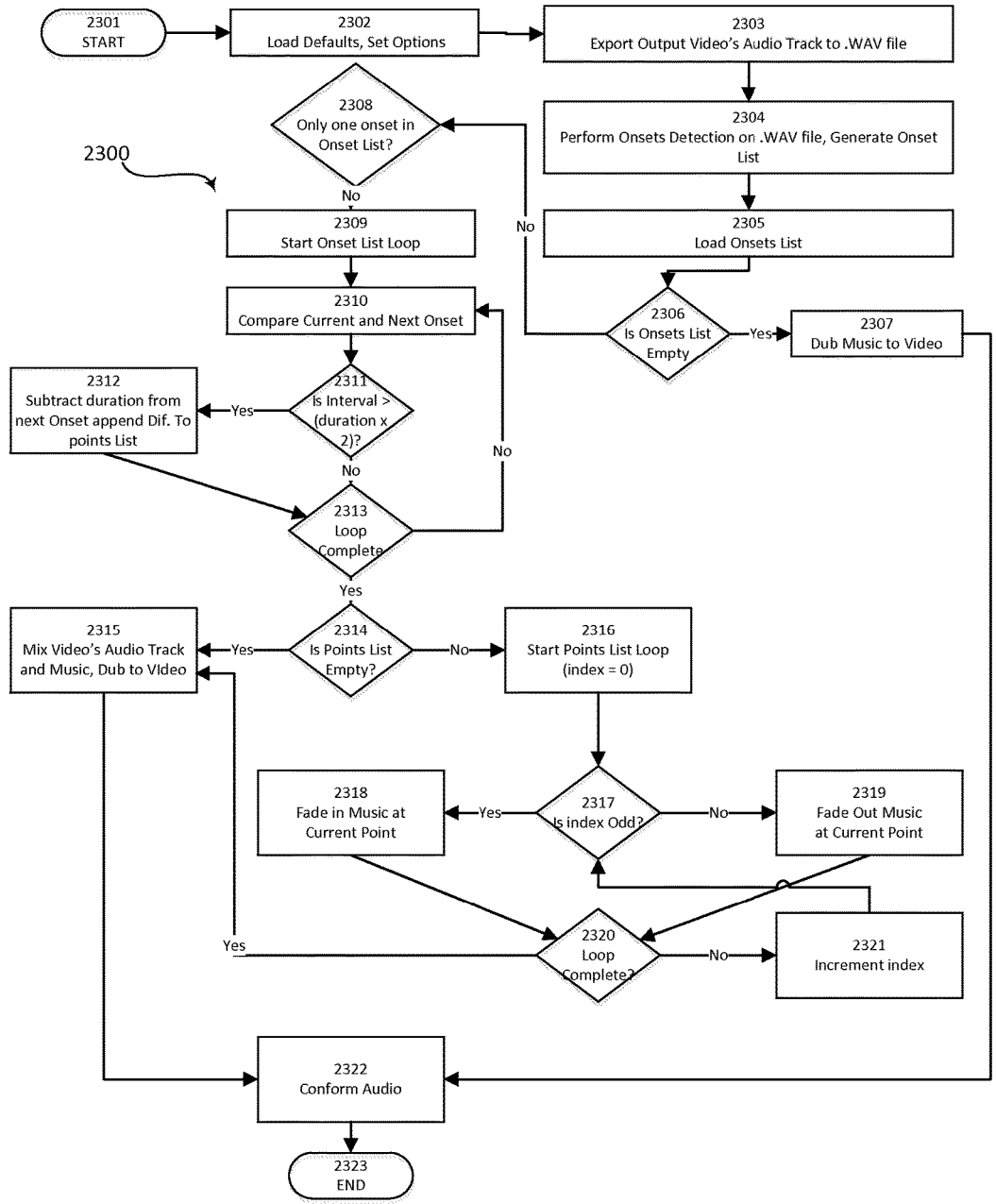
FIG. 23 is a flowchart illustrating an exemplary method for audio ducking in the method of FIGS. 22 and/or 24, in accordance with a representative embodiment of the present invention.
Figure 24:
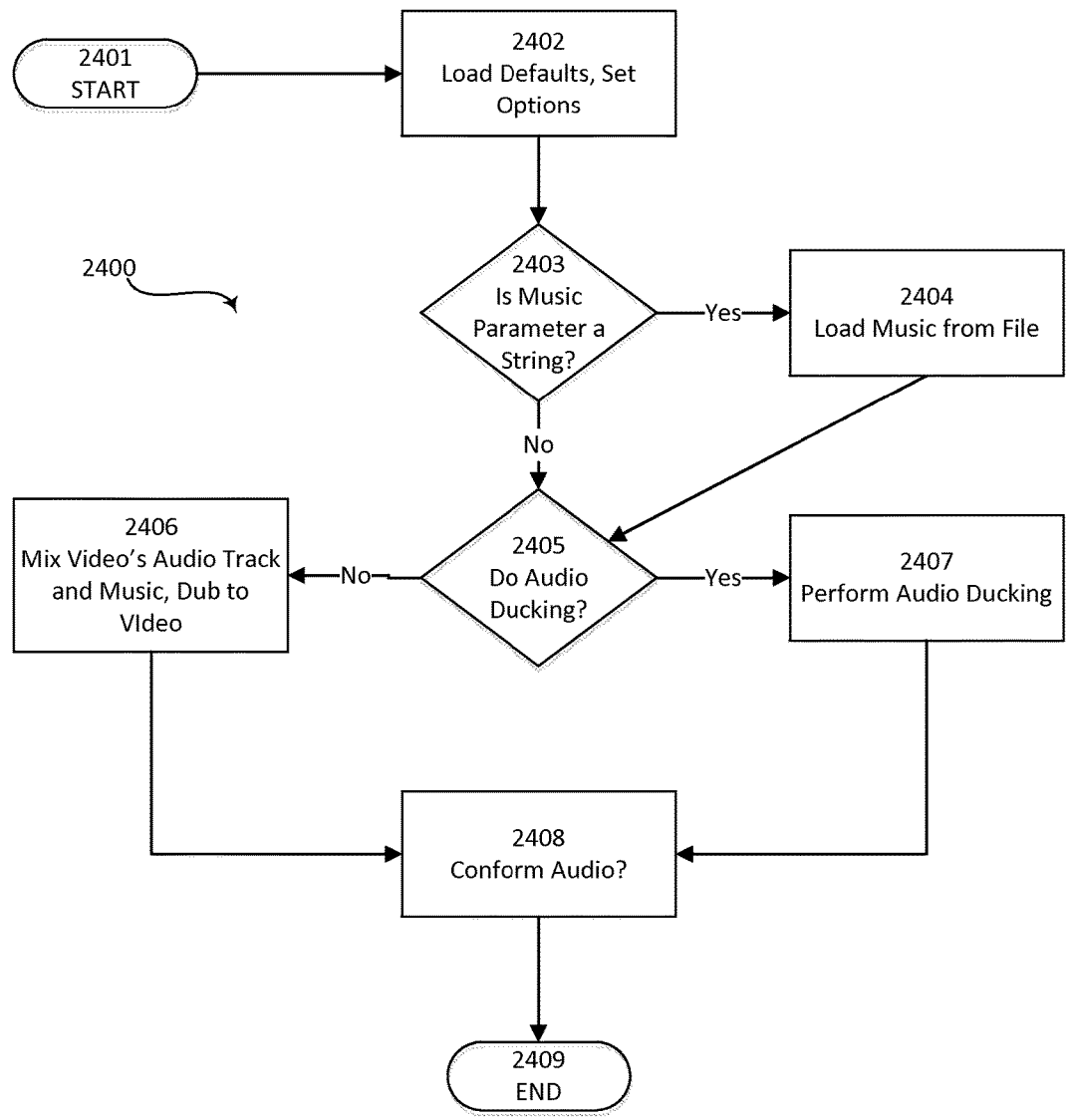
FIG. 24 is a flowchart illustrating an exemplary method for editing and mixing a music file with a video output, in accordance with a representative embodiment of the present invention.

An audio mixer function call, as illustrated in FIGS. 22-24 and described below, may be added to the script footer if music was added to the project and the project type does not have special audio settings, such as the beat sequence or silent movie project types described below. For example, the audio mixer may mix the music with the video output, "ducking" when video audio is present, repeating music clips to match video output length, or trimming music audio to match video output length. The audio mixer can also fade music audio in and out at the beginning and end of video output, between different music clips and before and after audio ducking when video audio is present, for example. The audio mixer may seamlessly mix music audio with video output. In various embodiments, music is handled differently for specific projects types, such as beat sequence and silent movie project types, for example.

Figure 28:
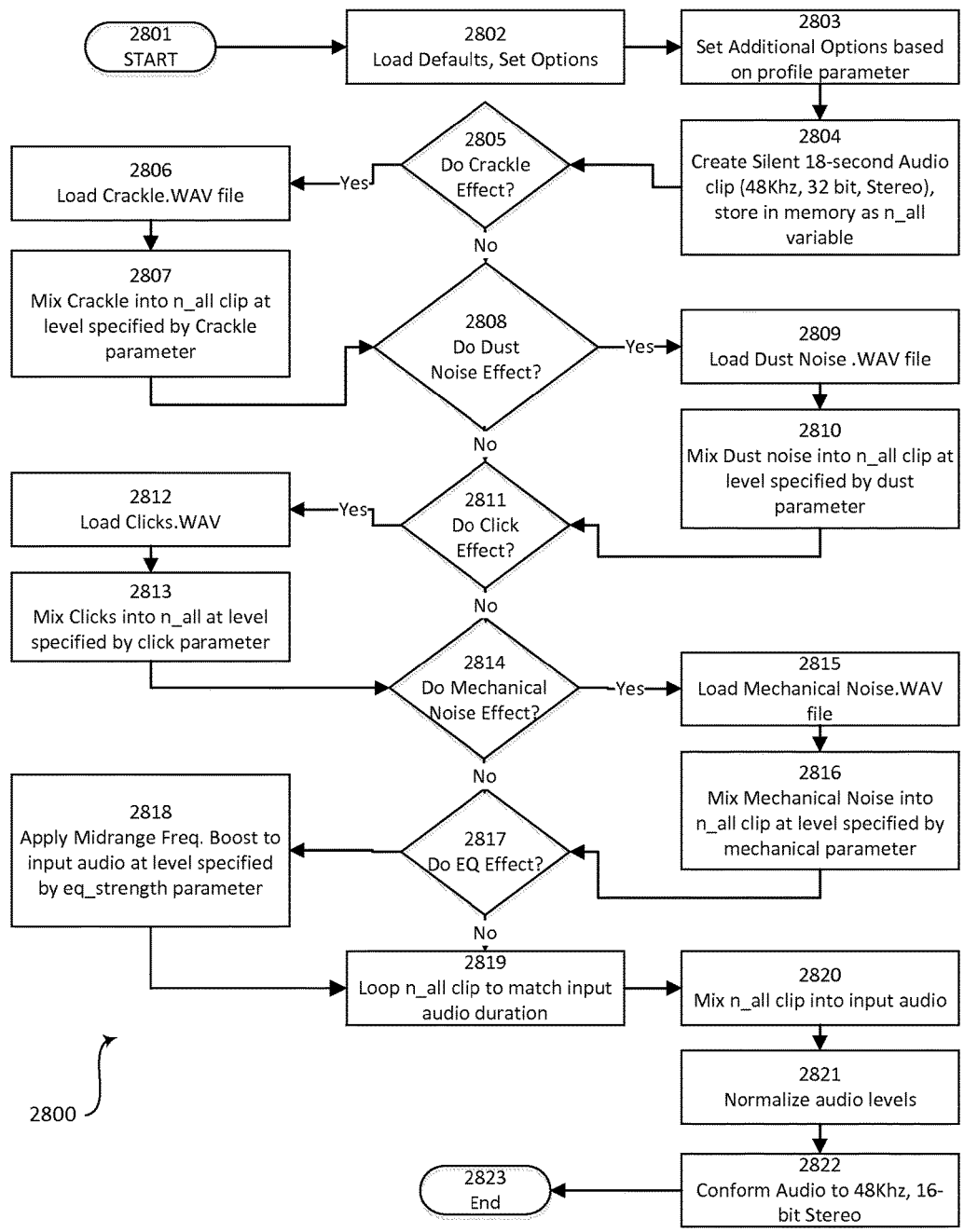
FIG. 28 is a flowchart illustrating an exemplary method for applying a vinyl noise audio filter to a video output, in accordance with a representative embodiment of the present invention.
Figure 29:
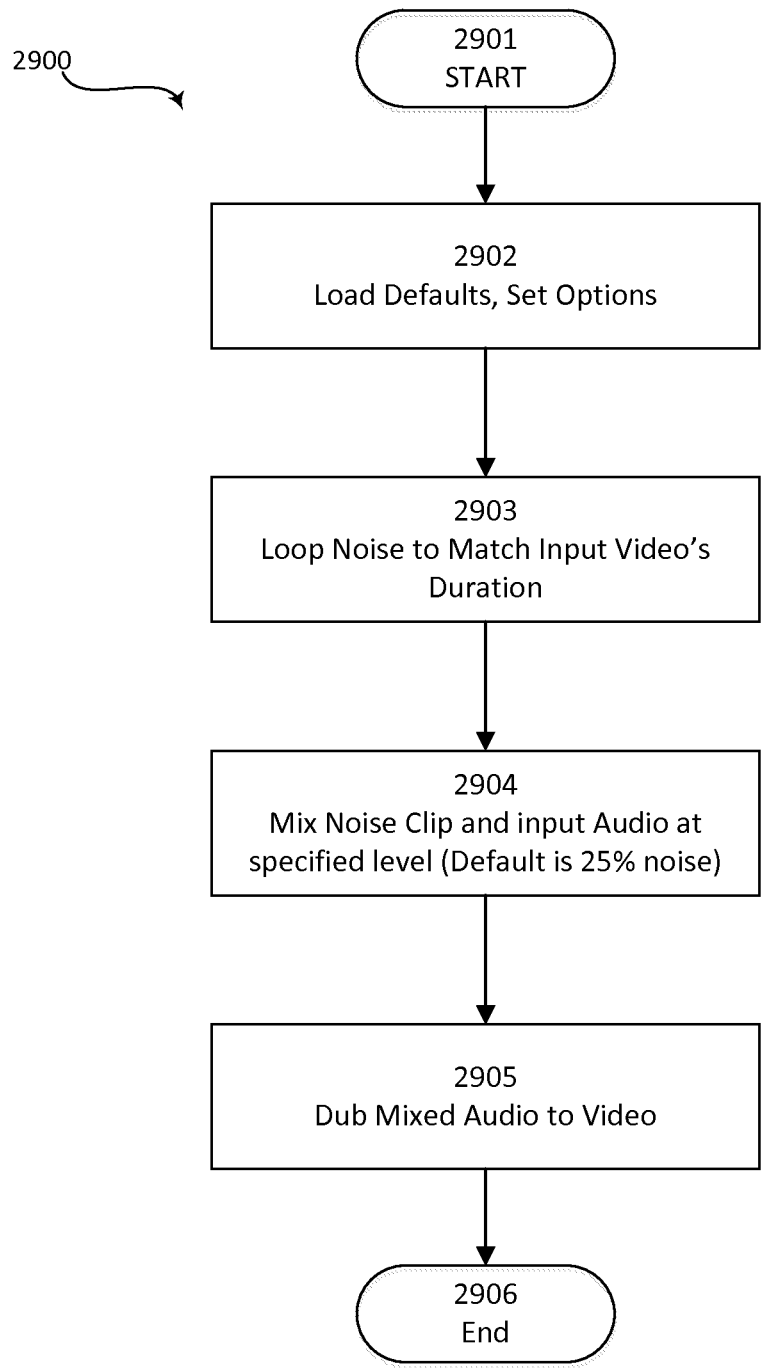
FIG. 29 is a flowchart illustrating an exemplary method for applying a projector noise audio filter to a video output, in accordance with a representative embodiment of the present invention.

An audio filter function call, as illustrated in FIGS. 28-29 and described below, may be added to the script footer if an audio filter, like vinyl noise or projector, was selected.

The method 400 ends at step 405.

Figure 5:
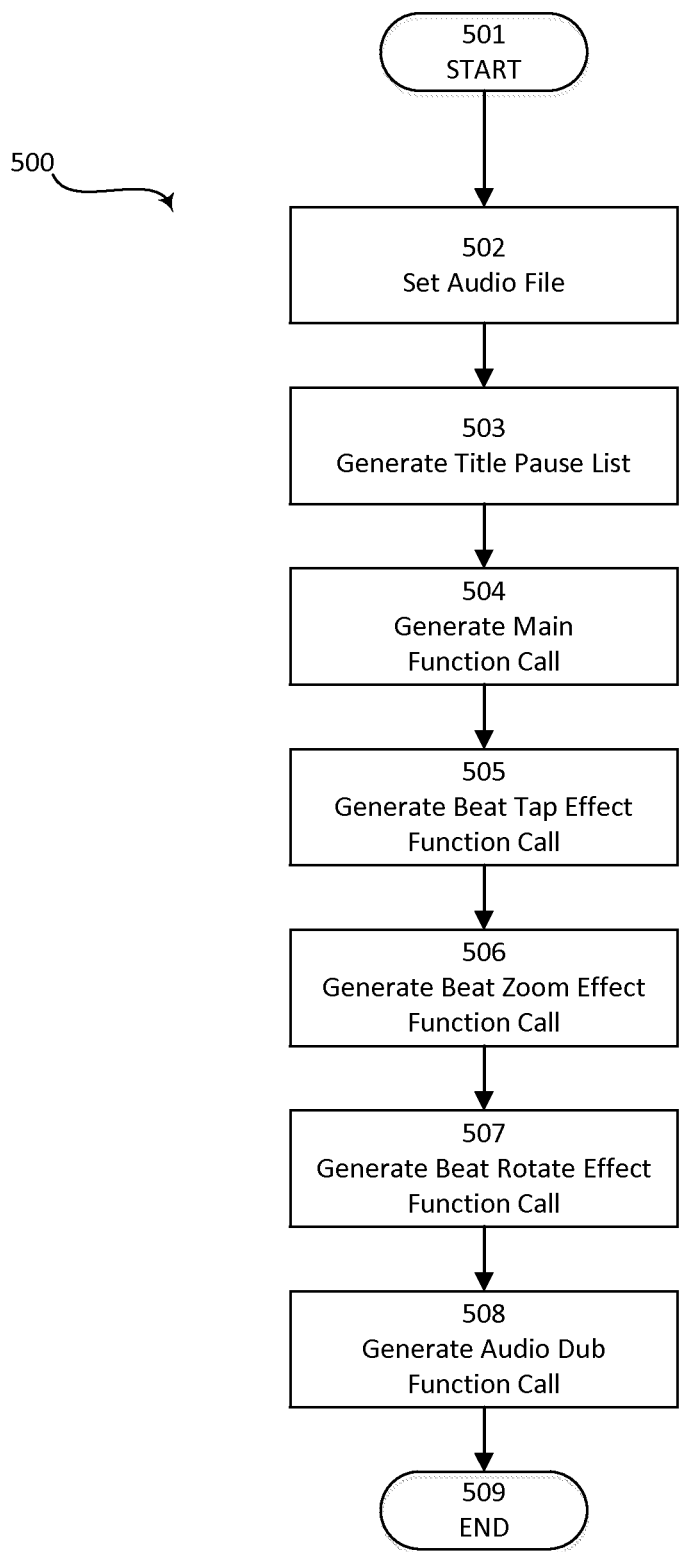
FIG. 5 is a flowchart illustrating an exemplary method for generating video engine project instructions for a beat sequence video editing project, in accordance with a representative embodiment of the present invention.

FIG. 5 is a flowchart illustrating an exemplary method 500 for generating video engine project instructions for a beat sequence video editing project, in accordance with a representative embodiment of the present invention. A beat sequence video editing project may, for example, add special effects to the images or video of a clip based at least in part on the beat or tempo of music in the clip as described below. The actions of the method of FIG. 5 may be performed using elements of the system 10 of FIG. 1 including, for example, the server(s) 11. The system 10 may be arranged to support the generation of beat sequence video editing project instructions that may be included in the main script body discussed above with regard to FIG. 4, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 500 begins at step 501. At step 502, an audio filename input line may be set. At step 503, a title pause list may be generated. For example, an image title can be matched with image filenames that may be specifically generated for the beat sequence project, and a numeric pause list may be generated based on an image filename number, along with the title. In various embodiments, although clips usually move quickly to the tempo of the music, titles are paused so the clip title can be read, for example. When a clip is paused, beat effects that move to the music are maintained for the clip. A next clip is transitioned to once the pause duration has been met, for example. In various embodiments, the pause duration, such as 4 seconds, is configurable.

Figure 15:
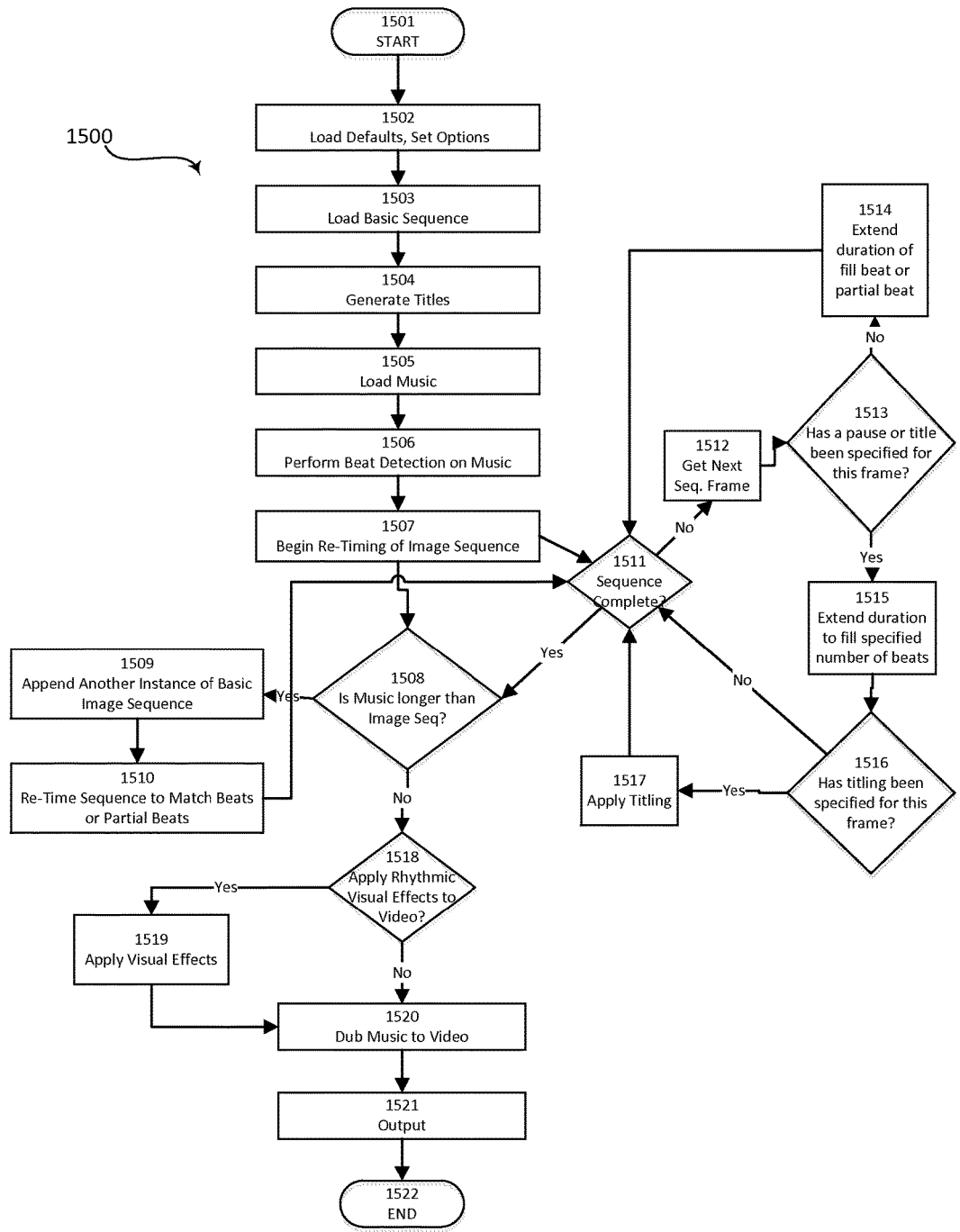
FIG. 15 is a flowchart illustrating an exemplary method for processing video for a beat sequence video editing project, in accordance with a representative embodiment of the present invention.

At step 504, a main beat sequence function call may be generated as illustrated in FIG. 15 and described below. At step 505, a function call for a beat tap effect may be added. The beat tap effect can be based on an audio track, for example. The beat tap effect symbolizes the beat of the music, making the clip look like it has been "tapped" or hit with a drum stick to symbolize the beat, for example. In various embodiments, the clip may be indented, revealing a border around it, and then snap back.

At step 506, a function call for a beat zoom effect may be added. The beat zoom effect can be based on an audio track, for example. The beat zoom effect can zoom into or out of an image to the beat of the music. In contrast to the beat tap effect, the clip may not be indented to reveal the border. Instead, the beat zoom effect may zoom into and out of the clip, for example. At step 507, a function call for a beat rotate effect may be added. The beat rotate effect can be based on an audio track, for example. The beat rotate effect rotates the clip left or right to the beat of the music. At step 508, an audio dub function call may be added. The audio dub function can dub music over a compilation, for example. The method 500 ends at step 509.

Figure 6:
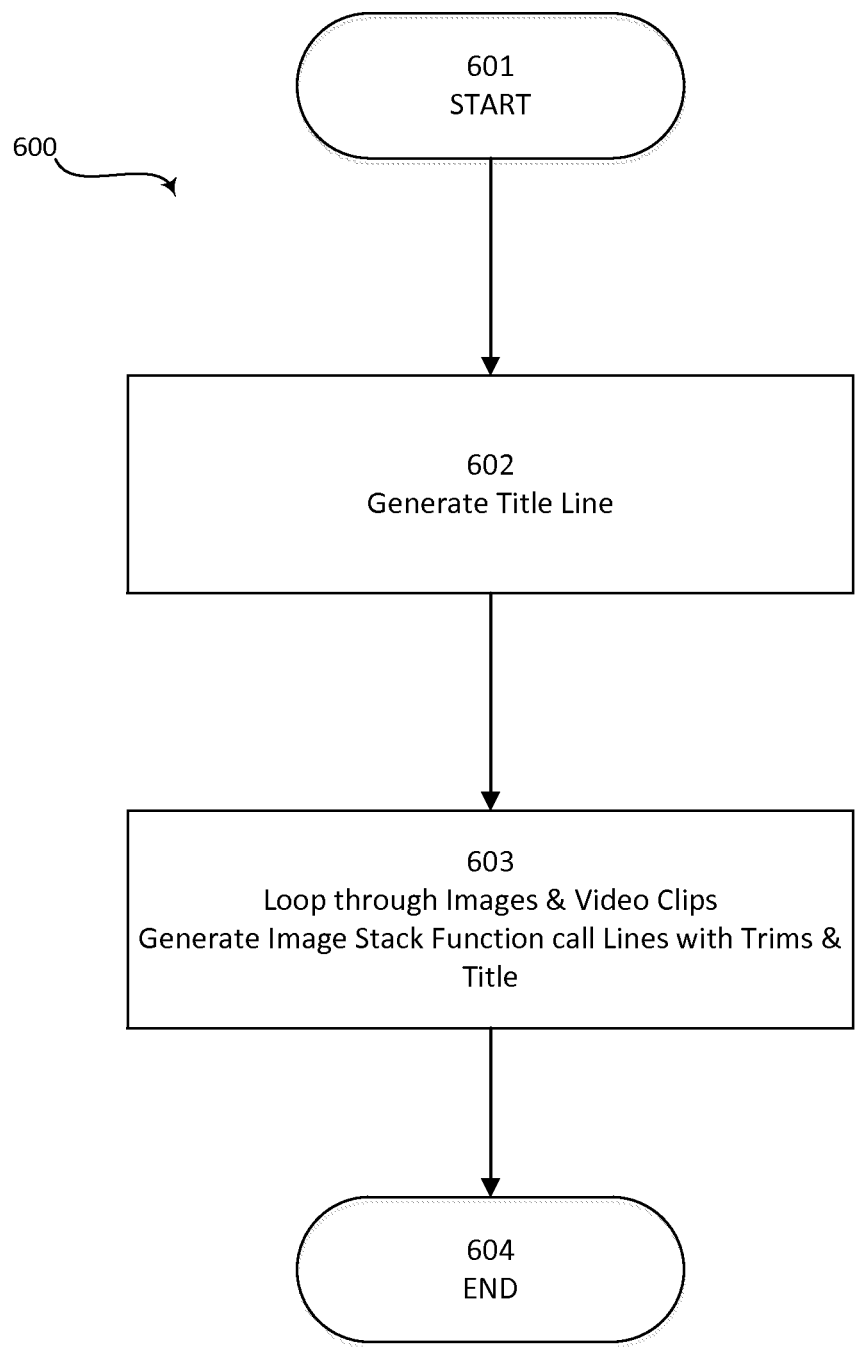
FIG. 6 is a flowchart illustrating an exemplary method for generating video engine project instructions for an image stack video editing project, in accordance with a representative embodiment of the present invention.

FIG. 6 is a flowchart illustrating an exemplary method 600 for generating video engine project instructions for an image stack video editing project, in accordance with a representative embodiment of the present invention. The actions of the method 600 of FIG. 6 may be performed using elements of the system 10 of FIG. 1 including, for example, the server(s) 11. The system 10 may be arranged to support the generation of image stack video editing project instructions that may be included in the main script body discussed above with regard to FIG. 4, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 600 for generating video engine project instructions for an image stack video editing project begins at step 601. At step 602, a title line (e.g., an event title and date) can be generated for later use in a main function call. The title may be placed on a blank stack card, for example, such that the project event title is placed at the beginning of the output video. At step 603, the processing server may loop through images and video clips, generating image stack function calls for every n clips (image or video file), where n is a configurable number, such as 8, for example. The processing server can add titles, which may be drawn on the bottom of a stack card in marker font, and video trims (if they exist), for example. The method 600 ends at step 604.

Figure 7:
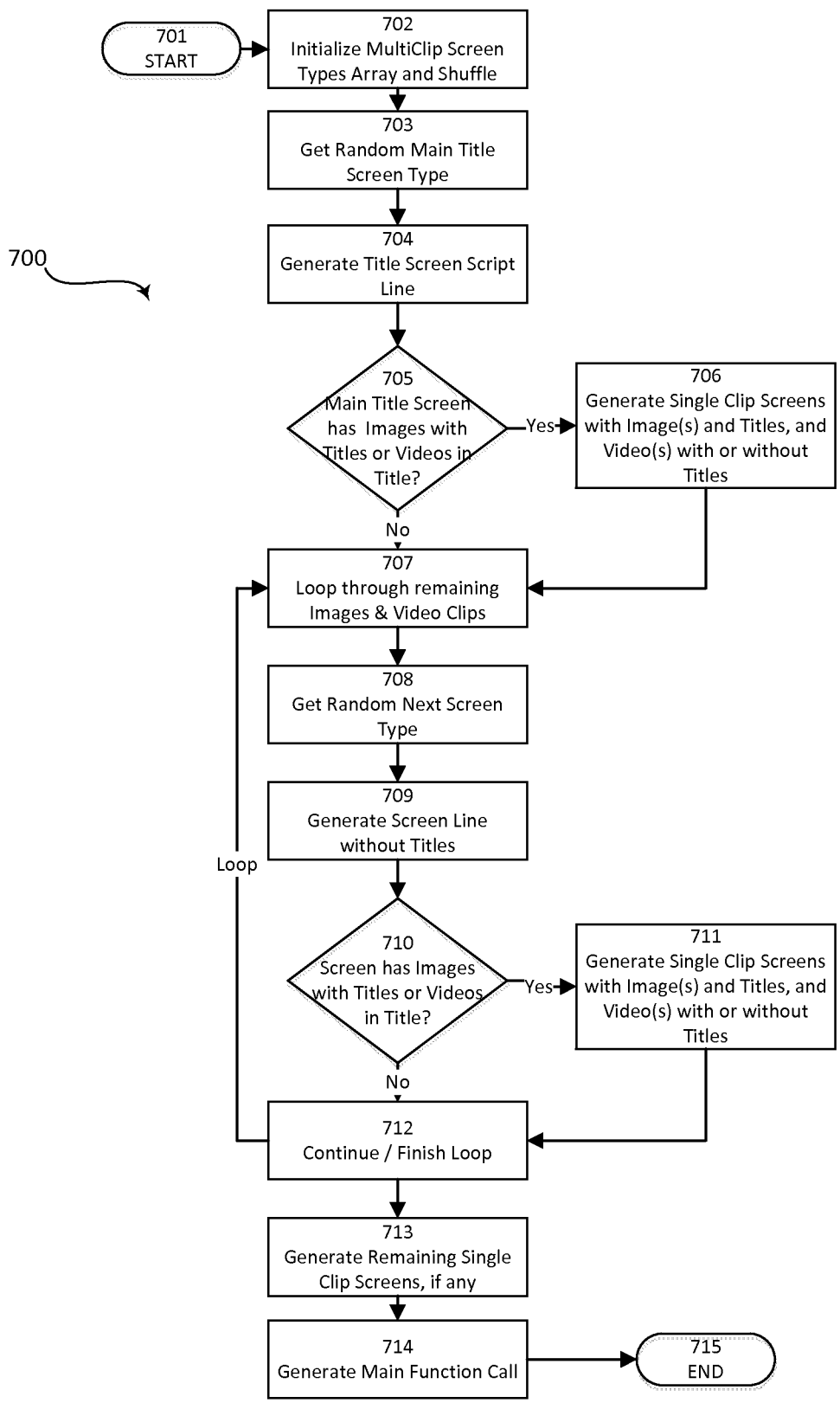
FIG. 7 is a flowchart illustrating an exemplary method for generating video engine project instructions for a multi-clip sequence video editing project, in accordance with a representative embodiment of the present invention.

FIG. 7 is a flowchart illustrating an exemplary method 700 for generating video engine project instructions for a multi-clip sequence video editing project, in accordance with a representative embodiment of the present invention. The actions of the method 700 of FIG. 7 may be performed using elements of the system 10 of FIG. 1 including, for example, the server(s) 11. The system 10 may be arranged to support the generation of multi-clip sequence video editing project instructions that may be included in the main script body discussed above with regard to FIG. 4, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Figure 17:
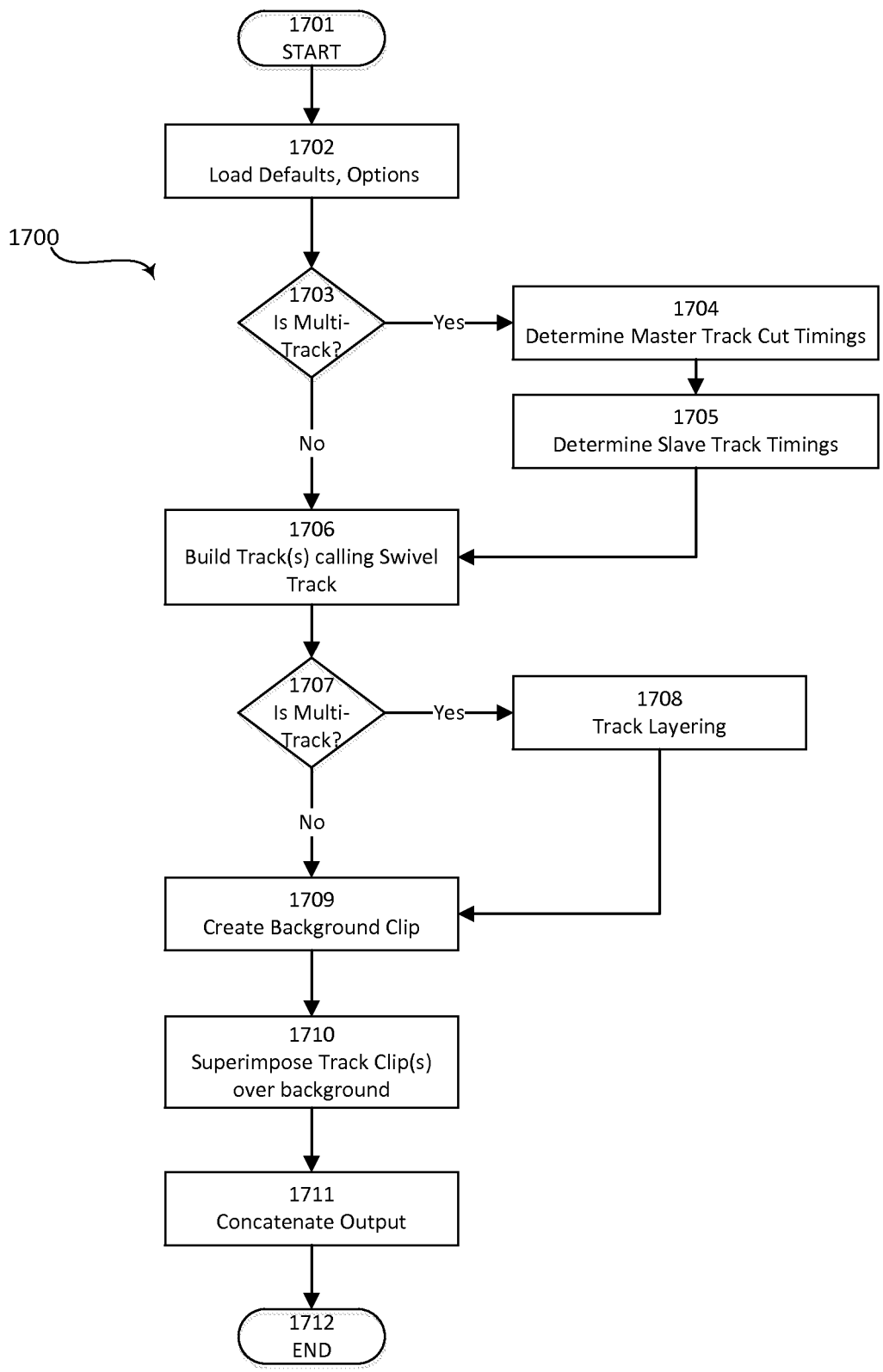
FIG. 17 is a flowchart illustrating an exemplary method for processing video for a swivel or flip multi-clip sequence video editing project, in accordance with a representative embodiment of the present invention.
Figure 20:
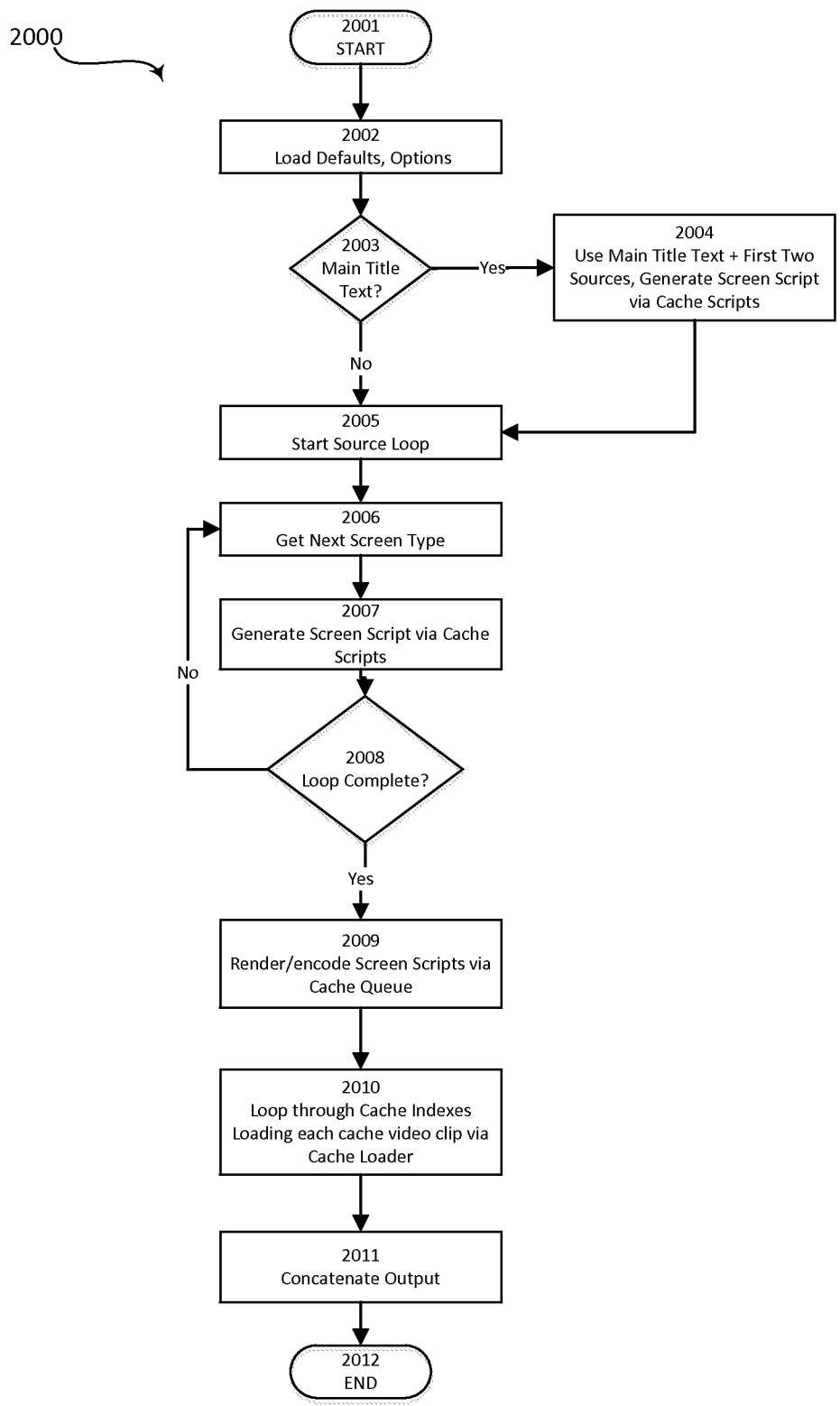
FIG. 20 is a flowchart illustrating an exemplary method for processing video for a slide multi-clip sequence video editing project, in accordance with a representative embodiment of the present invention.

Referring to FIG. 7, the method 700 for generating video engine project instructions for a multi-clip sequence video editing project may be used for projects with multi-clip screens, such as a slide sequence as illustrated in FIG. 20 and described below, a flip sequence as illustrated in FIG. 17 and described below, and a swivel sequence as illustrated in FIG. 17 and described below, for example. The multi-clip sequence video editing project types can have screens that have multiple (e.g., 2-5) image and/or video clips on the screen at once, as well as single clip screens for images with titles or videos, for example. In various embodiments, images with titles or videos may be a part of a multi-clip screen, but can be displayed after the multi-clip screen on a single screen so the title can be displayed, or the video can be played in its entirety, for example.

The method 700 begins at step 701. At step 702, an array of flip/swivel multi-clip source lists or slide multi-clip source lists may be initialized. In various embodiments, the multi-clip source lists have how many clips are in the multi-clip screen (such as 3, 4, or 5, for example), and what position each of the clips is in on the screen. The arrays may then be shuffled so that when subsequent multi-clip screens are taken, the screens are randomized so that even if the same content is re-processed, the output is different. For example, the order of the users clips may not change from a per screen perspective, but the selection of how many clips are on a multi-clip screen and where the clips are placed on the screen is random such that even if the same clips are used, each output is different.

At step 703, a random main title screen type may be selected. For example, a next random multi-clip source list shuffled in above at step 702 can be selected based on a remaining clip count. If there are no remaining multi-clip source lists, the array can be re-initialized, shuffled, and one of the array can be selected. At step 704, a title screen script line is generated. The title screen script line can be an event title and date line generated with two clips (images or videos), for example. In various embodiments, if either of the two clips, for example, has subtitles, the subtitles are not displayed on this main title screen, but are displayed at step 706 as described below.

At step 705, a processing server can determine whether the clips in the main title screen have an image with a subtitle, or a video. At step 706, if the main title screen has images with subtitles, or videos in the title, a single screen for each image with a subtitle and video is generated, which allows an "important" clip to be seen in its entirety on a single screen instead of on a multi-clip screen, for example. In various embodiments, the generation of the single clip screens may include generating trim line if the video was trimmed.

At steps 707-712, a loop of the remaining images and video clips is performed. At step 708, a multi-clip source list is retrieved based on remaining clip count. If there are no remaining multi-clip source lists, the multi-clip source lists array is re-initialize and the next random multi-clip source list is retrieved. At step 709, a multi-clip screen without clip subtitles is generated. The subtitles are generated when the clip is displayed on a single screen as described below at step 711. At step 710, a processing server may determine whether the generated multi-clip screen has images with subtitles, or videos in the title. At step 711, if the screen has images with subtitles, or videos in the title, a single screen for each image with a subtitle and video is generated, which allows an "important" clip to be seen in its entirety on a single screen instead of on a multi-clip screen, for example. This may also include generating trim line if the video was trimmed. At step 712, the loop 707-711 is repeated for any remaining images or videos.

At step 713, if there are remaining clips that cannot make up the next multi-clip screen (e.g., if at least three clips are needed but there are only two clips left), single clip lines can be generated to display the last clips. In various embodiments, titles (subtitles) and trim lines may be added as discussed above, for example. At step 714, a main function call (e.g., a slide sequence as illustrated in FIG. 20 and described below, a flip sequence as illustrated in FIG. 17 and described below, or a swivel sequence as illustrated in FIG. 17 and described below) with the above main title, multi-clip, and single screen lines is generated. The method 700 ends at step 715.

Figure 8:
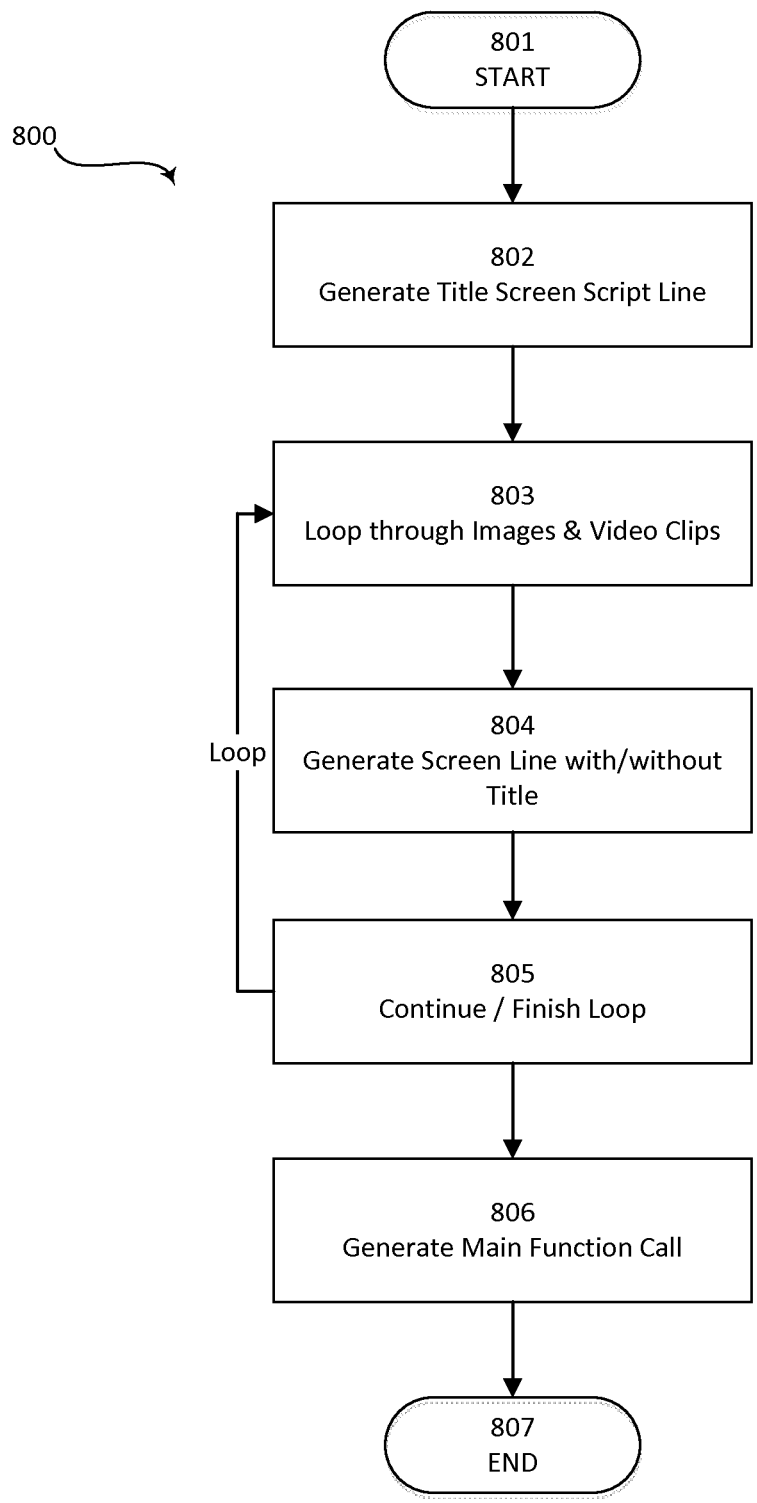
FIG. 8 is a flowchart illustrating an exemplary method for generating video engine project instructions for a single clip sequence video editing project, in accordance with a representative embodiment of the present invention.

FIG. 8 is a flowchart illustrating an exemplary method 800 for generating video engine project instructions for a single clip sequence video editing project, in accordance with a representative embodiment of the present invention. The actions of the method 800 of FIG. 8 may be performed using elements of the system 10 of FIG. 1 including, for example, the server(s) 11. The system 10 may be arranged to support the generation of single clip sequence video editing project instructions that may be included in the main script body discussed above with regard to FIG. 4, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 8, a method 800 for generating video engine project instructions for a single clip sequence video editing project may be used for projects with single clip screens, such as a focus and silent movie projects, for example. In various embodiments, the single clip screens can have a title (subtitle) and the videos can be trimmed. The method 800 begins at step 801. At step 802, a title screen script line that may include an event title and date, for example, is generated for later use.

At steps 803-805, a loop of the images and video clips is performed. At step 804, a single clip screen is generated. The single clip screen may comprise a subtitle if the clip included a title. The single clip screen can comprise a video trim line if the clip is a video that was trimmed. At step 805, the loop 803-805 is repeated for any remaining images or videos.

At step 806, a main function call is generated with the above main title and single screen lines. For example, a main function call for a focus project, silent movie project, or any suitable project can be generated. The method 800 ends at step 807.

FIGS. 9-21 below illustrate main video engine workflows and descriptions. At a high level, the main video engine comprises the executables and script code described below. The video engine may comprise external function calls and executables. In various embodiments, the project scripts described above may call video engine external functions. A preset header function call may comprise parameters to set if caching should be used, and how many threads should be used. For example, a preset header may tell the subsequent functions (e.g., image stack, etc.) to use the cache and threads executables described below. Once the project scripts are created, an encoding tool, such as x264.exe, may be called with the project script. The encoding tool can generate the output, such as an MPEG4 output. If audio is present (either from video clips or from music files), the audio may be multiplexed with the MPEG4 for the final video output that is viewed at the socially interactive application, for example.

Figure 9:
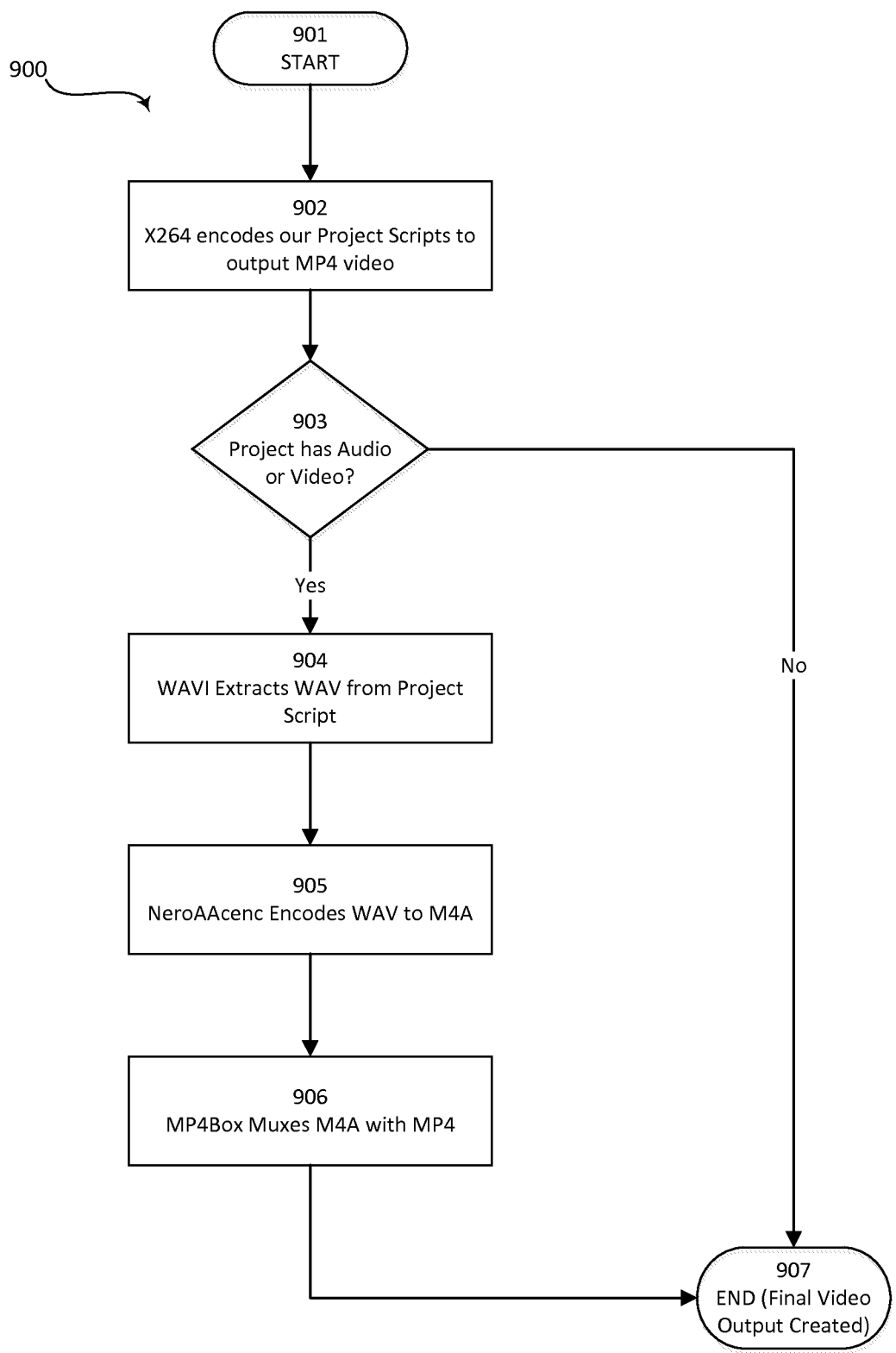
FIG. 9 is a flowchart illustrating an exemplary method for encoding video, in accordance with a representative embodiment of the present invention.

FIG. 9 is a flowchart illustrating an exemplary method 900 for encoding video, in accordance with a representative embodiment of the present invention. The actions of the method 900 of FIG. 9 may be performed using elements of the system 10 of FIG. 1 including, for example, the server(s) 11. The system 10 may be arranged to support video encoding, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 900 for encoding video begins at step 901. At step 902, a processing server calls an encoding tool, such as x264.exe, with a project script. The encoding tool generates an output file, which can be a MPEG4 output file, for example. The execution of the project script may initiate the functions and the video engine calls, for example. At step 903, the processing server determines whether the project has music audio or video audio. At step 904, audio in uncompressed WAV format is extracted using a tool such as WAVI.exe, for example. At step 905, the WAV file is encoded to M4A using a tool such as NeroAcenc.exe, for example, so that internet based media players can decode the audio. At step 906, the M4A and MP4 from step 902 above are multiplexed (combined) using a tool such as MP4Box, for example, to create the final output MP4 that can be viewed at the socially interactive application, or any suitable application/service. The video encoding method 900 ends at step 907. The final video output that end users consume has been created.

Figure 10:
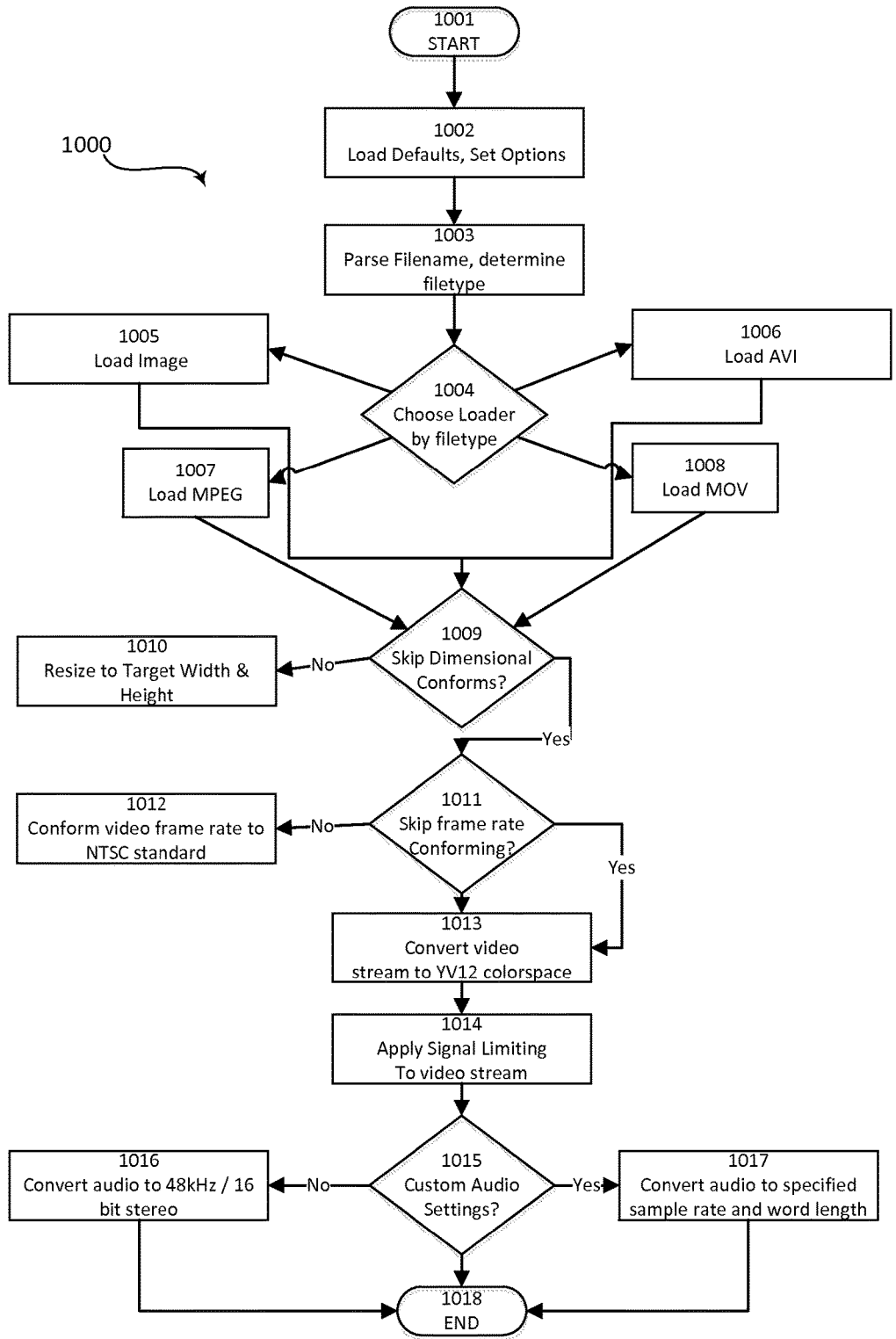
FIG. 10 is a flowchart illustrating an exemplary method for loading and conforming images and video clips, in accordance with a representative embodiment of the present invention.

FIG. 10 is a flowchart illustrating an exemplary method 1000 for loading and conforming images and video clips, in accordance with a representative embodiment of the present invention. The actions of the method 1000 of FIG. 10 may be performed using elements of the system 10 of FIG. 1 including, for example, the server(s) 11. The system 10 may be arranged to support loading and conforming images and video clips, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 10, the method 1000 for loading and conforming images and video clips opens images and video clips that can be in a variety of different formats, and allows for simplified handling of source clips. The method 1000 allows the processing server to treat media as a generic clip, instead of having to account for specific media format. The method 1000 for loading and conforming images and video clips begins at step 1001. At step 1002, defaults are loaded according to a selected preset. In various embodiments, defaults can be overridden by options selected by a user or administrator, for example. At step 1003, an input source string is parsed and a file type is determined by a file extension.

At step 1004, a file loader is chosen based on the file type. In various embodiments, various types of media are handled automatically, based on an assumed file type. At step 1005, digital still image formats are loaded. At step 1006, AVI audio/video files may be opened with FFMpegSource, or any suitable tool. For example, if unable to open the AVI audio/video file using FFMpegSource, DirectShowSource filter, or any suitable mechanism may be attempted. If AVI audio/video file cannot be opened, an error is returned. At step 1007, transport streams, such as MPEG2 and H.264 transport streams, are opened using MpegAutoIndexSource, or any suitable mechanism. At step 1008, Quicktime™ MOV files are loaded by QtSource, or any suitable mechanism.

At step 1009, by default, video is conformed to consistent dimensions at step 1010, depending on the selected preset. In various embodiments, defaults can be overridden by options such that video dimension conforming is skipped and the method 1000 proceeds to step 1011. If video dimension conforming is not skipped, video is resized to a target width and height. For example, the video may be conformed to pixel dimensions of either 1280×720 or 640× 480, for example, depending on the selected preset at step 1010. By default, video is letterboxed or pillar-boxed as needed to fill the target width and height. The background color may be determined by preset. Optionally, the video can be cropped to fit the target frame size instead.

At step 1011, by default, frame rate conforming is performed at step 1012. In various embodiments, defaults can be overridden by options such that frame rate conforming is skipped and the method 1000 proceeds to step 1013. If frame rate conforming is not skipped, the video frame rate is conformed to the NTSC standard at step 1012. More specifically, the video stream is conformed to 30000/1001 (29.97 frames-per-second). In certain embodiments, a high-quality frame rate conversion option can be chosen to improve smoothness at expense of processing time and some risk of artifacts. If frame rate conforming is skipped at step 1011, the method 1000 proceeds to step 1013, where video is converted to YUV colorspace with YV12 Chroma sub-sampling, for example. After the video is converted at step 1013, signal limiting may be applied to the video stream at step 2014. For example, a video luminance range may be limited to 16-235 and chrominance can be limited to 16-240 for CCIR-601 compliance.

At step 1015, options can be set for custom audio sample rate and word length. At step 1016, by default, audio is converted to 48 kHz, 16-bit. In various embodiments, defaults can be overridden by options. For example, at step 1017, audio may be converted to a specific sample rate and word length specified by a user or system administrator. After converting the audio at step 1016 or 1017, multichannel audio is mixed to stereo and monaural signals are replicated to 2-channel. Blank audio matching the default or custom audio settings can be inserted on media that lack an audio stream. The method 1000 for loading and conforming images and video clips ends at step 1018.

Figure 11:
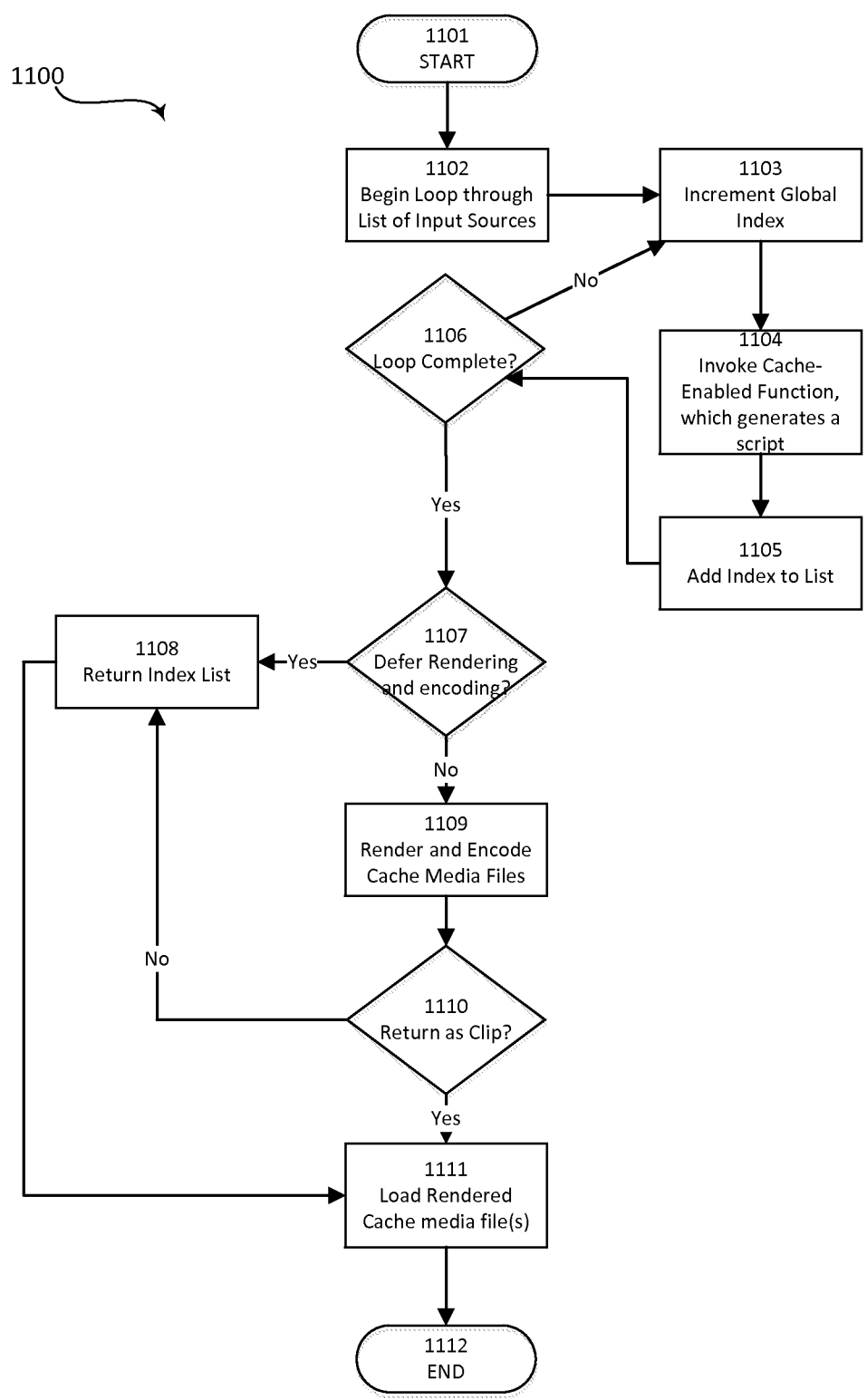
FIG. 11 is a flowchart illustrating an exemplary method for queued caching to generate pre-processed video clips, in accordance with a representative embodiment of the present invention.

FIG. 11 is a flowchart illustrating an exemplary method 1100 for queued caching to generate pre-processed video clips, in accordance with a representative embodiment of the present invention. The actions of the method 1100 of FIG. 11 may be performed using elements of the system 10 of FIG. 1 including, for example, the server(s) 11. The system 10 may be arranged to support queued caching to generate pre-processed video clips, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Figure 13A:
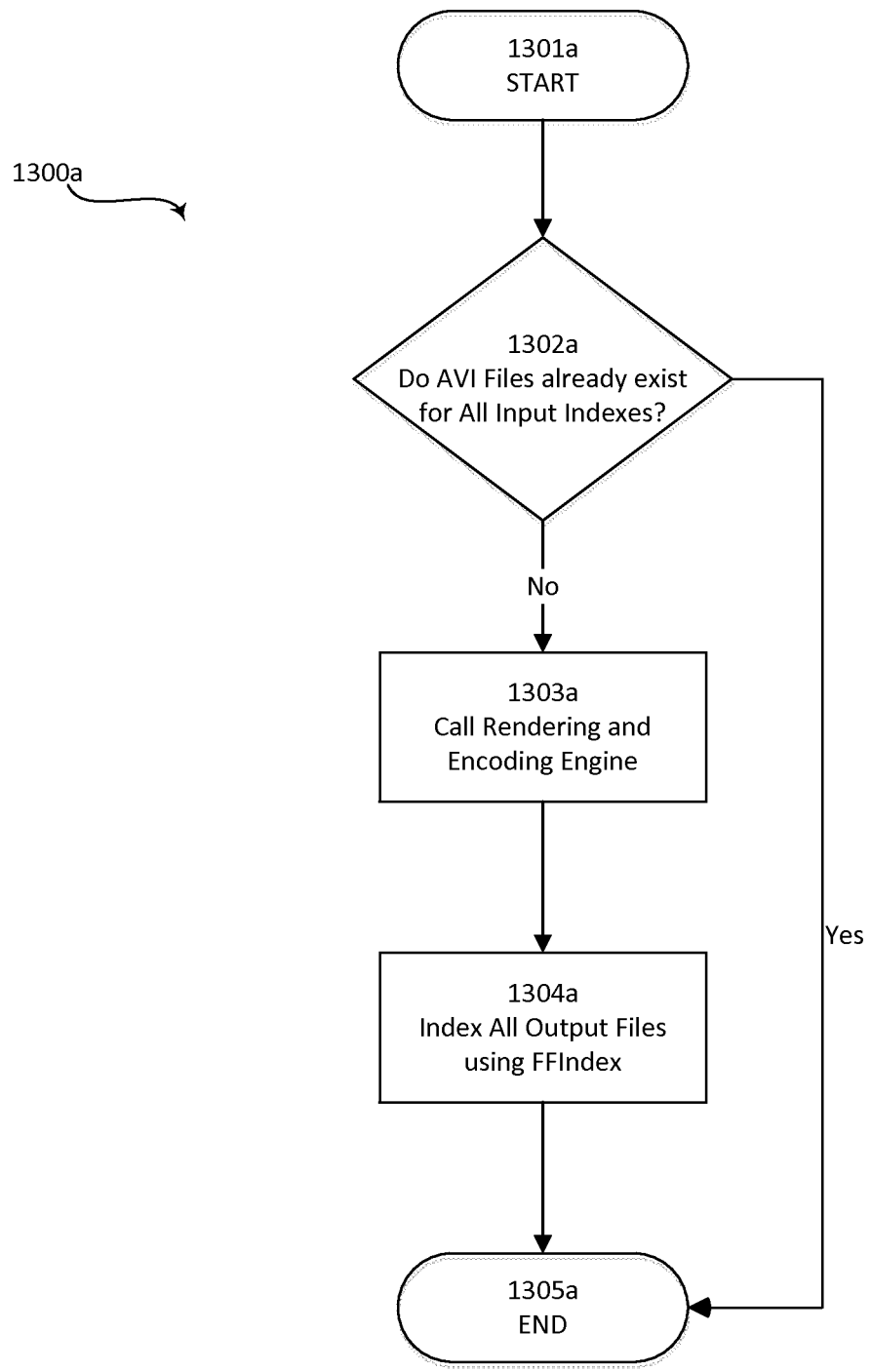
FIG. 13A is a flowchart illustrating an exemplary method for interfacing with a rendering and encoding engine, in accordance with a representative embodiment of the present invention.
Figure 13B:
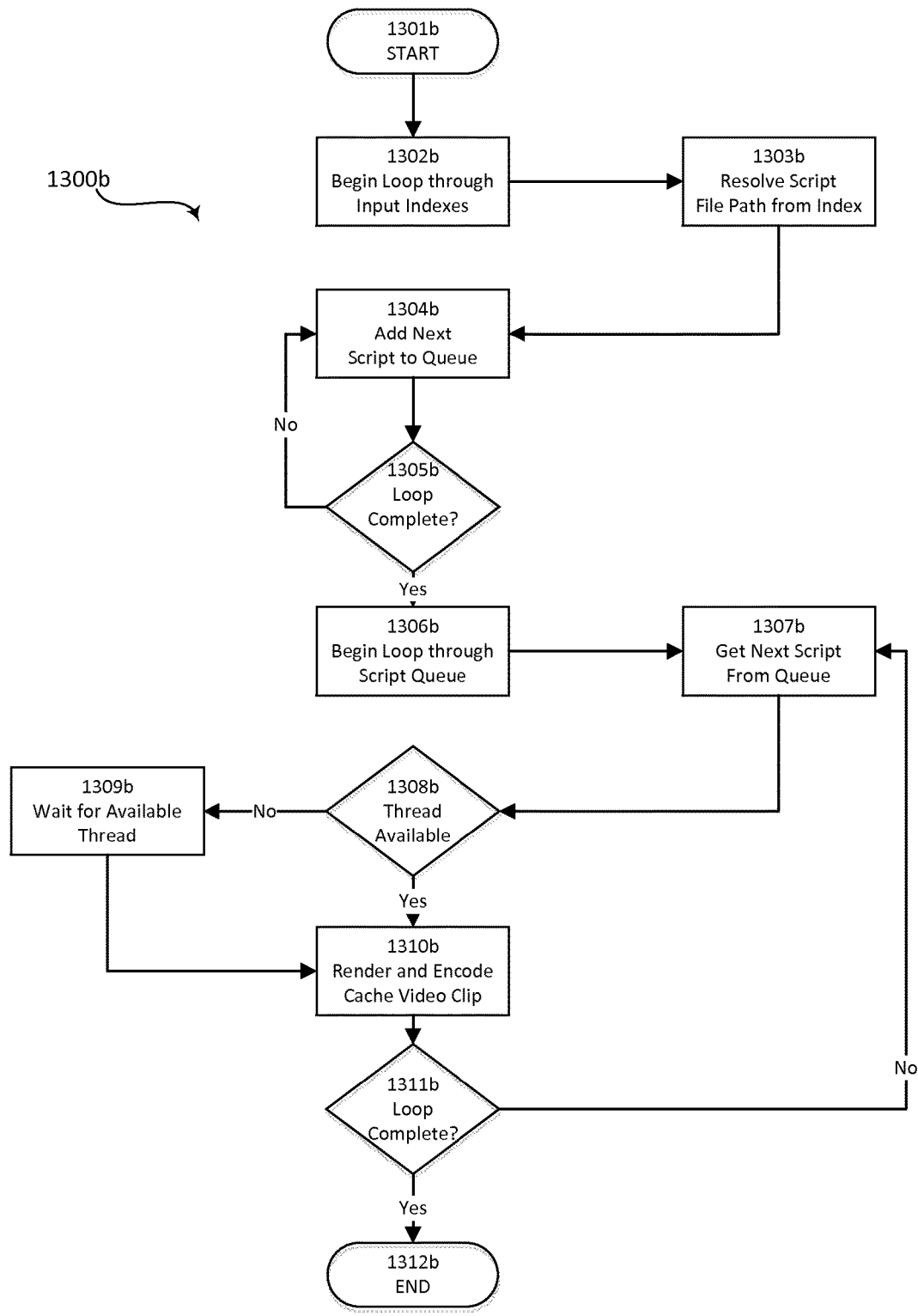
FIG. 13B is a flowchart illustrating an exemplary method for rendering and encoding scripts, in accordance with a representative embodiment of the present invention.

The method 1100 for queued caching to generate pre-processed video clips is one by which cache-enabled custom functions can replicate the parameters needed to create their output. The cache-enabled custom functions are written to .avs scripts. The cache .avs scripts can then be queued for multi-threaded rendering, as illustrated in FIGS. 13A-B and as described below, using a variety of options, including interleaved and segmented processing. The rendered output is encoded to files, referred to herein as cache media files. The method 1100 provides some unique advantages. For example, method 1100 allows the output of multiple functions to be processed concurrently in a multithreaded environment. As another example, the method 1100 allows an output of a single function to be multithreaded by assigning portions of the output to different threads, when interleaved or segmented processing is used. As another example, once the output of function is cached to disk, the cache media files can be loaded by the system and used in place of the output of the functions to avoid reprocessing, which saves time and computer processing unit (CPU) resources.

In various embodiments, interleaved processing generates several scripts for a given sequence. Each script may process every Nth frame of the output. For example, if 4 threads are used for interleaved processing of a sequence, 4 scripts can be generated. More specifically, a first script may process frames 0, 4, 8, etc. A second script may process frames 1, 5, 9, etc. A third script may process frames 2, 6, 10, etc. A fourth script may process frames 3, 7, 11, etc. Once the cache media files for these scripts are rendered and encoded, the files can be loaded and recombined by a process known as interleaving, as described below with regard to FIG. 14B, for example.

In certain embodiments, segmented processing may generate several scripts for a given sequence. Each script may process a range of frames from the output of the function. For example, if the output of a given source file and function is 300 frames, and 4 threads are used for segmented processing, 4 scripts may be generated. More specifically, a first script may process frames 0-74. A second script may process frames 75-149. A third script may process frames 150-224. A fourth script may process frames 225-299. Once the cache media files for these scripts are rendered and encoded, they can be loaded and recombined, as described below with regard to FIG. 14C, for example.

At step 1101, a list of sources is received as an input. In various embodiments, the list of sources may be paths to media files or plain text used for specifying on-screen titling text, for example. At step 1102, each item in the list of sources is processed in a loop, for example. At step 1103, as each source is processed, a global variable is incremented so that a unique index can be used to identify and reference each cached media file. At step 1104, a cached-enabled function is invoked, which generates an .avs script via the method 1200 for generating a script illustrated in FIG. 12 and described below. Cache-enabled functions can replicate the parameters used to create the function output. The cache-enabled functions may be written to .avs scripts so that the functions can be rendered by other threads, for example. At step 1105, a cache identifier associated with the source being processed may be added to an index of a queue identification list. The queue identification list may be sent to the rendering method 1300A illustrated in FIG. 13A and described below, or can be preserved for future rendering, for example. At step 1106, the processing server determines whether each item in the list of sources has been processed. If items remain for processing, the method 1100 returns to step 1103. Otherwise, the method 1100 proceeds to step 1107.

At step 1107, the processing server determines whether rendering and encoding is being deferred, in which case the queue identification list is returned at step 1108. If rendering and encoding are not being deferred, the method proceeds to step 1109, where the cache media files are rendered and encoded by method 1300A illustrated in FIG. 13A and described below, for example. At step 1110, if there is only a single source in the input sources list, the encoded cache media file can be read and returned as a clip and the method proceeds to step 1111. If multiple sources are used, however, the queue identification list may be returned instead at step 1108. Other functions and processes can load pre-rendered output from the output of method 1100, for example. At step 1111, rendered cache media files are loaded via the method 1400a illustrated in FIG. 14A and described below, for example. If there is only a single source in the input sources list, the encoded cache media file can be read and returned as a clip. The method 1100 ends at step 1112 where either the queue identification list or the clip is returned.

Figure 12:
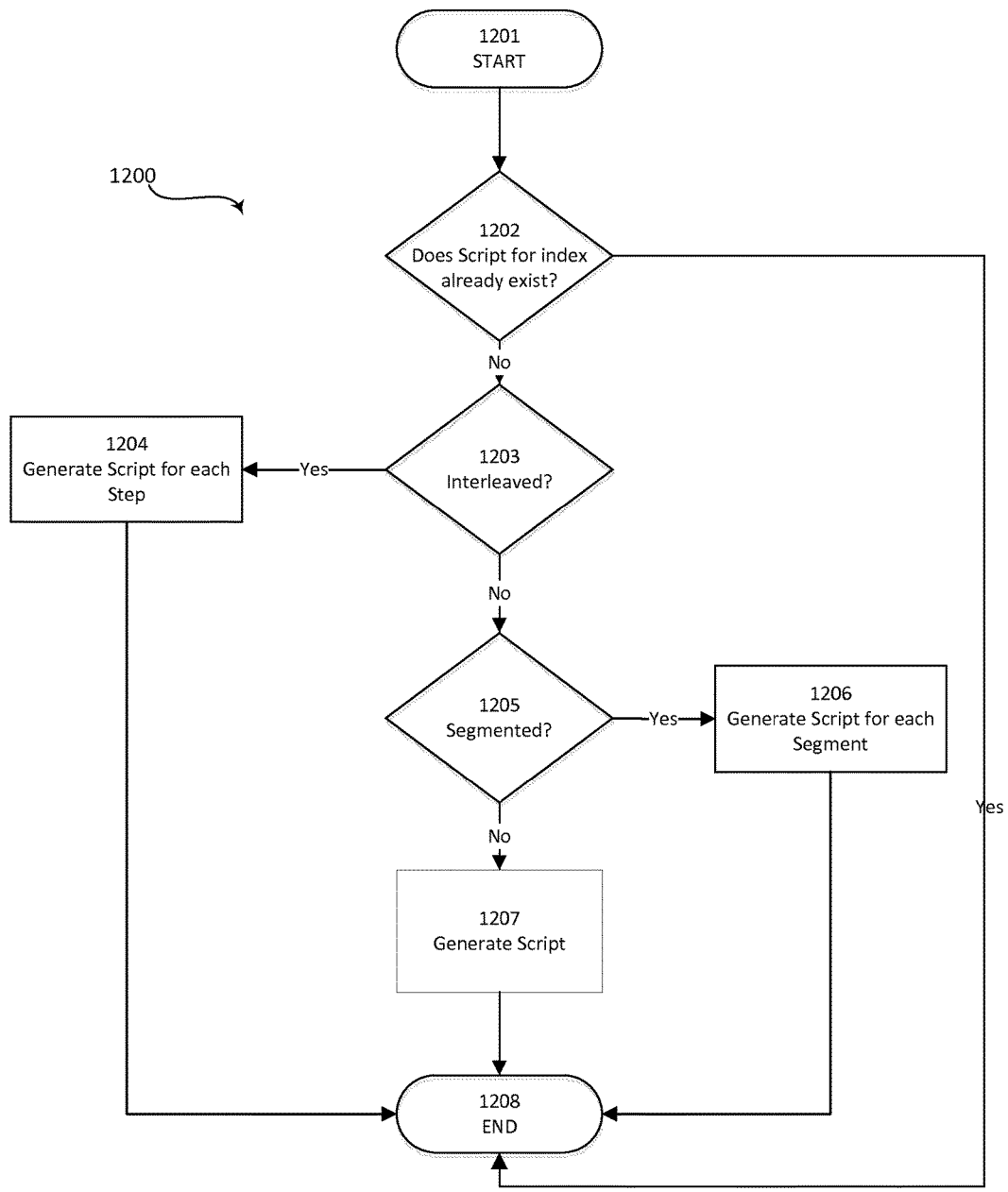
FIG. 12 is a flowchart illustrating an exemplary method for generating a script, in accordance with a representative embodiment of the present invention.

FIG. 12 is a flowchart illustrating an exemplary method 1200 for generating a script, in accordance with a representative embodiment of the present invention. The actions of the method 1200 of FIG. 12 may be performed using elements of the system 10 of FIG. 1 including, for example, the server(s) 11. The system 10 may be arranged to support script generation, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 1200 for generating a script is called by custom cache-enabled functions. The method 1200 replicates the parameters and logic required to create the output of the parent function and writes these to a script, so that the script can be loaded, rendered, and encoded by an external process and/or at a later time as described below. At step 1201, the method 1200 for generating a script is initiated when an input is received that comprises a list of parameter names and values corresponding to those of the parent function. The global cache identifier variable that uniquely identifies the script and its output is also input. At step 1202, the processing server determines whether an .avs script for the cache identifier index exists. The cache identifier index value is resolved to an actual file path pointing to the target .avs script. If the script does not exist at step 1202, it is generated. At step 1203, the processing server determines whether interleaved processing has been specified. At step 1204, if interleaving has been specified, a separate script is generated for each interleaving step. If interleaving has not been specified, the method proceeds to step 1205 where the processing server determines whether segment processing has been specified. At step 1206, if segment processing has been specified, a separate script is generated for each segment. At step 1207, if neither interleaved nor segmented processing is used, a single .avs script is generated. The method 1200 ends at step 1208.

FIG. 13A is a flowchart illustrating an exemplary method 1300a for interfacing with a rendering and encoding engine, in accordance with a representative embodiment of the present invention. The actions of the method 1300a of FIG. 13 may be performed using elements of the system 10 of FIG. 1 including, for example, the server(s) 11. The system 10 may be arranged to support interfacing with a rendering and encoding engine, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 1300a for interfacing with a rendering and encoding engine allows a list of indexes, representing the cache identifiers of previously generated scripts, for example, to be passed to a rendering and encoding engine so that the scripts may be processed and stored as cache media files. At step 1301a, the method 1300a for interfacing with a rendering and encoding engine takes as input a list of indexes representing the cache .avs scripts and the respective outputs cache media files). At step 1302a, the processing server checks whether output for all the indexes has already been completed. If so, the method 1300a terminates. At step 1303a, the processing server sends the list of indexes to the rendering an encoding engine. At step 1304a, cache media files are indexed using FFIndex, or any suitable indexing mechanism. The method 1300a ends at step 1305a.

FIG. 13B is a flowchart illustrating an exemplary method 1300b for rendering and encoding scripts, in accordance with a representative embodiment of the present invention. The actions of the method 1300b of FIG. 13 may be performed using elements of the system 10 of FIG. 1 including, for example, the server(s) 11. The system 10 may be arranged to support rendering and encoding a script to a file, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 1300b for rendering and encoding scripts takes a list of cache indexes and assigns rendering of the .avs script that corresponds with each index to a thread. In various embodiments, a maximum number of concurrent threads can be set. The output of each thread is a cache media file. At step 1301b, the method 1300b for rendering and encoding scripts takes as input a list of indexes representing the cache .avs scripts and respective outputs (cache media files). At step 1302b, each index from the input list is processed in a loop. At step 1303b, a file path referencing an .avs script is determined by the index. At step 1304b, the .avs script file path determined at step 1303b is added to a queue. At step 1305b, the processing server determines whether each script file path from the input list has been processed. If .avs script files remain for processing, the method 1300b returns to step 1304b. Otherwise, the method 1300b proceeds to step 1306b.

At step 1306b, each script from the queue is processed in a loop. At step 1307b, the next script from the scripts queue is retrieved. At step 1308b, the processing server determines whether any threads are available for processing. If all threads are busy (assigned), the processing server waits for the next available thread at step 1309b. At step 1310b, a cache media file is generated for each script if the cache media file does not already exist. In various embodiments, special encoding options can be included in the script. At step 1311b, the processing server determines whether all queued scripts have been processed. If scripts remain for processing in the queue, the method returns to step 1307b. Otherwise, the method 1300b ends at step 1312b.

Figure 14A:
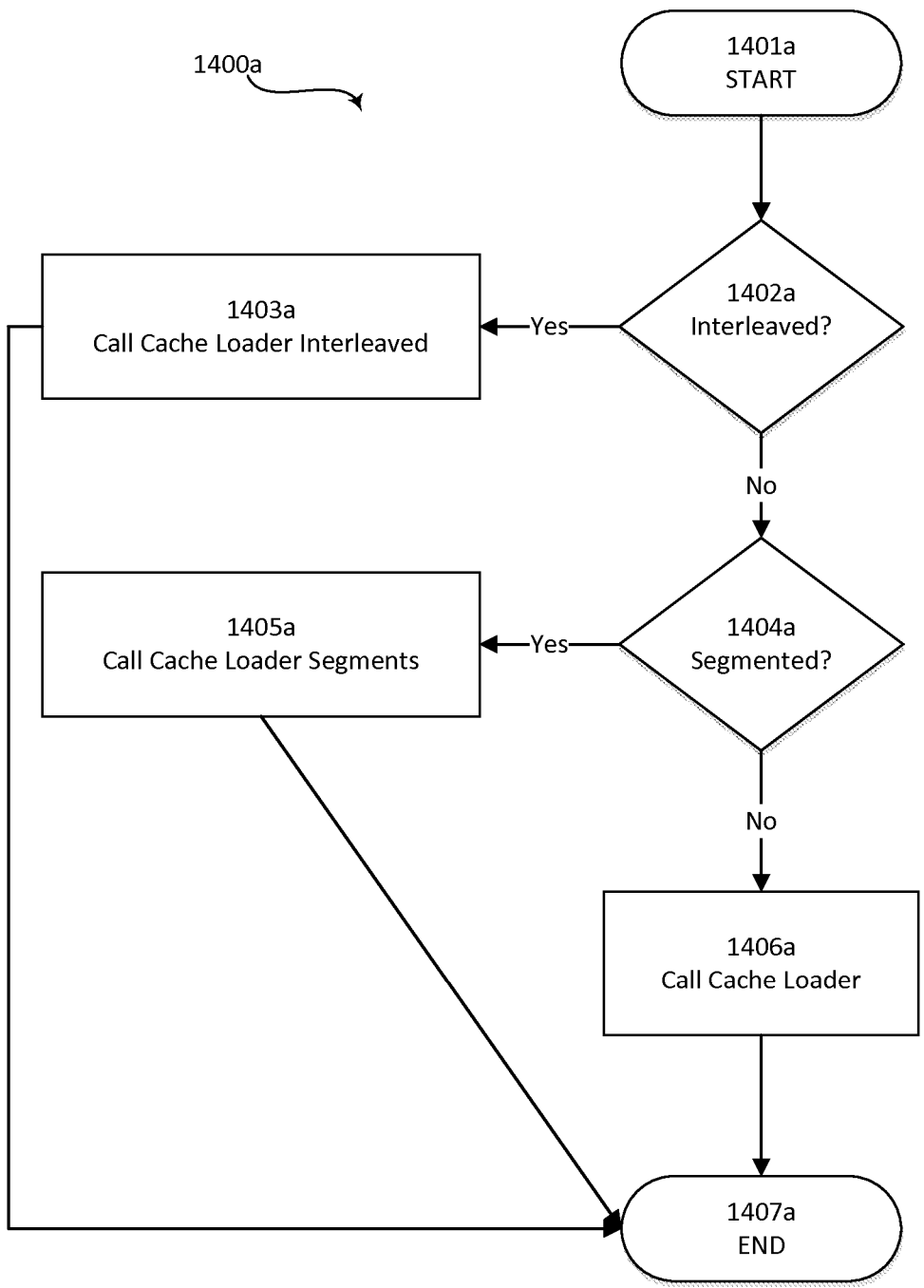
FIG. 14A is a flowchart illustrating an exemplary method for generating a single video clip, in accordance with a representative embodiment of the present invention.

FIG. 14A is a flowchart illustrating an exemplary method 1400a for generating a single video clip, in accordance with a representative embodiment of the present invention. The actions of the method 1400a of FIG. 14A may be performed using elements of the system 10 of FIG. 1 including, for example, the server(s) 11. The system 10 may be arranged to support generation of a single video clip, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1401a, the method 1400a for generating a single video clip from one or more cache media files takes as input an index referring to a specific cache media file. At step 1402a, the processing server determines whether the specified index refers to a series of interleaved cache media files. If so, the method proceeds to step 1403a where the cache media files are loaded and interleaved such that a clip is returned by the method 1400b illustrated in FIG. 14B and described below. If the specified index does not refer to a series of interleaved cache media files, the method proceeds to step 1404a, where the processing server determines whether the specified index refers to a series of segmented cache media files. If so, the method proceeds to step 1405a where the cache media files are loaded and concatenated such that a clip is returned by the method 1400c illustrated in FIG. 14C and described below. If the specified index does not refer to a series of segmented cache media files, the method proceeds to step 1406a, where the cache media files are loaded and a clip is returned by the method 1400d illustrated in FIG. 14D and described below. The method 1400*a* for generating a single video clip ends at step 1407*a*.

Figure 14B:
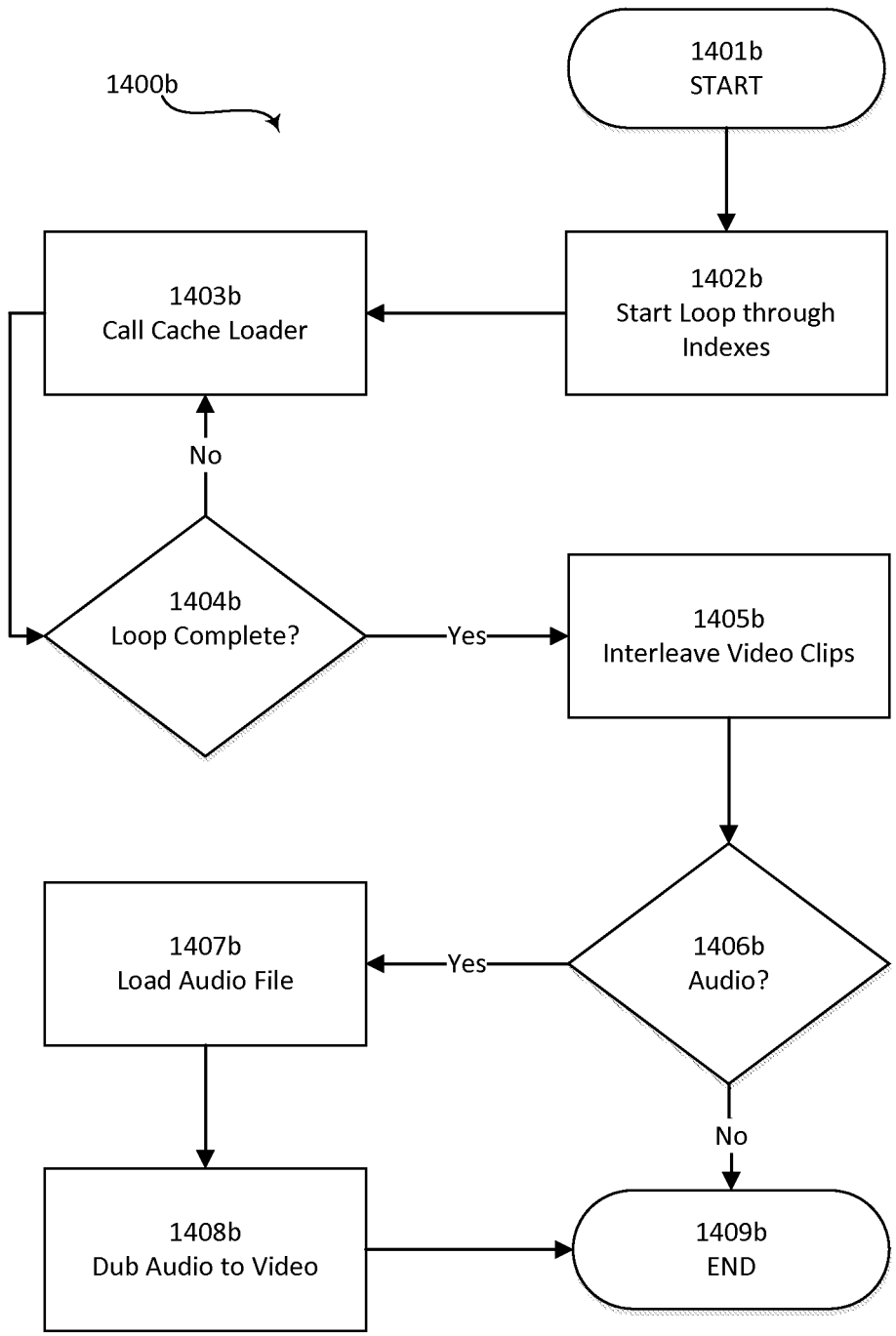
FIG. 14B is a flowchart illustrating an exemplary method for interleaving a series of cache media files to generate a single video clip, in accordance with a representative embodiment of the present invention.

FIG. 14B is a flowchart illustrating an exemplary method 1400*b* for interleaving a series of cache media files to generate a single video clip, in accordance with a representative embodiment of the present invention. The actions of the method 1400*b* of FIG. 14B may be performed using elements of the system 10 of FIG. 1 including, for example, the server(s) 11. The system 10 may be arranged to support interleaving a series of cache media files to generate a single video clip, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1401*b*, the method 1400*b* for interleaving a series of cache media files to generate a single video clip takes as input an integer index referring to a specific cache media file. In various embodiments, a number of interleaving steps may also be specified. Based on the input, remaining indexes may be determined. For example, an index value of 24 with 8 steps may use indexes [24,25,26,27,28,29,30,31]. At step 1402*b*, each of the indexes is processed in a loop. At step 1403*b*, a cache media file associated with each index is loaded and a clip is returned by the method 1400*d* illustrated in FIG. 14D and described below. At step 1404*b*, the processing server determines whether all indexes have been processed. If indexes remain for processing, the method returns to step 1403*b*. Otherwise, the method 1400*b* proceeds to step 1405*b*, where the clips derived from the cache media files are interleaved to recreate the original output of a custom cache-enabled function.

At step 1406*b*, the processing server determines whether a companion audio file exists for the interleaved cache media files. If this audio file exists, the method proceeds to step 1407*b*, where the audio file is loaded and returned as an audio clip. At step 1408*b*, the audio clip is dubbed to the video clip. The method 1400*b* for interleaving a series of cache media files to generate a single video clip ends at step 1409*b*, where a clip object comprising a video stream and optionally, an audio stream, is returned.

Figure 14C:
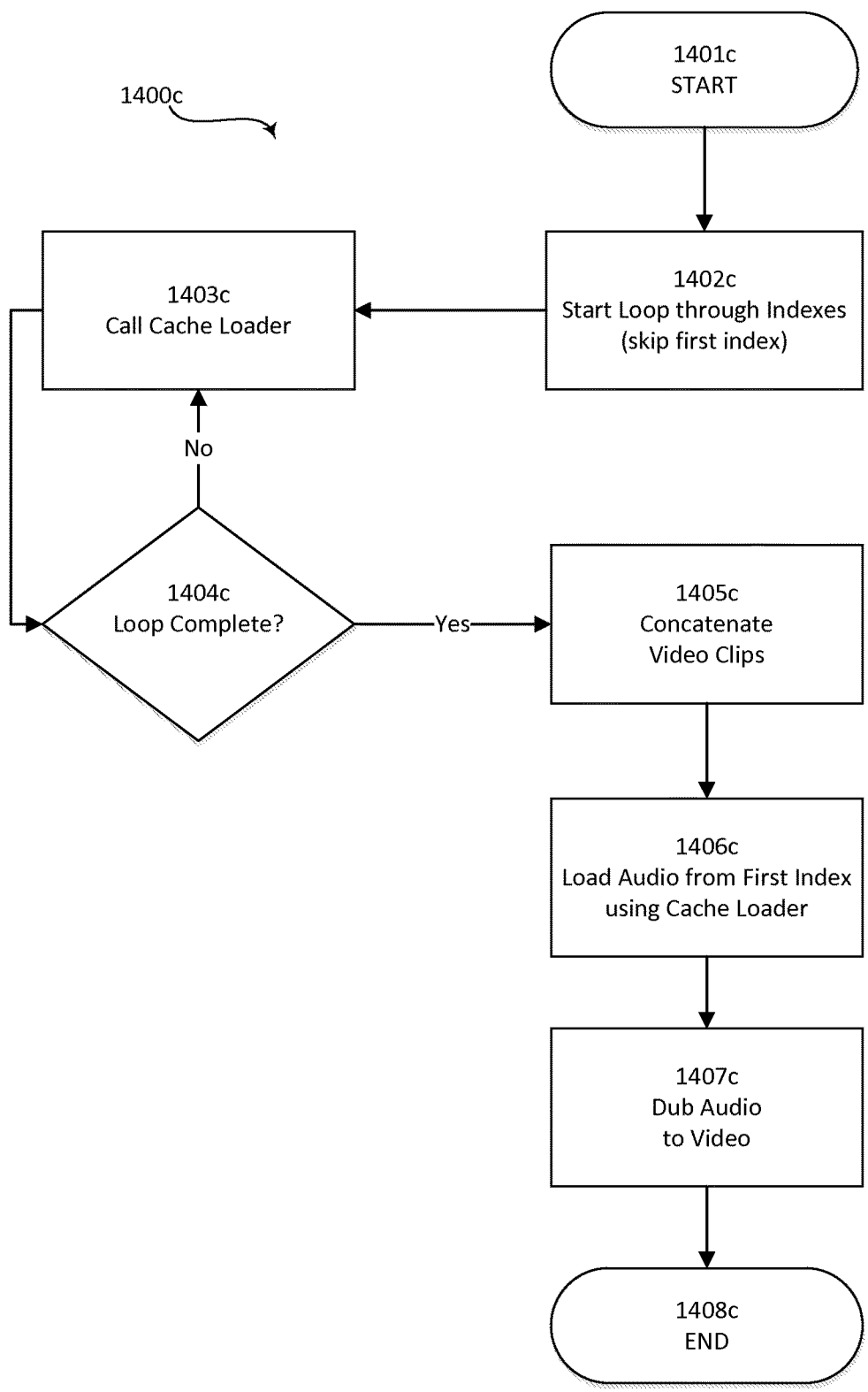
FIG. 14C is a flowchart illustrating an exemplary method for segmenting a series of cache media files to generate a single video clip, in accordance with a representative embodiment of the present invention.

FIG. 14C is a flowchart illustrating an exemplary method 1400*c* for segmenting a series of cache media files to generate a single video clip, in accordance with a representative embodiment of the present invention. The actions of the method 1400*c* of FIG. 14 may be performed using elements of the system 10 of FIG. 1 including, for example, the server(s) 11. The system 10 may be arranged to support segmenting a series of cache media files to generate a single video clip, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1401*c*, the method 1400*c* for using a segmented series of cache media files to generate a single video clip takes as input an integer index referring to a specific cache media file. In various embodiments, a number of segments may also be specified. Based on the input, remaining indexes may be determined. For example, an index value of 24 with 8 segments may use indexes [24,25,26,27,28,29,30,31]. The first segment in the index list may be different from the other segments, for example, in that the first segment may only include an audio track. At step 1402*c*, a first index in the list is skipped and each of the remaining indexes is processed in a loop. At step 1403*c*, a cache media file associated with each index is loaded and a clip is returned by the method 1400*d* illustrated in FIG. 14D and described below. At step 1404*c*, the processing server determines whether all indexes have been processed. If indexes remain for processing, the method returns to step 1403*c*. Otherwise, the method 1400*c* proceeds to step 1405*c*, where the clips are concatenated to recreate an original output.

At step 1406*c*, the audio file corresponding with the first index is loaded and returned as an audio clip. At step 1407*c*, the audio clip is dubbed to the video clip. The method 1400*c* for using a segmented series of cache media files to generate a single video clip ends at step 1408*c*, where a clip object comprising video and audio streams is returned.

Figure 14D:
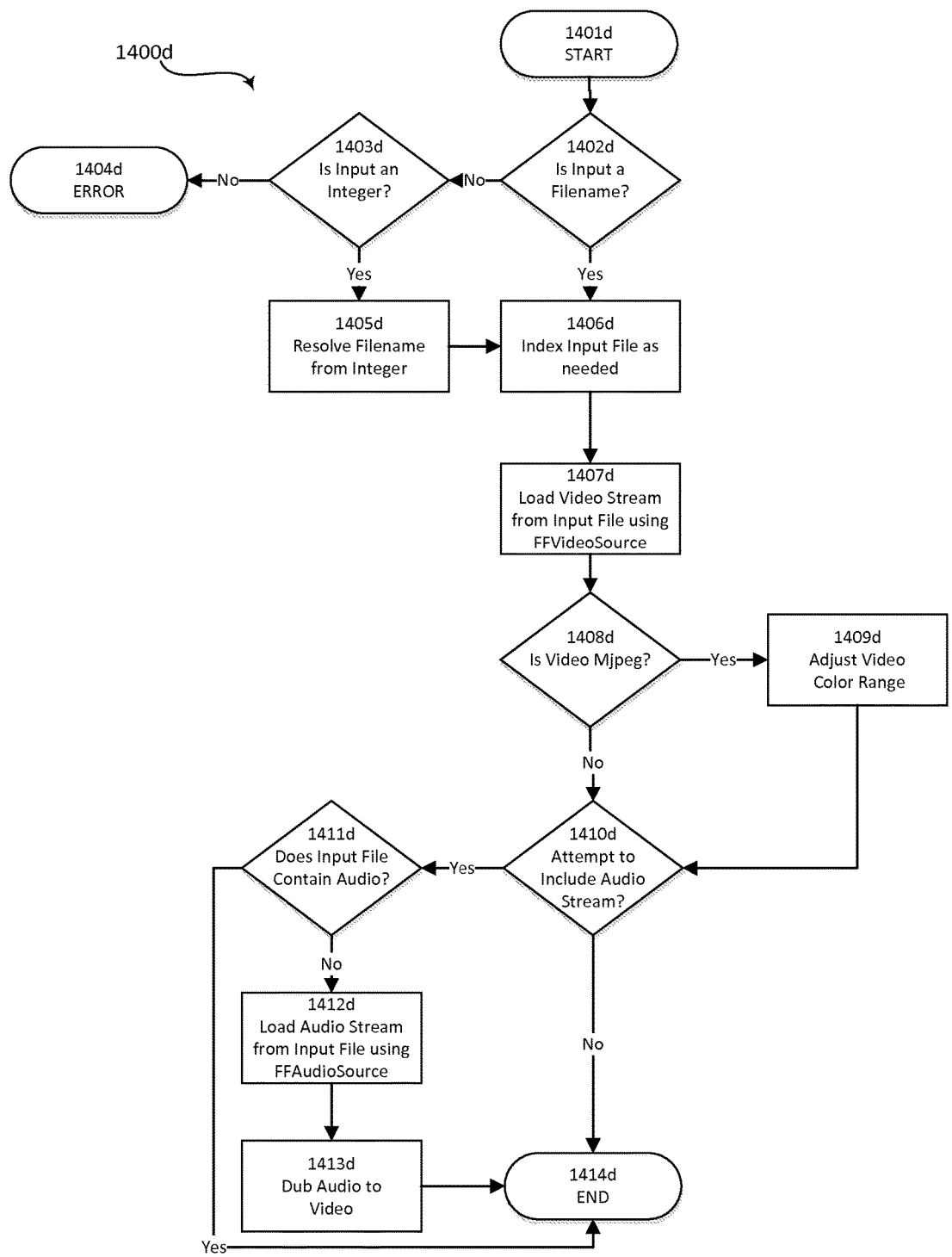
FIG. 14D is a flowchart illustrating an exemplary method for generating a single video clip, in accordance with a representative embodiment of the present invention.

FIG. 14D is a flowchart illustrating an exemplary method 1400*d* for generating a single video clip, in accordance with a representative embodiment of the present invention. The actions of the method 1400*d* of FIG. 14D may be performed using elements of the system 10 of FIG. 1 including, for example, the server(s) 11. The system 10 may be arranged to support generation of a single video clip, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1401*d*, the method 1400*d* for generating a single video clip takes as input an integer index referring to a specific cache media file and/or a string including the file path, for example. At step 1402*d*, the processing server determines whether the input is a filename. At step 1403*d*, the processing server determines whether the input is an integer index. If the processing server determines that the input is not an integer or path string, or the path is invalid, the method 1400*d* may terminate with an error.

At step 1405*d*, if the input is an integer, the actual file path the .avs script referenced by the index is determined. At step 1406*d*, if the input is a filename, the input file is indexed as needed. For example, a third party plugin, such as FFindex, or any suitable indexing mechanism, may be run on the input file if an index file does not exist. At step 1407*d*, a video stream from the input file is loaded using FFVideoSource or any suitable mechanism for loading and returning the video stream as a clip.

At step 1408*d*, the processing server determines whether the cache media file was encoded in MJPEG format. At step 1409*d*, if encoded in MJPEG format, the video color range is adjusted. For example, MJPEG files may be stored using a different luminance range and step 1409*d* may restore the standard levels. At step 1410*d*, the processing server determines whether to attempt to include an audio stream. By default, audio is included if the cache media file includes audio. In various embodiments, the default may be overridden, for example. At step 1411*d*, the processing server determines whether the cache media file contains an audio track. If so, the method proceeds to step 1412*d* where the audio stream is loaded from the input file and returned as an audio clip. For example, FFAudioSource, or any suitable mechanism, may load the file and return the audio stream as a clip. At step 1413*d*, the audio clip is dubbed to the video clip. The method 1400*d* for generating a single video clip ends at step 1414*d*, where a clip object comprising a video stream and optionally, an audio stream, is returned.

FIG. 15 is a flowchart illustrating an exemplary method 1500 for processing video for a beat sequence video editing project, in accordance with a representative embodiment of the present invention. The actions of the method 1500 of FIG. 15 may be performed using elements of the system 10 of FIG. 1 including, for example, the server(s) 11. The system 10 may be arranged to support beat sequence video processing, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 15, the method 1500 for processing video for a beat sequence video editing project loops and synchronizes a series of user-uploaded images over a user-uploaded music track. The images are timed to appear rhythmically, to match the beat of the music. The tempo of the music is tracked throughout, so that the appearance of images speeds up or slows down with the beat of the music. Visual effects such as tap, zoom, and rotate can be applied to the image sequence on particular beats, which further correlates the resulting video to the underlying music.

The method 1500 for processing video for a beat sequence video editing project begins at step 1501. At step 1502, defaults are loaded according to a selected preset. In various embodiments, defaults can be overridden by options. At step 1503, the system parses a list of input sources and returns a video clip. The list of input sources may include paths to user-supplied images or video files, for example. The individual images and/or video frames of the sequence are loaded as individual frames comprising an NTSC frame-rate (29.97 frames per second) video stream. If video files are specified, individual frames from each video may be chosen at intervals so that a shortened time-lapse version of the video clip is converted to a series of images, which may be inserted between other images or videos in an input list to form the sequence, for example. In various embodiments, the frames of the sequence are resized and may be letter-boxed or pillar-boxed to fill the target width and height. The background color can be determined by the selected preset or option, for example. At step 1504, titles may be generated for one or more of the individual frames. For example, overlay titles (as specified in the input parameters) for specific frames are rendered to contiguous frames in a 32-bit RGBA 29.97 frames per second video stream. At step 1505, a digital music file is loaded. At step 1506, beat detection is performed on the digital music file. For example, the music file may be analyzed to determine the temporal location of musical beats (quarter-notes) in order set the timing of cuts and effects.

At step 1507, the function re-times the image sequence to match the tempo of the music. By default, images appear for the duration of a music quarter-note, eighth-note, or sixteenth-note depending on the average tempo (quarter-note beats per second). The automatic beat subdividing can be disabled by specifying a particular note-length or pattern of note-lengths. Images for which pauses or titles have been specified are extended to fill multiple beats, the number of which can either be specified or automatically determined according to the tempo.

At step 1508, if the re-timed sequence is of shorter duration than the music, the method proceeds to step 1509 where the re-timed sequence is looped to fill the duration. More specifically, at step 1509, the basic image sequence (duplicates of what was created in step 1503) is repeatedly appended to the video stream until the video stream is at least as long as the audio stream. At step 1510, the additional instances of the image sequence are matched the tempo of the music. By default, images appear for the duration of a music quarter-note, eighth-note, or sixteenth-note depending on the average tempo (quarter-note beats per second). The automatic beat subdividing can be disabled by a specifying a particular note-length or pattern of note-lengths. After re-timing the image sequence at step 1507, the processing server determines whether the sequence is complete at step 1511. If there are no more frames remaining in the basic image sequence, the method continues to step 1508 as described above.

If the processing server determines that there are more frames for the image sequence at step 1511, the method proceeds to step 1512 where the next frame of the image sequence is isolated and prepared for further processing. At step 1513, the processing server determines whether the user has specified a pause or a title for the current frame (image). By default, images appear for the duration of a music quarter-note, eighth-note, or sixteenth-note depending on the average tempo (quarter-note beats per second). If a pause or title is not specified for the current frame, the method proceeds to step 1514 where the duration of the fill beat or partial beat may be extended. The automatic beat subdividing can be disabled by a specifying a particular note-length or pattern of note-lengths. If a pause or title is specified for the current frame, the method proceeds to step 1515 where the current frame is looped to fill multiple beats. The duration (in beats) can either be specified or automatically determined according to the tempo. At step 1516, the processing server determines whether titling has been specified for the current frame. If titling was specified, the titling is applied by, for example, superimposing a rendered title overlay over the image at step 1517.

If the processing server determines that the re-timed sequence is not of shorter duration than the music at step 1508, the method proceeds to step 1518, where the processing server determines whether visual effects were selected for application to the video. For example, the user can select various effects (e.g., zoom, rotate, stretch, tap) that are applied at musical intervals according to the tempo and various options. If visual effects were selected at step 1518, zoom, rotate, stretch, and/or tap effects may be applied at musical intervals according to the tempo and various options at step 1519. At step 1520, the audio (music) and video (images) streams are synchronized and multiplexed. At step 1521 the video is output. The method 1500 ends at step 1522.

Figure 16A:
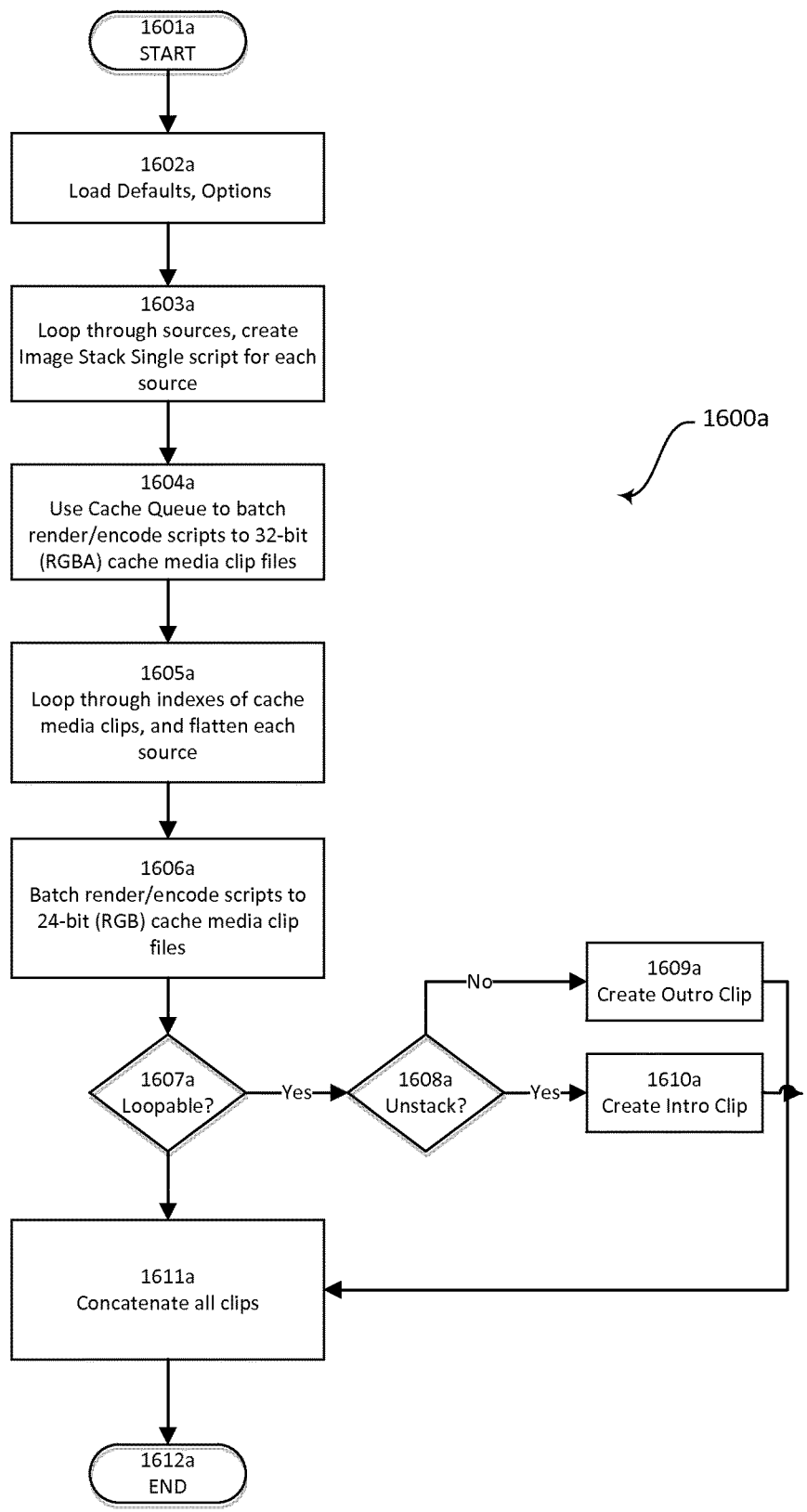
FIG. 16A is a flowchart illustrating an exemplary method for processing video for an image stack video editing project, in accordance with a representative embodiment of the present invention.

FIG. 16A is a flowchart illustrating an exemplary method 1600*a* for processing video for an image stack video editing project, in accordance with a representative embodiment of the present invention. The actions of the method 1600*a* of FIG. 16A may be performed using elements of the system 10 of FIG. 1 including, for example, the server(s) 11. The system 10 may be arranged to support image stack video processing, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 16A, an image stack video editing project animates stacks of images that have a solid-colored border and may have a thicker bottom border that allow for their titles to be written on them, when such titling is specified. In various embodiments, titles can be added in a permanent marker font, to look hand written, for example, or any suitable font. Stacks of eight images may animate in to look, for example, like a random pile of images was dropped onto a table. If a video is present, it may play within the walls of the image frame and look similar to image counterparts, just with video.

Figure 16B:
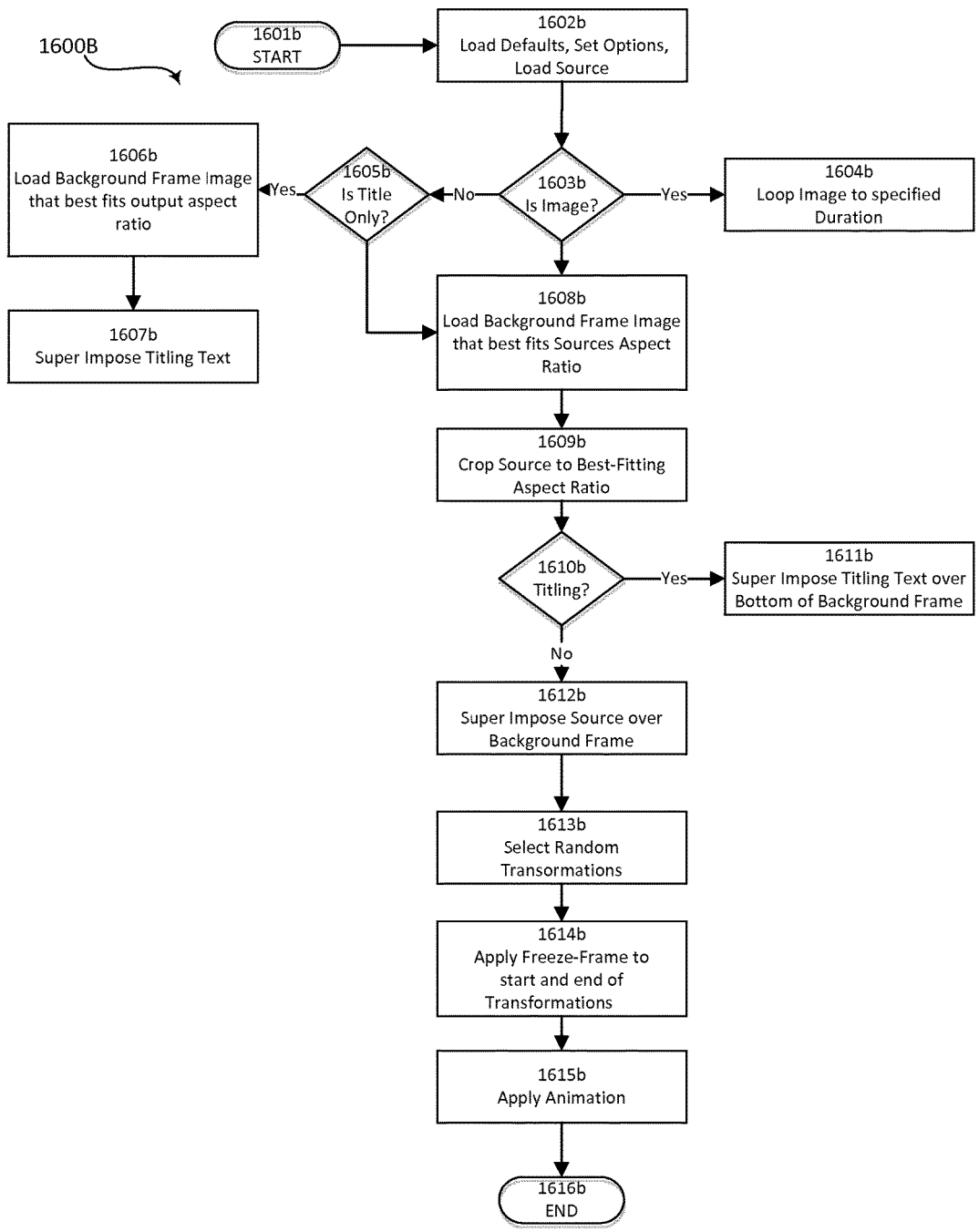
FIG. 16B is a flowchart illustrating an exemplary method for creating an image stack single script for each source, in accordance with a representative embodiment of the present invention

At step 1601a, input sources are provided as paths to media files, which may be video clips (with or without audio) or still images. Titling text can also be specified for each source—or titling text can appear alone as a "main title" without a video clip or still image source behind it. At step 1602a, defaults of the function are loaded and overridden as needed by user-set options. At step 1603a, the function loops through the sources list and, using the method 1200 for generating a script, as illustrated in FIG. 12 and discussed above, creates .avs scripts for each source and/or titling text string as illustrated in FIG. 16B and described below.

At step 1604a, the scripts generated in step 1603a are batch processed with the method 1300b for threading to concurrently render and encode multiple scripts, as illustrated in FIG. 13B and discussed above, resulting in 32-bit (RGB+transparency) cache media clips rendered and encoded as AVI files. In various embodiments, the cache identifiers of these cache media clip files are stored in memory so that they can be later read and processed more efficiently. Depending on the "unstack" option, the sequence may either begin with all images stacked on top of each other, which then are peeled-off one-by-one, revealing the background, or begin with the background onto which the images are successively stacked.

Figure 16C:
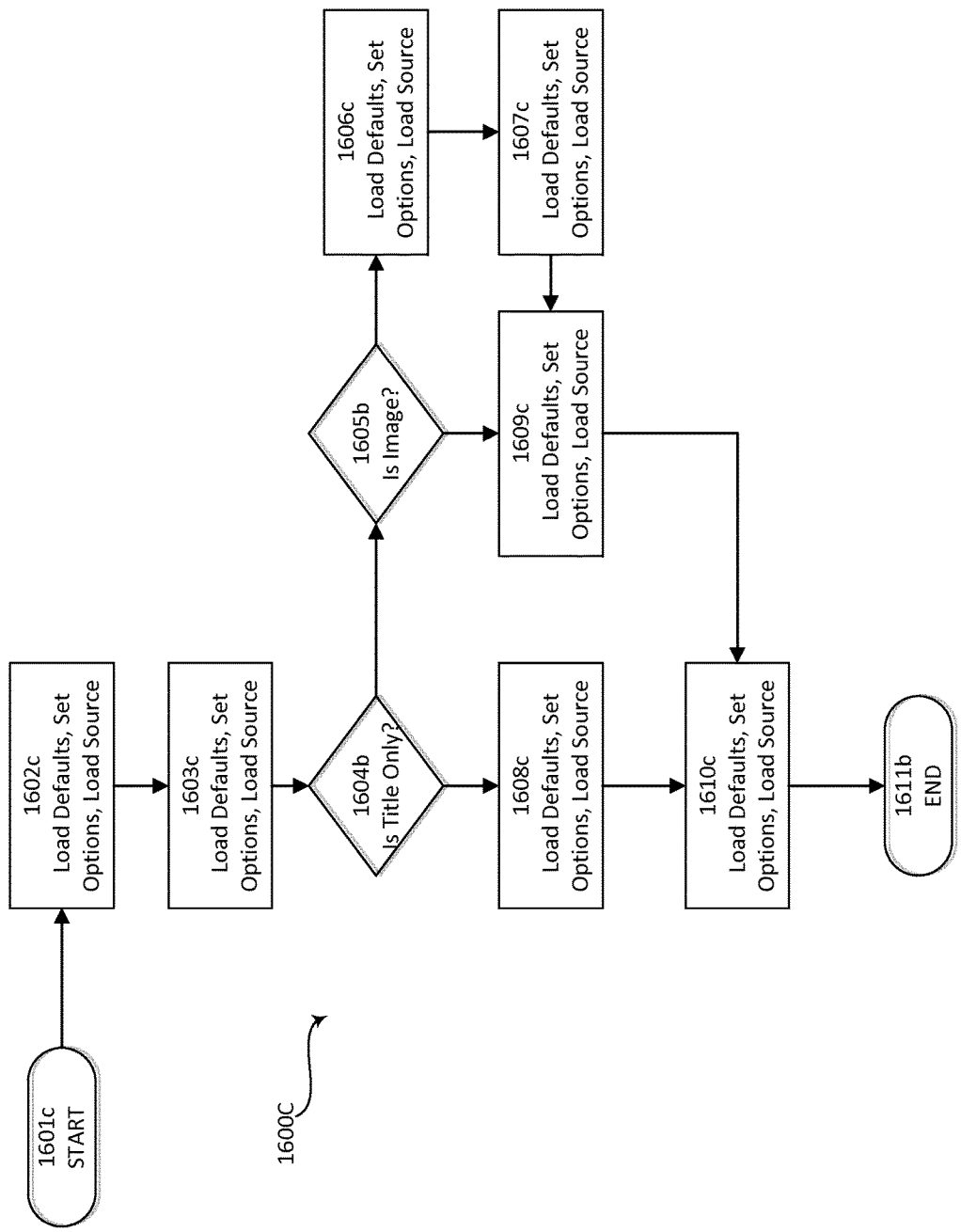
FIG. 16C is a flowchart illustrating an exemplary method for flattening each source, in accordance with a representative embodiment of the present invention.

At step 1605a, each 32-bit cache media clip created at step 1604a is loaded and each is used as a source in another series of .avs scripts generated by the method 1200 for generating a script, as illustrated in FIG. 12 and discussed above. Each script applies a flatten process, as illustrated in FIG. 16C and described below, to the source.

At step 1606a, the scripts generated at step 1605a are batch processed with the method 1300b for threading to concurrently render and encode multiple scripts, as illustrated in FIG. 13B and discussed above, resulting in 24-bit RGB cache media clips rendered and encoded as AVI files, for example. In various embodiments, the cache identifiers of these cache media clip files are stored in memory so that they can be later used efficiently to contribute to the final output video/audio streams.

At step 1607a, if a loopable sequence has been specified, the method proceeds to step 1608a where the processing server determines whether the final loopable output contains an additional stacking or unstacking animation to achieve seamless looping. The loopable option ensures that the final sequence starts and ends with either a solid background color or background image, if specified by the user. If the output includes an additional unstacking animation, an introduction ("intro") cached media clip is generated at step 1610a. More specifically, the first 10 frames (which may include an "in" transition animation applied to a freeze-frame of the source's first frame) of each flattened source may be shown in rapid succession; then frame-blended and frame-decimated to give the appearance of fast motion. In various embodiments, the "intro" clip begins with either background color or background image, as specified by the user. If the output includes an additional stacking animation, a conclusion ("outro") cached media clip is generated at step 1609a. More specifically, the final 10 frames (which may include an "out" transition animation applied to a freeze-frame of the source's last frame) of each flattened source may be shown in rapid succession; then frame-blended and frame-decimated to give the appearance of fast motion. In various embodiments, the "outro" clip ends with either background color or background image, as specified by the user. The intro or outro cached media clip allows the multiple image stack video editing project sequences to be concatenated seamlessly.

At step 1611a, the cached source clips with animation and any titling applied and any intro or outro clips are added sequentially to the main output video/audio stream. The clips are then converted to YV12 colorspace and audio is converted to 48 kHz/16-bit stereo. At step 1612a, a single video clip with audio is returned.

FIG. 16B is a flowchart illustrating an exemplary method 1600b for creating an image stack single script for each source at step 1603a of the method of FIG. 16A, for example, in accordance with a representative embodiment of the present invention. The actions of the method 1600b of FIG. 16B may be performed using elements of the system 10 of FIG. 1 including, for example, the server(s) 11. The system 10 may be arranged to support image stack single script creation, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1601b, a single source path to a media file (to a digital video file or still image file) is provided as input—along with optional titling text. If titling text is provided without a source path, a main title will be generated. At step 1602b, function defaults are loaded and overridden as needed by user-set options. At step 1603b, if a media file is provided as input, it is loaded and the processing server determines whether the input source is a still image. At step 1604b, still images are looped to fill the default or user-specified duration. At step 1605b, the processing server determines whether a media file has been specified as input. If not, the title text is rendered by itself as a "main title".

At step 1606b, depending on the intended output dimensions, either a 16:9 or 4:3 background frame image is loaded into memory. In various embodiments, the function supports images of 16:9, 4:3, 3:2, 1:1, 2:3 or 3:4 aspect ratios (ratio of width to height). At step 1607b, on main titles, the text is rendered at a larger, bolder size and placed in the center of the background frame image. At step 1608b, source dimensions are analyzed and the background frame that most closely matches its aspect ratio is loaded into memory. In various embodiments, the function supports images of 16:9, 4:3, 3:2, 1:1, 2:3 or 3:4 aspect ratios (ratio of width to height). At step 1609b, the source is cropped to fit within the background frame, separated by a margin. Depending on whether titling text has been specified, the bottom margin may be extended to allow room for the text to appear on the background frame.

At step 1610b, the processing server determines whether titling text has been specified for the source. If so, the titling text is superimposed over the bottom of the background frame at step 1611*b*. At step 1612*b*, the cropped source clip is superimposed over the background frame, leaving margins on the sides. In various embodiments, the bottom margin's height is larger if titling text has been specified. At step 1613*b*, each clip transitions in an out. The direction of the animation and rotation angle is cycled to give the appearance of randomness, such as what would result when someone tossed a bunch of photographs into a pile. At step 1614*b*, the first frame of the processed input is held for an additional 10 frames. The last frame is held for an additional 10 frames. These additional frames are used so that the in/out animations do not subtract from the natural length of the clip. At step 1615*b*, the in and out transitions (sliding and rotating with simulated motion blur) are applied to the composite source/titling/background-frame input. At step 1616*b*, a single 32-bit RGB+transparency video clip (with or without audio) is returned.

FIG. 16C is a flowchart illustrating an exemplary method 1600*c* for flattening each source at step 1605*a* of the method of FIG. 16A, for example, in accordance with a representative embodiment of the present invention. The actions of the method 1600*c* of FIG. 16C may be performed using elements of the system 10 of FIG. 1 including, for example, the server(s) 11. The system 10 may be arranged to support source flattening, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1601*c*, the flatten process 1600*c* takes a cache media identifier as input. Optionally, a background image can be specified. At step 1602*c*, function defaults are loaded and overridden as needed by user-set options. At step 1603*c*, the AVI file corresponding to the input cache identifier is loaded into memory as a video clip (with or without audio). At step 1604*c*, the processing server determines whether the user has specified a background image to be used. If so, the processing server determines whether the specified background image has been cached at step 1605*c*. At step 1606*c*, the background image is conformed to 24-bit RGB and scaled and/or cropped as needed to fill the intended output dimensions, for example. At step 1607*c*, the method 1200 for generating a script as illustrated in FIG. 12 and discussed above, is used to generate an .avs script and store the resulting cache video clip as an AVI to improve performance on subsequent instances of the flatten process.

At step 1608*c*, when no background image is specified, a blank clip will be used as the background. The background color is determined by preset and can be overridden by user option. At step 1609*c*, the cached version of the background image is loaded into memory as a video clip. At step 1610*c*, the input media clip is superimposed over the background. At step 1611*c*, a single 24-bit RGB video clip (with or without audio) is returned.

FIG. 17 is a flowchart illustrating an exemplary method 1700 for processing video for a swivel or flip multi-clip sequence video editing project, in accordance with a representative embodiment of the present invention. The actions of the method 1700 of FIG. 17 may be performed using elements of the system 10 of FIG. 1 including, for example, the server(s) 11. The system 10 may be arranged to support multi-clip sequence video processing, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 17, swivel sequence and flip sequence projects have multi-clip screens, where 2-5 images and videos, for example, appear on the screen at once, and the individual clips flip or swivel in to show new images and videos. If images have titles, or there are videos present in the multi-clip screen, they are also displayed on their own after their multi-clip screen in their entirety.

At step 1701, both the swivel sequence and flip sequence projects take lists of paths to digital video or still images files as input. Titling text can be specified for any source—or without a source, resulting in a main title. Each list can create a different "track." In various embodiments, up to 4 tracks can be specified. The multiple tracks are tiled and play simultaneously in the final output, which can be either 640×480 or 1280×720 pixels in size, for example. In various embodiments, the swivel sequence project animates each source around a central axis, either vertically or horizontally. In various embodiments, the flip sequence project simulates a folding effect along a central horizontal axis. Since the flip sequence project is designed to simulate different images appearing on each side of a board, it operates on adjacent pairs of sources. At step 1702, function defaults are loaded and overridden as needed by user-set options.

At step 1703, the processing server determines whether there are multiple tracks. For example, up to 4 tracks can be specified. The multiple tracks may be tiled and play simultaneously in the final output. At step 1704, if the processing server determines multiple tracks are present at step 1703, the first track becomes the master track. In various embodiments, only the master track can also have audio. In certain embodiments, videos played on the master track maintain their original duration (unless trimming is specified), while the video on slave tracks are treated similarly to still images (trimmed to a common duration, audio muted). At step 1704, the timing of each cut on the master track may be predicted. At step 1705, the total time of the master track is used to determine how long each video or still image appears in the slave tracks. Since each track can have a different number of sources (and the master track can have long-playing videos), this is done to ensure that all tracks have the same duration.

Figure 18:
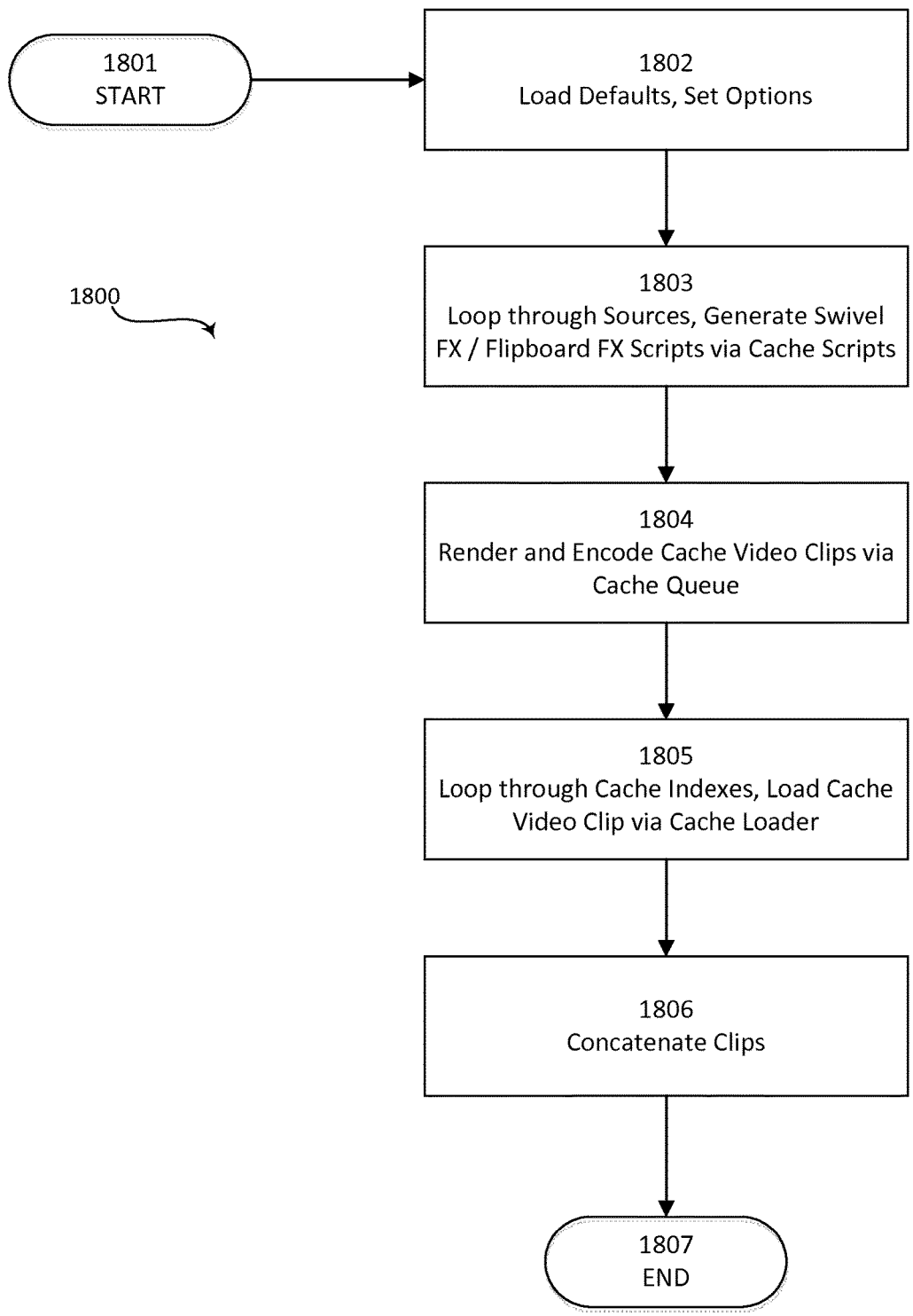
FIG. 18 is a flowchart illustrating an exemplary method for creating one or more track video clips in the method of FIG. 17, in accordance with a representative embodiment of the present invention.

At step 1706, one or more track video clips are created as illustrated in FIG. 18 and described below. The multiple tracks are tiled and play simultaneously in the final output. The dimensions of the tracks depend on intended output size and the number of tracks. For example, if there is one track, a single track is generated. If there are two tracks, two tracks having identical dimensions may be generated. If there are three tracks, one larger track and two smaller tracks can be generated. If there are four tracks, four tracks of identical dimensions may be generated.

At step 1707, the processing server determines whether multiple tracks are specified. At step 1708, in multi-track output, the tracks are placed side by side, and/or above and below each other depending on the number of tracks. Since the effects applied to the sources simulate motion and perspective, the tracks are cut and layered and recombined so that the currently animating track appears on top of static tracks. The track timings are used to determine sequencing of the layering order. In various embodiments, track layering is performed once for 2- or 3-track layouts. Track layering may be performed twice for 4-track layouts since there is an additional possibility of the swivel animations overlapping. Track layering operates in different ways, depending on whether a horizontal or vertical swivel axis has been specified.

At step 1709, solid-colored background may be created. At step 1710, the track (or multi-track) output is superimposed over the background. For example, if there is one track, a single track tile is generated. If there are two tracks, two tracks having identical dimensions may be positioned side-by-side and, optionally, separated by a border. If there are three tracks, two smaller track tiles can be arranged vertically and, optionally, separated by a border. The two tiles may then be positioned to the left or right of a larger track tile and, optionally, separated by a border. If there are four tracks, each of the four tracks tiles can have identical dimensions and, optionally, be separated by a border. In various embodiments, the combined tiles are then centered on background and, optionally, separated by a larger border. The borders can reveal the background color.

At step 1711, the video output is converted to YV12 colorspace, for example. Audio is conformed to 48 kHz/16-bit stereo, for example. At step 1712, a single YV12 video clip with audio is returned.

FIG. 18 is a flowchart illustrating an exemplary method 1800 for creating one or more track video clips at step 1706 in the method of FIG. 17, for example, in accordance with a representative embodiment of the present invention. The actions of the method 1800 of FIG. 18 may be performed using elements of the system 10 of FIG. 1 including, for example, the server(s) 11. The system 10 may be arranged to support track video clip creation, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Figure 19:
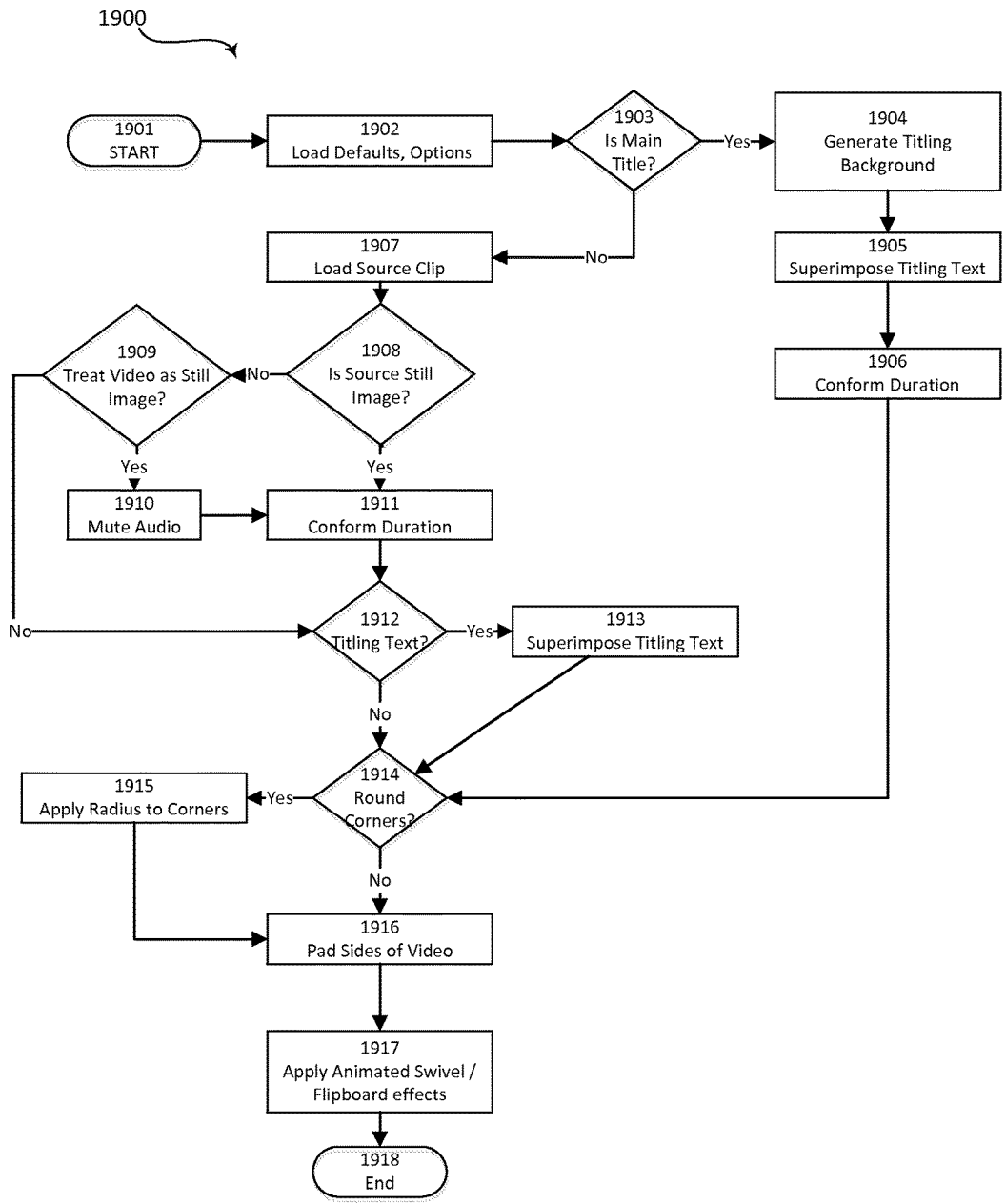
FIG. 19 is a flowchart illustrating an exemplary method for processing one or two media sources to generate a video clip in the methods of FIGS. 17-18, in accordance with a representative embodiment of the present invention.

At step 1801, a list of paths to media files (still images or video) is received as an input. At step 1802, function defaults are loaded and overridden as needed by user-set options. At step 1803, a swivel sequence effects script is generated for each source, which will later be rendered and encoded as cached video clip AVI files, as illustrated in FIG. 19 and described below. For swivel sequence project operations, each source is individually passed to the method 1900 illustrated in FIG. 19 and described below. For flip sequence project operations, adjacent pairs of sources are passed to the method 1900 illustrated in FIG. 19 and described below.

At step 1804, the swivel sequence effects scripts are batch-encoded to cache video clip AVI files using the method 1300*b* for threading to concurrently render and encode multiple scripts, as illustrated in FIG. 13B and described above. At step 1805, the cached AVI file output of the swivel sequence effects scripts is loaded using the method 1400*a* for generating a single video clip, as illustrated in FIG. 14A and described above. At step 1806, the video clips are concatenated to form a continuous video track comprised of the sources. At step 1807, a single 32-bit (RGB+transparency) video clip with 48 kHz audio is returned, for example.

FIG. 19 is a flowchart illustrating an exemplary method 1900 for processing one or two media sources to generate a video clip at step 1706 of the method of FIG. 17 and step 1803 of the method of FIG. 18, for example, in accordance with a representative embodiment of the present invention.

The actions of the method 1900 of FIG. 19 may be performed using elements of the system 10 of FIG. 1 including, for example, the server(s) 11. The system 10 may be arranged to support video clip generation, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 1901, either a single source, for swivel sequence project operations, or adjacent pairs of sources, for flip sequence project operations, is received. At step 1902, function defaults are loaded and overridden as needed by user-set options.

At step 1903, the processing server determines whether a media file has been specified as input. If not, the title text is rendered by itself as a "main title" and the method proceeds to step 1904. If the media file was specified as the input, the method skips to step 1907. At step 1904, a solid color (different than the main background color) is specified for main title backgrounds. At step 1905, the main titling is rendered and superimposed over the solid background generated at step 1904. At step 1906, the duration of the main title is matched to the duration specified for still images.

At step 1907, if the media file was specified as the input at step 1903, the source media is loaded and returned as a video clip, with or without audio depending on the source file itself. At step 1908, the processing server determines whether the source file is a still image or video file. At step 1909, if the source file is a video file, the processing server determines whether the video clip is to be treated as a still image. This may be specified by the user, for example. In various embodiments, videos appearing on slave tracks of multi-track output are treated as still images. At step 1910, if the video clip is being treated as a still image, audio attached to the video clip, if any, is removed. At step 1911, the duration of the video clip is matched to the duration specified for still images.

At step 1912, the processing server determines whether titling text has been specified for the source. At step 1913, if titling text was specified, the titling text is rendered and superimposed on the source clip. At step 1914, the processing server determines whether the corners of the clip were specified to be rounded. If so, a user-specified corner radius may be applied to the edges of the clip and the edges can be made transparent at step 1915.

At step 1916, extra (transparent) pixels are added to the edges of the resulting clip to allow room for the simulated perspective when the clip is "swiveled" in step 1917, for example. At step 1917, quadrilateral transformations are applied the source to simulate its spinning toward or away from the viewer, either horizontally or vertically, clockwise or counterclockwise. Simulated motion blur may also be applied for greater realism. In the case of a flip sequence project, the effects are applied to two sources at once (except for the first and last clips on the track) to simulate revealing source 'B' on the flip side of source 'A'. In various embodiments, the flip sequence project may include brightness adjustments during the animation to give the illusion of light hitting a shiny surface. The swivel effects are applied to beginning and end of the clip; leaving it static for most if its duration: (Swivel In→Static→Swivel Out). At step 1918, a single 32-bit (RGB+transparency) video clip (with or without audio) is returned.

FIG. 20 is a flowchart illustrating an exemplary method 2000 for processing video for a slide multi-clip sequence video editing project, in accordance with a representative embodiment of the present invention. The actions of the method 2000 of FIG. 20 may be performed using elements of the system 10 of FIG. 1 including, for example, the server(s) 11. The system 10 may be arranged to support slide multi-clip sequence video processing, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 20, a slide sequence project has multi-clip screens, where 2-5 images and/or videos, for example, appear on the screen at once, and the individual clips slide on and off the screen to show new images and/or videos. In various embodiments, if images have titles, or there are videos present in the multi-clip screen, they are also displayed on their own after their multi-clip screen in their entirety.

At step 2001, a list of paths to media files (still images or video) is input to the method 2000 for processing video for a slide multi-clip sequence video editing project. A list of screen types may also be input. The screen type determines how many sources appear on screen simultaneously and the geometric arrangement. In various embodiments, there may be nine possible screen types (numbered 0-8). At step 2002, function defaults are loaded and overridden as needed by user-set options.

Figure 21:
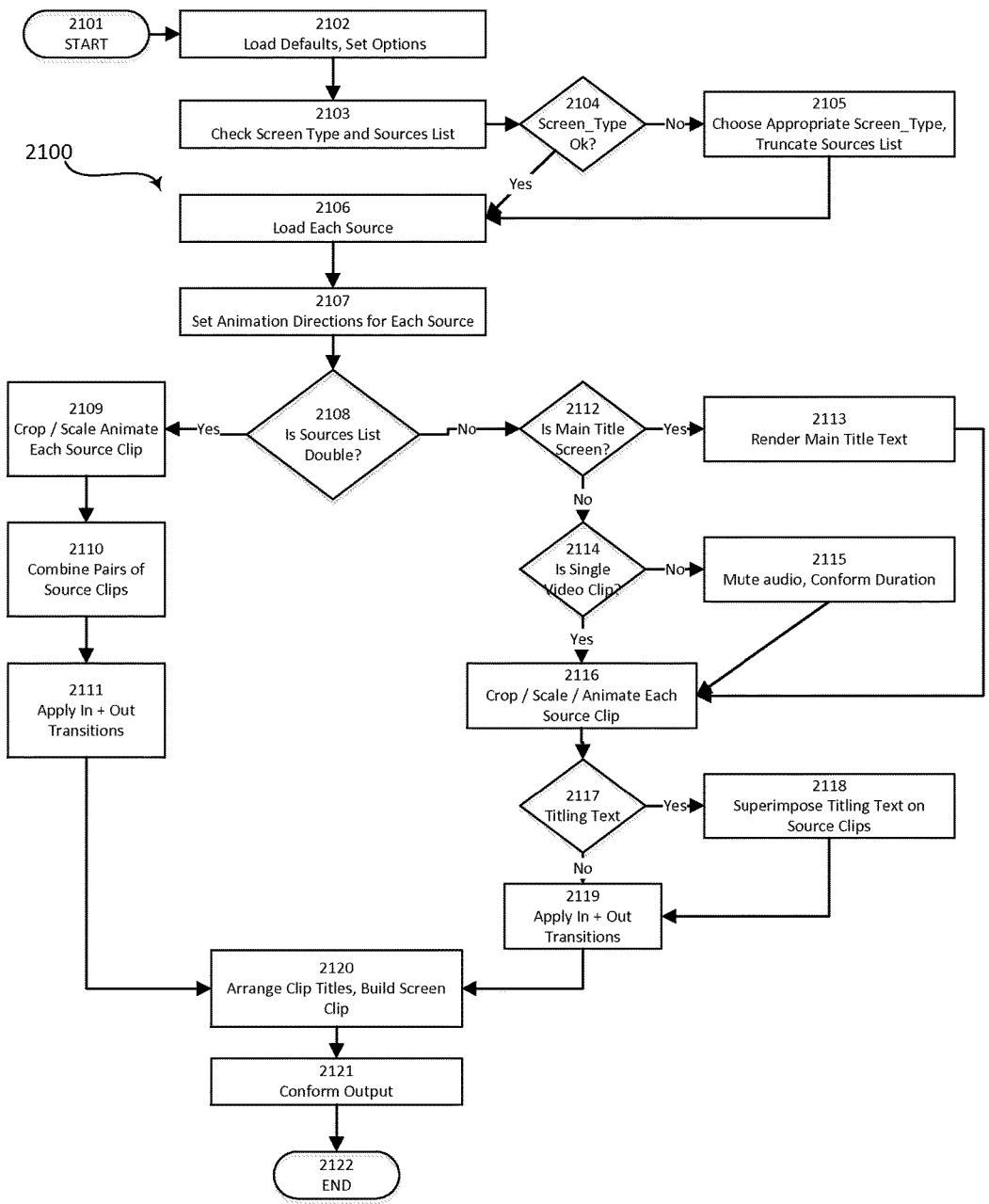
FIG. 21 is a flowchart illustrating an exemplary method for processing main title text and/or media sources to generate a video clip in the method of FIG. 20, in accordance with a representative embodiment of the present invention.

At step 2003, the processing server determines if main title text has been specified by the user. If main title text was specified, the method proceeds to step 2004 where a slide sequence screen script is generated based on the main title text and additional sources. More specifically, main titles may call for 2 additional sources. The source paths and title text are passed to a method 2100 for processing main title text and/or media sources, as illustrated in FIG. 21 and described below, and rendered as a 3-tile 'screen' where one title is occupied by the rendered main title text and the other two by the media clips.

At step 2005, the function loops though the user-supplied sources and screen type lists. In various embodiments, each given screen type expects a particular number of sources and each creates a different geometric arrangement of the source clips, for example:

screen_type=0: 1 source 1 tile
screen_type=1,2: 4 sources 2 tiles
screen_type=3,4,5,6: 6 sources 3 tiles
screen_type=7,8: 8 sources 4 tiles Screens may also be used with half of the above number of sources (so that type 3 may take 4 sources, type 7 may take 4 sources, etc.), for example, in the event that there are not enough sources available, such as at the end of the sources list. Note that screen_type=0 is special in that it uses one source clip.

At step 2006, the next screen type is extracted from the list. The source paths that correspond to the screen type are extracted from the sources list. The number of sources consumed per loop depends on the value of this screen type. If there are no more screen types in the list but sources still remain, screen types are chosen automatically for the remaining sources.

At step 2007, the current screen type and corresponding sources are used to generate a slide sequence screen script, as illustrated in FIG. 21 and described below, via the method 1200 for generating a script, as illustrated in FIG. 12 and described above. The cache identifier of the script is stored so that it can be later rendered and encoded to the cache video clip AVI file. At step 2008, the processing server determines whether all sources have been exhausted. If not, the method loops back to step 2006.

At step 2009, the slide sequence screen scripts are batch-encoded to cache video clip AVI files using the method 1300b for threading to concurrently render and encode multiple scripts, as illustrated in FIG. 13B and described above. At step 2010, the cached video clip file corresponding to each slide sequence screen script is loaded via the method 1400a for generating a single video clip, as illustrated in FIG. 14A and described above, and returned as a video clip. At step 2011, the video clips are spliced end-to-end, resulting in single media clip. At step 2012, a single media clip with YV12-colorspace video and 48 kHz/16-bit stereo audio is returned, for example, which can then be further edited, processed and/or encoded.

FIG. 21 is a flowchart illustrating an exemplary method 2100 for processing main title text and/or media sources to generate a video clip at step 2007 in the method 2000 of FIG. 20, in accordance with a representative embodiment of the present invention. The actions of the method 2100 of FIG. 21 may be performed using elements of the system 10 of FIG. 1 including, for example, the server(s) 11. The system 10 may be arranged to support main title text and media clip processing, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

At step 2101, a single screen type argument and a list of source media paths is received as an input. At step 2102, function defaults are loaded and overridden as needed by user-set options. At step 2103, each of the possible screen type arguments expects a particular number of sources and creates a single clip composed of the sources, arranged geometrically, for example:

screen_type=0: 1 source 1 tile
screen_type=1,2: 4 sources 2 tiles
screen_type=3,4,5,6: 6 sources 3 tiles
screen_type=7,8: 8 sources 4 tiles However, other variations are possible, such as, for example:

screen_type=1,2: 2 sources 2 tiles
screen_type=3,4,5,6: 3 sources 3 tiles
screen_type=7,8: 4 sources 4 tiles If too many sources are provided for the specified screen type, the additional ones are ignored. If too few are provided for optimal usage (upper table), various embodiments provide attempting to use half the optimal number (lower table), for example.

At step 2104, the processing server determines if the number of supplied sources is adequate for the specified screen type. If the number of sources is not compatible with the screen type, a more appropriate screen type is chosen automatically at step 2105. In certain embodiments, additional sources are discarded (such as when 5 sources are supplied for screen_type=2, etc.). At step 2106, each source is loaded by one of several source filters, depending on file type, and returned as a video clip, with or without audio. At step 2107, each source is assigned an animation direction (left, right, up or down) that is used for transitions. Also, the panning animation direction alternates for each source.

At step 2108, the processing server determines whether the number of sources is optimal: "double" the requirement. This is true when 4 sources have been specified for a 2-tile screen type, 8 sources for a 4-tile screen type, etc. If the number of sources is optimal, each source is scaled to fit the geometry of one of the screen tiles at step 2109. In cases where the aspect ratio of the source does not match the target tile, cropping is animated, resulting in panning across the image or video. At step 2110, for "double" lists, sources are paired together so that, given sources 1,2,3,4 for a 2-tile screen, sources 1+3 will appear in one tile and 2+4 in the other, for example. The paired clips play in succession, overlapped by a sliding transition of varying direction. At step 2111, in and out sliding transitions are applied to the resulting clip(s).

If the number of sources determined at step 2108 is not optimal, the processing server determines whether main titling text has been supplied at step 2112. At step 2113, if main titling text was supplied, the main title text is rendered to a 32-bit (RGB+transparency) video clip, for example. At step 2114, if main titling text was not supplied, the processing server determines whether screen_type=0 has been specified and if the clip's source was a digital video file. At step 2115, for any case where screen_type !=0, video clips are treated as still images and conformed to common duration, without audio. At step 2116, each source is scaled to fit the geometry of one of the screen tiles. In cases where the aspect ratio of the source does not match the target tile, cropping is animated, resulting in panning across the image or video.

At step 2117, the processing server determines whether titling text has been specified for each source. At step 2118, if titling text has been supplied for any source clips, that text string is rendered and superimposed over the corresponding source clip. At step 2119, in and out sliding transitions are applied to the resulting clip(s).

At step 2120, the resulting tiles from steps 2111 and/or 2119 are arranged geometrically to fill the screen; optionally separated from each other by an inner border and from the edges of the resulting "screen" by a larger outer border, for example. In various embodiments, borders may reveal the background color, which is determined by preset and can be overridden by user option. At step 2121, the resulting video is converted to YV12-colorspace and audio is conformed to 48 kHz/16-bit stereo, for example. At step 2122, a single media clip with YV12-colorspace video and 48 kHz/16-bit stereo audio is returned, which can then be further edited, processed and/or encoded.

FIGS. 22-24 and the corresponding descriptions below relate to music mixing and ducking workflows, which are called from footer methods/functions as discussed above with regard to step 404 of FIG. 4, for example. The mixing and ducking workflows are described below as being applied to the output video as a whole; however, the mixing and ducking workflows may be applied per video clip, for example.

FIG. 22 is a flowchart illustrating an exemplary method 2200 for editing and mixing one or more music files with a video output, in accordance with a representative embodiment of the present invention. The actions of the method 2200 of FIG. 22 may be performed using elements of the system 10 of FIG. 1 including, for example, the server(s) 11. The system 10 may be arranged to support editing and mixing one or more music files with a video output, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 22, the method 2200 may be used to match a music file, or music files (can be many) length with video length. For example, if the music file is longer than the video, it is trimmed to match. As another example, if the music file is shorter than the video, it is looped (with some logic to only do so if X seconds are remaining) to match the video length. The method 2200 can be used to fade in and out between tracks and loop if necessary to match video length if there are multiple music files. The method 2200 may be used to fade in and fade out music file(s) with the video. The method 2200 can be used to call audio ducking functionality to seamlessly fade the music audio in and out around video audio so that the music and video audio do not interfere with each other. In various embodiments, the above-mentioned exemplary functions of method 2200 are performed automatically such that a user does not have to perform the extremely difficult and tedious tasks, for example.

The method 2200 begins at step 2201. At step 2202, function defaults are loaded and overridden as needed by user-set options. At step 2203, a loader loop is started such that a next music clip is loaded at step 2204. At step 2205, the processing server determines whether to normalize a volume of the music clip. If the processing server determines normalization is needed, the normalization is performed at step 2206.

At step 2207, the processing server may fade in and/or out of the music based on selected options. At step 2208, a main audio clip is appended with the current audio clip. At step 2209, if all music clips have not been loaded, the method 2200 returns to step 2204. After all music clips have been appended to the main audio clip, the method proceeds to step 2210, where the processing server determines whether the music clip is longer than the video clip. If the music clip is longer, the method proceeds to step 2211 where the audio is looped until audio is longer than the video clip. At step 2212, the audio clip is trimmed to the video duration.

At step 2213, the processing server determines whether to perform audio ducking. If audio ducking was selected, the method proceeds to step 2215 where the method 2300 for audio ducking is performed as illustrated in FIG. 23 and described below. Otherwise, the method proceeds to step 2214, where the audio track of the video and the audio track of the music are mixed. The resulting audio clip is dubbed to the video by synchronizing and multiplexing the audio (music) and video (images) streams. At step 2216, the audio is conformed to the sample rate and word length as specified in the options (or the default of 48 kHz, 16 bit). The method ends at step 2217.

FIG. 23 is a flowchart illustrating an exemplary method 2300 for audio ducking at, for example, step 2215 of the method 2200 of FIG. 22 and/or at step 2407 of the method 2400 of FIG. 24, in accordance with a representative embodiment of the present invention. The actions of the method 2300 of FIG. 23 may be performed using elements of the system 10 of FIG. 1 including, for example, the server(s) 11. The system 10 may be arranged to support audio ducking, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 23, audio ducking is a complex function that maps points in an audio stream of a video clip where silence changes to noise or noise changes to silence, and then smoothly mutes or reduces or increases the volume of the music audio (e.g., with fade in and fade out) so the music audio and the video audio do not collide. As an example, if there is music playing over images, and then a video with a corresponding audio soundtrack appears, the music smoothly fade outs while that video is playing so that the soundtrack of the video is more clearly audible, and then fades back in once the video has completed.

The method 2300 begins at step 2301. At step 2302, function defaults are loaded and overridden as needed by user-set options. At step 2303, the audio track of the video is written to a WAV file so that it can be analyzed and changes between noise and silence can be detected and logged to a file. At step 2304, noise gating is applied to the WAV by a noise gating tool such as those available within sox.exe, or any suitable noise gating tool, for example. The processing server may log "onsets" (representing point in time at which the soundtrack changes from silence to noise or from noise to silence) to an output file using a tool such as Sonic Annotator or any suitable tool, for example. The processing server can convert the decimal seconds into frame numbers at 29.97 frames per second (fps), for example, using a tool such as onsets.exe or any suitable tool.

At step 2305, the onsets file is loaded. The onsets file includes a list of the temporal location of onsets in integer frames at 29.97 frames per second (fps). The first onset is the first point at which silence changes to noise (or 0, representing the very beginning, in cases where the audio does not begin with silence). The music is faded-out at the silence (noise onsets) and faded-in at the noise (silence onsets). For example, if the audio includes 5 seconds of a subject speaking, then 5 seconds of silence, followed by 5 seconds of conversation, the onsets List would be: 0, 150, 300. As another example, if the audio consists of 5 seconds of silence followed by 10 seconds of noise, followed by 10 seconds of silence, the onsets list will be: 150, 450.

At step 2306, the processing server determines whether the onset list is empty. An empty onsets list indicates that the entire video-audio track is silent. No fade-in or fade-out occurs in these cases, and the music is dubbed to the video, replacing the audio track of the video at step 2307. At step 2308, if the onset list includes one onset, there is no silence in the audio track of the video. If there is no silence in the audio track of the video, the music audio is mixed with the video audio at a reduced (fade-out) volume. If the onset list includes more than one onset, the method proceeds to step 2309 and the list of onsets is looped through so that fade-in and fade-out events can be triggered on the music track at the corresponding video frame numbers.

At step 2310, the value of a current onset is compared to the value of the next onset to determine an interval. At step 2311, the duration of the interval is compared to the fade-in/out duration to avoid fading out on very short silences. If the duration of the interval is greater than twice the fade-in/out duration, for example, the method may proceed to step 2312. Otherwise, the method may skip to step 2313 such that the short silence is filtered out and not added to the points list described below.

At step 2312, the fade duration is subtracted from the next onset, so that the fade is completed by the point specified by the value of the onset. The computed difference is added to a points list, which includes the points in time at which the music is faded in and out. After the processing server determines that all onsets were compared at step 2313, the method proceeds to step 2314 where the processing server determines if the points list is empty. An empty points list may indicate that all silences were too short to be considered significant and were filtered out. If the points list is empty, the method proceeds to step 2315, where the audio track of the video and the audio track of the music are mixed at levels specified by the options, such as a reduced (fade-out) volume, for example. The resulting audio clip is dubbed to the video by synchronizing and multiplexing the audio (music) and video (images) streams.

At step 2316, if the points list is not empty, the processing server begins looping through the points list. The first point in the list is 0 (zero-based indexing). At step 2317, the processing server determines whether the index is an odd number. For example, since indexing on the loop is zero-based and the first event represents a silence to noise transition, an odd-numbered index triggers a music fade-in event, while and even-numbered index is a fade-out. At step 2318, the music is faded in at the current point if the processing server determines that the index is an odd number at step 2317. The length of the transition may be determined by the duration option (or default of 30 frames/one second). At step 2319, the music is faded out at the current point if the processing server determines that the index is an even number at step 2317. The length of the transition is determined by the duration option (or default of 30 frames/one second).

At step 2320, the processing server determines whether the points list has been completed. If not, the index of the points list is incremented and the method returns to step 2317. Once the processing server determines that the points list is completed, the method proceeds to step 2315, where the audio track of the video and the audio track of the music (which may have been modified to include more or one of fade-in out fade-out effects) are mixed. The resulting audio clip is dubbed to the video by synchronizing and multiplexing the audio (music) and video (images) streams. At step 2322, the audio is conformed to the sample rate and word length as specified in the options (or the default of 48 kHz, 16 bit). At step 2323, the video and processed audio are returned from the function as a clip object. For example, the clip object can be returned to step 2215 of FIG. 22 as described above and/or step 2407 of FIG. 24 as described below.

FIG. 24 is a flowchart illustrating an exemplary method 2400 for editing and mixing a music file with a video output, in accordance with a representative embodiment of the present invention. The actions of the method 2400 of FIG. 24 may be performed using elements of the system 10 of FIG. 1 including, for example, the server(s) 11. The system 10 may be arranged to support editing and mixing a music file with a video output, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 24, the method 2400 for editing and mixing a music file with a video output is a variation of the method 2200 that may be used, for example, when handling one input music file. The method 2400 begins at step 2401. At step 2402, function defaults are loaded and overridden as needed by user-set options. At step 2403, if the music parameter is a string, the music track is loaded at step 2404. At step 2405, the processing server determines whether to perform audio ducking. If audio ducking was selected, the method proceeds to step 2407 where the method 2300 for audio ducking is performed as illustrated in FIG. 23 and described above. Otherwise, the method proceeds to step 2406, where the audio track of the video and the audio track of the music are mixed. The resulting audio clip is dubbed to the video by synchronizing and multiplexing the audio (music) and video (images) streams. At step 2408, the audio is conformed to the sample rate and word length as specified in the options (or the default of 48 kHz, 16 bit). The method ends at step 2409.

FIGS. 25-27 and the corresponding description below relate to video and/or color filters that apply color grading, lighting effects, and overlays, such as old film (which adds film grain looking like an old film projector), for example.

FIG. 25 is a flowchart illustrating an exemplary method 2500 for filtering and providing an overlay to a video output, in accordance with a representative embodiment of the present invention. The actions of the method 2500 of FIG. 25 may be performed using elements of the system 10 of FIG. 1 including, for example, the server(s) 11. The system 10 may be arranged to support video filtering and overlaying, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 25, the method 2500 for filtering and providing an overlay to a video output applies filters to video and overlays custom or stock film grain over the video to provide an old film look. In various embodiment, if applied by itself, the output resembles 60/70's footage, and if applied with black and white, the output resembles 1950's or 1920's footage, for example. The method 2500 begins at step 2501. At step 2502, function defaults are loaded and overridden as needed by user-set options. At step 2503, the processing server determines whether to decimate the frame rate. At step 2504, the frame rate may be decimated based on the determination at step 2503.

The processing server determines whether to provide various effects such as colorized video (at step 2505), film dirt effect (at step 2507), vignette effect (at step 2509), film grain (at step 2511), and/or flicker effect (at step 2513), among other things. Based on the determination at step 2505, the processing server may colorize the video with specified colors at step 2506. For example, the specified colors may provide sepia effects, black and white, or any suitable selected effect. If the processing server determines to provide film dirt effects at step 2507, the method proceeds to step 2508 where an overlay corresponding with film dirt is applied to the video clip. At step 2510, a vignette overlay may be applied based on the determination of the processing server at step 2509. Based on the determination at step 2511, a film grain effect may be applied at step 2512. In various embodiments, a third party plugin may be used to provide one or more of the effects, for example. If the processing server determines to provide flicker effect at step 2513, lighting and darkening may be applied respectively to each pair of adjacent video frames, for example to provide the flicker effect at step 2514.

At step 2515, if the frame rate was decimated at step 2504, the original input frame rate may be restored by duplicating frames at step 2516. At step 2517, the processing server determines whether to conform the video and audio. If video and audio conformance was selected and/or specified, the method proceeds to step 2518 where the video output is converted to YV12 colorspace, for example. At step 2519, the video output is converted to the NTSC-standard frame rate of 29.97 frames per second, for example. At step 2520, the video output may be conformed to pixel dimensions of either 1280×720 or 640×480, for example, depending on a selected preset, among other things. At step 2521, the audio is conformed to 48 kHz/16-bit stereo, for example.

If video and audio conformance was not selected and/or specified, the method proceeds to step 2522 where the processing server determines whether the input video includes an audio track. If so, an old film audio filter as described in the method 2900 of FIG. 29 may be applied at step 2523. The method 2500 ends at step 2524.

FIG. 26 is a flowchart illustrating an exemplary method 2600 for color filtering a video output, in accordance with a representative embodiment of the present invention. The actions of the method 2600 of FIG. 26 may be performed using elements of the system 10 of FIG. 1 including, for example, the server(s) 11. The system 10 may be arranged to support color filtering, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

The method 2600 for color filtering a video output begins at step 2601. At step 2602, function defaults are loaded and overridden as needed by user-set options. At step 2603, the processing server applies user-specified or default brightness and contrast adjustments to a video clip. At step 2604, the processing server determines whether any color filter effects are enabled. For example, the processing server may colorize a video clip using a user-specified or default color parameter at step 2605. At step 2606, the processing server can apply a sepia effect based on a user-specified or default color parameter. As another example, the processing server may apply a Technicolor effect color channel specified by a channel parameter or a default, such as red, among other things, at step 2607.

At step 2608, the processing server determines whether to conform the video and audio. If video and audio conformance was selected and/or specified, the method proceeds to step 2609 where the video output is converted to YV12 colorspace, for example. At step 2610, the video output is converted to the NTSC-standard frame rate of 29.97 frames per second, for example. At step 2611, the video output may be conformed to pixel dimensions of either 1280×720 or 640×480, for example, depending on a selected preset. At step 2612, the audio is conformed to 48 kHz/16-bit stereo, for example. The method 2600 ends at step 2613.

FIG. 27 is a flowchart illustrating an exemplary method 2700 for color filtering a video output, in accordance with a representative embodiment of the present invention. The actions of the method 2700 of FIG. 27 may be performed using elements of the system 10 of FIG. 1 including, for example, the server(s) 11. The system 10 may be arranged to support color filtering, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 27, the method 2700 for color filtering a video output may be the function called in the footer of the project, as illustrated in step 404 of FIG. 4, for example, if the user has selected a color filter. Color filters such as sepia, new film, and the like are applied to the entire video output or individual video clips, for example. The method 2700 for color filtering a video output begins at step 2701. At step 2702, the processing server determines whether a color filter preset was specified.

If the processing server determines that a Super 8 filter was selected at step 2702, a video frame rate is converted to 15.985 frames per second at step 2703. At step 2704, a strong film grain effect is added to the video. At step 2705, a brightness of the video may be decreased by, for example, 33% while a contrast of the video is increased by 33%. At step 2706, a vibrancy of the video may be reduced by 75% and a saturation of the video can be increased by 300%, for example. At step 2707, a flicker effect may be applied by, for example, respectively lighting and darkening each pair of adjacent video frames. At step 2708, the video frame rate may be converted to 29.97 frames per second.

At step 2709, if the processing server determined that an old film filter was selected, a strong film grain effect can be added to the video. At step 2710, a brightness of the video may be decreased by, for example, 33% while a contrast of the video is increased by 33%. At step 2711, a vibrancy of the video may be reduced by 75% and its saturation can be increased by 300%, for example. At step 2712, a Gaussian blur effect may be applied to soften color channels.

If the processing server determines that a new film filter was selected at step 2702, a brightness of the video may be decreased by, for example, 33% and a contrast of the video can be increased by 50% at step 2713. At step 2714, a vibrancy of the video may be increased by 75% and a saturation of the video can be reduced by 25%, for example. At step 2715, moderate sharpening can be applied to a luminance channel of the video. At step 2716, a mild film grain effect may be added to the video.

At step 2717, if the processing server determined that a Technicolor filter was selected, the processing server may apply a Technicolor effect color channel specified by a channel parameter or a default, such as red, among other things. At step 2718, if the processing server determined that a sepia filter was selected, the processing server may apply a sepia effect based on a user-specified or default color parameter. If the processing server determines that a vibrant filter was selected at step 2702, a vibrancy of the video may be increased by 100% and its saturation can be reduced by 33%, for example, at step 2719. At step 2720, if the processing server determined that a mellow filter was selected, the processing server may increase a vibrancy of the video by 300% and decrease its saturation by 75%, for example. At step 2721, if the processing server determined that a spot color filter was selected, the processing server may provide an extreme vibrancy increase and an extreme saturation decrease, for example.

If the processing server determines that a pop art filter was selected at step 2702, a video gamma may be decreased and a contrast can be mildly increased, for example, at step 2722. At step 2723, the processing server may reduce a vibrancy of the video by 38% and increase its saturation by 400%, for example. At step, 2724, a mild softening may be applied to the video. At step 2725, a strong sharpening may be applied to the video. The method 2700 for color filtering a video output ends at step 2726.

FIGS. 28-29 relate to audio filters that apply audio overlays and effects to individual video clips or a video output as a whole. The audio filters may be applied in the footer process described above with regard to step 404 of FIG. 4, for example.

FIG. 28 is a flowchart illustrating an exemplary method 2800 for applying a vinyl noise audio filter to a video output, in accordance with a representative embodiment of the present invention. The actions of the method 2800 of FIG. 28 may be performed using elements of the system 10 of FIG. 1 including, for example, the server(s) 11. The system 10 may be arranged to support applying audio filters to a video output, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 28, the vinyl noise filter adds old phonograph record style noise to audio. In various embodiments, the old phonograph record style noise may be overlaid over an entire video output, which may have video audio and music audio, for example. In certain embodiments, a user can specify vinyl noise strength, like normal, heavy, or extreme, for example. The method 2800 for applying a vinyl noise audio filter to a video output begins at step 2801. At step 2802, function defaults are loaded and overridden as needed by user-set options. At step 2803, additional options are set based on a profile parameter. At step 2804, a silent audio clip, such as a silent 18 second 48 kHz/16-bit stereo audio clip, is created and stored in memory. At step 2805, if the processing server determines that a crackle effect was selected, a crackle WAV file is loaded at step 2806 and mixed with the silent audio clip at a level specified by a user-selected or default crackle parameter.

At step 2808, if the processing server determines that a dust noise effect was selected, a dust noise WAV file is loaded at step 2809 and mixed with the output audio from step 2807 at step 2810. At step 2811, if the processing server determines that a click effect was selected, a click WAV file is loaded at step 2812 and mixed with the output audio from step 2810 at step 2813. At step 2814, if the processing server determines that a mechanical noise effect was selected, a mechanical noise WAV file is loaded at step 2815 and mixed with the output audio from step 2813 at step 2816. At step 2817, if the processing server determines that an equalizer effect was selected, a midrange frequency boost may be applied to the input audio at a level specified by an equalization strength parameter specified by a user or default.

At step 2819, the output audio from step 2816 is looped to match the input audio duration. The output audio from step 2819 is mixed into the input audio at step 2820, the audio levels are normalized at step 2821, and the audio is conformed to 48 kHz/16-bit stereo. The method 2800 for applying a vinyl noise audio filter to a video output ends at step 2823.

FIG. 29 is a flowchart illustrating an exemplary method 2900 for applying a projector noise audio filter to a video output, in accordance with a representative embodiment of the present invention. The actions of the method 2900 of FIG. 29 may be performed using elements of the system 10 of FIG. 1 including, for example, the server(s) 11. The system 10 may be arranged to support applying audio filters to a video output, for example. Certain embodiments of the present invention may omit one or more of actions, and/or perform the actions in a different order than the order listed, and/or combine certain of the actions discussed below. For example, some actions may not be performed in certain embodiments of the present invention. As a further example, certain actions may be performed in a different temporal order, including simultaneously, than listed below.

Referring to FIG. 29, an old film audio filter adds old projector style audio noise and effects to audio. For example, an end user may add the old film audio filter as projector noise from the audio filters. In various embodiments, the projector style audio noise and effects are overlaid over the entire video output, which may have video audio and music audio, for example. The method 2900 for applying a projector noise audio filter to a video output begins at step 2901. At step 2902, function defaults are loaded and overridden as needed by user-set options. At step 2903, a noise clip is looped to match the duration of the input video. The noise clip may be a stock audio clip of noise from an old-fashioned film projector, for example. At step 2904, the noise clip is mixed with the input audio at a specified level. The specified level may be user-specified or a default, such as 25% noise, for example. At step 2905, the resulting mixed audio clip is dubbed to the video by synchronizing and multiplexing the audio and video streams. The method 2900 for applying a projector noise audio filter to a video output ends at step 2906.

The present invention may be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for editing and mixing one or more music audio clips with a video audio track and an entire video output, the method comprising:
   creating, by at least one processing server, a main audio clip from the one or more music audio clips;
   comparing, by the at least one processing server, a main audio duration of the main audio clip to a video duration of the entire video output;
   extending the main audio duration by looping, by the at least one processing server, the main audio clip until the main audio duration is longer than the video duration of the entire video output if the main audio duration is shorter than the video duration;
   trimming, by the at least one processing server, the main audio clip to the video duration;
   identifying, by the at least one processing server, one or more onsets in the video audio track corresponding with silence-to-noise transitions and noise-to-silence transitions;
   identifying, by the at least one processing server, points corresponding to when the main audio clip is one or more of faded-in or faded-out in relation to the video audio track based on a fade duration setting and the one or more onsets;
   editing, by the at least one processing server, the main audio clip to insert one of a fade-in event or a fade-out event at each of the identified points;
   mixing, by the at least one processing server, the main audio clip and the video audio track; and
   synchronizing and multiplexing, by the at least one processing server, the mixed audio and the entire video output.

2. The method according to claim 1, wherein creating the main audio clip comprises normalizing a volume of the one or more music audio clips.

3. The method according to claim 1, wherein creating the main audio clip comprises one or more of fading-in and fading-out of the one or more music audio clips.

4. The method according to claim 1, wherein the one or more music audio clips is a plurality of music audio clips appended together to form the main audio clip.

5. The method according to claim 1, comprising conforming the mixed audio to a sample rate and word length specified in a selectable option.

6. The method according to claim 5, wherein the sample rate and word length is 48 kHz, 16 bit.

7. A system for editing and mixing one or more music audio clips with a video audio track and an entire video output, the system comprising:
   at least one processing server configured to:
      create a main audio clip from the one or more music audio clips;
      compare a main audio duration of the main audio clip to a video duration of the entire video output;
      extend the main audio duration by looping the main audio clip until the main audio duration is longer than the video duration of the entire video output if the main audio duration is shorter than the video duration;

trim the main audio clip to the video duration;

identify one or more onsets in the video audio track corresponding with silence-to-noise transitions and noise-to-silence transitions;

identify points corresponding to when the main audio clip is one or more of faded-in or faded-out in relation to the video audio track based on a fade duration setting and the one or more onsets;

edit the main audio clip to insert one of a fade-in event or a fade-out event at each of the identified points;

mix the main audio clip and the video audio track; and synchronize and multiplex the mixed audio and the entire video output.

8. The system according to claim 7, wherein creating the main audio clip comprises normalizing a volume of the one or more music audio clips.

9. The system according to claim 7, wherein creating the main audio clip comprises one or more of fading-in and fading-out of the one or more music audio clips.

10. The system according to claim 7, wherein the one or more music audio clips is a plurality of music audio clips appended together to form the main audio clip.

11. The system according to claim 7, wherein the at least one processing server is configured to conform the mixed audio to a sample rate and word length specified in a selectable option, the selectable option comprising a 48 kHz sample rate and 16 bit word length option.

12. A non-transitory computer readable medium having stored thereon, a computer program having at least one code section, the at least one code section being executable by a machine for causing the machine to perform steps comprising:

creating a main audio clip from the one or more music audio clips;

comparing a main audio duration of the main audio clip to a video duration of an entire video output;

extending the main audio duration by looping the main audio clip until the main audio duration is longer than the video duration of the entire video output if the main audio duration is shorter than the video duration;

trimming the main audio clip to the video duration;

identifying one or more onsets in the video audio track corresponding with silence-to-noise transitions and noise-to-silence transitions;

identifying points corresponding to when the main audio clip is one or more of faded-in or faded-out in relation to the video audio track based on a fade duration setting and the one or more onsets;

editing the main audio clip to insert one of a fade-in event or a fade-out event at each of the identified points;

mixing the main audio clip and the video audio track; and synchronizing and multiplexing the mixed audio and the entire video output.

13. The non-transitory computer readable medium according to claim 12, wherein creating the main audio clip comprises normalizing a volume of the one or more music audio clips.

14. The non-transitory computer readable medium according to claim 12, wherein creating the main audio clip comprises one or more of fading-in and fading-out of the one or more music audio clips.

15. The non-transitory computer readable medium according to claim 12, wherein the one or more music audio clips is a plurality of music audio clips appended together to form the main audio clip.

16. The non-transitory computer readable medium according to claim 12, comprising conforming the mixed audio to a sample rate and word length specified in a selectable option.

17. The non-transitory computer readable medium according to claim 16, wherein the sample rate and word length is 48 kHz, 16 bit.

* * * * *